(12) United States Patent
Park et al.

(10) Patent No.: US 12,041,528 B2
(45) Date of Patent: Jul. 16, 2024

(54) CONNECTION FAILURE REPORTING

(71) Applicant: Comcast Cable Communications, LLC, Philadelphia, PA (US)

(72) Inventors: Kyungmin Park, Herndon, VA (US); Esmael Hejazi Dinan, Herndon, VA (US); Alireza Babaei, Fairfax, VA (US); Hyoungsuk Jeon, Oakton, VA (US); Hua Zhou, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1310 days.

(21) Appl. No.: 16/246,001

(22) Filed: Jan. 11, 2019

(65) Prior Publication Data

US 2019/0215756 A1    Jul. 11, 2019

Related U.S. Application Data

(60) Provisional application No. 62/616,388, filed on Jan. 11, 2018.

(51) Int. Cl.
| | |
|---|---|
| H04W 40/00 | (2009.01) |
| H04W 24/10 | (2009.01) |
| H04W 36/00 | (2009.01) |
| H04W 40/24 | (2009.01) |
| H04W 52/06 | (2009.01) |
| H04W 76/18 | (2018.01) |
| H04W 76/27 | (2018.01) |

(52) U.S. Cl.
CPC ......... *H04W 40/248* (2013.01); *H04W 24/10* (2013.01); *H04W 36/00* (2013.01); *H04W 52/06* (2013.01); *H04W 76/18* (2018.02); *H04W 76/27* (2018.02)

(58) Field of Classification Search
CPC ... H04W 24/10; H04W 36/00; H04W 40/248; H04W 52/06; H04W 76/27; H04W 76/18
See application file for complete search history.

(56) References Cited

U.S. PATENT DOCUMENTS

| | | |
|---|---|---|
| 8,798,093 B2 | 8/2014 | Wu |
| 9,432,847 B2 | 8/2016 | Yi et al. |
| 9,596,674 B2 | 3/2017 | Somasundaram et al. |
| 2008/0310367 A1 | 12/2008 | Meylan |

(Continued)

FOREIGN PATENT DOCUMENTS

| | | |
|---|---|---|
| CN | 102448060 A | 5/2012 |
| WO | 2018143703 A1 | 8/2018 |

(Continued)

OTHER PUBLICATIONS

Feb. 27, 2019—EP Search Report—19151430.6.

(Continued)

*Primary Examiner* — Brandon M Renner
(74) *Attorney, Agent, or Firm* — Banner & Witcoff, Ltd.

(57) ABSTRACT

Systems, apparatuses, and methods are described for wireless communications. A wireless device may send, to a base station central unit, one or more first messages comprising information associated with a connection failure. The base station central unit may send the information associated with the connection failure in one or more second messages to a base station distributed unit for determining updated cell parameters.

20 Claims, 22 Drawing Sheets

(56) References Cited

U.S. PATENT DOCUMENTS

| | | | |
|---|---|---|---|
| 2009/0175163 A1 | 7/2009 | Sammour et al. | |
| 2009/0190480 A1 | 7/2009 | Sammour et al. | |
| 2010/0034169 A1 | 2/2010 | Maheshwari et al. | |
| 2012/0069732 A1* | 3/2012 | Xu | H04W 36/0058 370/242 |
| 2013/0250828 A1 | 9/2013 | Chou et al. | |
| 2014/0079022 A1* | 3/2014 | Wang | H04W 36/0069 370/331 |
| 2014/0192775 A1 | 7/2014 | Li et al. | |
| 2015/0016312 A1 | 1/2015 | Li et al. | |
| 2015/0373609 A1* | 12/2015 | Kim | H04W 36/04 370/332 |
| 2016/0309379 A1* | 10/2016 | Pelletier | H04W 76/12 |
| 2017/0019945 A1* | 1/2017 | Chiba | H04W 76/15 |
| 2017/0041767 A1 | 2/2017 | Vajapeyam et al. | |
| 2017/0150408 A1 | 5/2017 | Joseph et al. | |
| 2017/0202053 A1 | 7/2017 | Rune | |
| 2018/0006770 A1 | 1/2018 | Guo et al. | |
| 2018/0124642 A1 | 5/2018 | Phuyal et al. | |
| 2018/0124825 A1 | 5/2018 | Lee et al. | |
| 2018/0199328 A1* | 7/2018 | Sang | H04B 7/0617 |
| 2018/0279168 A1 | 9/2018 | Jheng et al. | |
| 2018/0279169 A1 | 9/2018 | Wang et al. | |
| 2018/0279193 A1 | 9/2018 | Park et al. | |
| 2018/0279204 A1 | 9/2018 | Kim et al. | |
| 2018/0279218 A1 | 9/2018 | Park et al. | |
| 2018/0279262 A1 | 9/2018 | Babaei et al. | |
| 2018/0279401 A1 | 9/2018 | Hong et al. | |
| 2018/0287677 A1 | 10/2018 | Nagaraja et al. | |
| 2018/0352601 A1 | 12/2018 | Park et al. | |
| 2018/0367288 A1 | 12/2018 | Vrzic et al. | |
| 2018/0368107 A1 | 12/2018 | Babaei et al. | |
| 2019/0037635 A1 | 1/2019 | Guo et al. | |
| 2019/0053325 A1 | 2/2019 | Yu et al. | |
| 2019/0110237 A1* | 4/2019 | Cha | H04W 36/08 |
| 2019/0132790 A1 | 5/2019 | Lee et al. | |
| 2019/0268799 A1 | 8/2019 | Hong et al. | |
| 2019/0327621 A1* | 10/2019 | Chou | H04L 41/0895 |
| 2021/0112547 A1* | 4/2021 | Yasukawa | H04W 72/20 |

FOREIGN PATENT DOCUMENTS

| | | | |
|---|---|---|---|
| WO | 2018147677 A1 | 8/2018 | |
| WO | 2018175199 A1 | 9/2018 | |
| WO | 2018183085 A1 | 10/2018 | |
| WO | 2018202933 A1 | 11/2018 | |
| WO | 2018203736 A1 | 11/2018 | |
| WO | 2018231425 A1 | 12/2018 | |
| WO | 2018237001 A1 | 12/2018 | |
| WO | 2019139530 A1 | 7/2019 | |

OTHER PUBLICATIONS

May 14, 2017—TP for UE Radio Bearer Management.
Nokia—May 1, 2010—"Enabling MRO in case of re-establishment request in unprepared eNB".
R2-162709 3GPP TSG-RAN WG2 Meeting #93bis, Dubrovnik, Croatia, Apr. 11-15, 2016, Source: Beam support in NR.
May 27, 2019—Extended European Search Report—19155025.0.
NTT Docomo, Inc.: "F1 interface: Radio resource configuration management", May 15-19, 2017.
CMCC: "System information generation and delivery in CU-DU split architecture", Aug. 21-25, 2017.
ZTE: "Discussion on the solution for UE Initial Access", Oct. 9-13, 2017.
Apr. 8, 2019—Exended European Search Report—EP 19151473.6.
ZTE—Consideration on the activation or deactivation of duplication—Nov. 17, 2017.
CATT—Discussion on CA based PDCP Duplication—Sep. 30, 2017.
3GPP Stnadard—"3rd Generation Partnership Project: Technical Specificaiton Group Radio Access Network; NG-RAN; F1 application protocol (F1AP) (Release 15)"—Dec. 11, 2017.
3GPP Standard—"3rd Generation Partnership Project; Technical Specification Group Radio Access Network NR Radio Resource Control (RRC) protocol specification (Release 15)"—Jan. 4, 2018.
Aug. 6, 2019—European Extended Search Report—EP 19157448. 2.
3GPP TSG-RAN WG2 #100: "Discussion on Inter-nodeRRC container", Dec. 1, 2017.
3GPP TSG-RAN Meeting #76: "Miscellaneous general corrections and clarifications resulting from ASN.1 review", Jun. 5, 2017.
R2-1801239 3GPP TSG-RAN WG2 AH, Vancouver, Canada, Jan. 22-26, 2018, Source: LG Electronics Inc., Title: Prioritization between dynamic grant and configured grant for URLLC.
R2-1801277 3GPP TSG-RAN WG2 AH, Vancouver, Canada, Jan. 22-26, 2018, Source: LG Electronics Inc., Title: Restart condition of sCellDeactivationTimer with skipping operation.
R2-1801371 3GPP TSG-RAN WG2 AH, Vancouver, Canada, Jan. 22-26, 2018, Source: Samsung, Title: Remaining Issue on SPS/Grant-free: How to Handle Dynamic Grant Coinciding with Configured Grant.
R2-1801475 3GPP TSG-RAN WG2 AH, Vancouver, Canada, Jan. 22-26, 2018, Source: LG Electronics Inc., Title: Prevention of using CS grant.
R3-174356 3GPP TSG-RAN WG3 Meeting #98, Reno, USA, Nov. 27-Dec. 1, 2017, Source: Nokia, Nokia Shanghai Bell, Title: Transport layer protocol for F1-C.
R3-174357 3GPP TSG-RAN WG3 Meeting #98, Reno, USA, Nov. 27-Dec. 1, 2017, Source: Nokia, Nokia Shanghai Bell, Title: Transport layer protocol for F1-U.
R3-174359 3GPP TSG-RAN WG3 Meeting #98, Reno, USA, Nov. 27-Dec. 1, 2017, Source: Nokia, Nokia Shanghai Bell, Title: UE Initial Access procedure.
R3-174360 3GPP TSG-RAN WG3 Meeting #98, Reno, USA, Nov. 27-Dec. 1, 2017, Source: Nokia, Nokia Shanghai Bell, KT, Title: FFS resolution in intra-gNB-CU mobility.
R3-174361 3GPP TSG-RAN WG3 Meeting #98, Reno, USA, Nov. 27-Dec. 1, 2017, Source: Nokia, Nokia Shanghai Bell, KT, Title: TP of UE Context Modification and UE Attached Indication (TS 38.470).
R3-174362 3GPP TSG-RAN WG3 Meeting #98, Reno, USA, Nov. 27-Dec. 1, 2017, Source: Nokia, Nokia Shanghai Bell, KT, Title: TP of UE Context Modification and UE Attached Indication (TS 38.473).
R3-174364 3GPP TSG-RAN WG3 Meeting #98, Reno, USA, Nov. 27-Dec. 1, 2017, Source: Nokia, Nokia Shanghai Bell, Title: FFS resolution in Centralized Retransmission.
R3-174396 3GPP TSG-RAN WG3 Meeting #98, Reno, USA, Nov. 27-Dec. 1, 2017, Source: ZTE, China Telecom, Title: Solution for UE Initial Access.
R3-174397 3GPP TSG-RAN WG3 Meeting #98, Reno, USA, Nov. 27-Dec. 1, 2017, Source: ZTE, Title: Update on UE Context Management for TS38.470.
R3-174398 3GPP TSG-RAN WG3 Meeting #98, Reno, USA, Nov. 27-Dec. 1, 2017, Source: ZTE, Title: Update on UE Context Management for TS38.473.
R3-174405 3GPP TSG-RAN WG3 Meeting #98, Reno, USA, Nov. 27-Dec. 1, 2017, Source: ZTE, China Unicom, Title: Remaining Issues of Mobility Aspects.
R3-174408 3GPP TSG-RAN WG3 Meeting #98, Reno, USA, Nov. 27-Dec. 1, 2017, Source: ZTE, Title: Consideration on the activation or deactivation of duplication.
R3-174409 3GPP TSG-RAN WG3 Meeting #98, Reno, USA, Nov. 27-Dec. 1, 2017, Source: ZTE, China Telecom, Title: Remaining Issues of Centralized Retransmissions.
R3-174410 3GPP TSG-RAN WG3 Meeting #98, Reno, USA, Nov. 27-Dec. 1, 2017, Source: ZTE, Title: TP for Centralized Retransmissions kept in TS38.475.
R3-174411 3GPP TSG-RAN WG3 Meeting #98, Reno, USA, Nov. 27-Dec. 1, 2017, Source: ZTE, Title: TP for Centralized Retransmissions kept in TS38.425.
R3-174473 3GPP TSG-RAN WG3 Meeting #98, Reno, USA, Nov. 27-Dec. 1, 2017, Source: Huawei, Title: OCR on open issues for PDCP duplication over F1 to 38.473.

(56) References Cited

OTHER PUBLICATIONS

R3-174482 3GPP TSG-RAN WG3 Meeting #98, Reno, USA, Nov. 27-Dec. 1, 2017, Source: Huawei, Title: Further discussions on radio link outage indication.
R3-174533 3GPP TSG-RAN WG3 Meeting #98, Reno, USA, Nov. 27-Dec. 1, 2017, Source: CATT, Title: Discussion on CA based PDCP Duplication.
R3-174535 3GPP TSG-RAN WG3 Meeting #98, Reno, USA, Nov. 27-Dec. 1, 2017, Source: CATT, Title: Discussion on F1 Setup procedure.
R3-174536 3GPP TSG-RAN WG3 Meeting #98, Reno, USA, Nov. 27-Dec. 1, 2017, Source: CATT, Title: Discussion on Initial UE Access.
R3-174537 3GPP TSG-RAN WG3 Meeting #98, Reno, USA, Nov. 27-Dec. 1, 2017, Source: CATT, Title: Introduction of UE Reconfiguration Complete procedure.
R3-174538 3GPP TSG-RAN WG3 Meeting #98, Reno, USA, Nov. 27-Dec. 1, 2017, Source: CATT, Title: TP for 38.473 on UE Reconfiguration Completion procedure.
R3-174542 3GPP TSG-RAN WG3 Meeting #98, Reno, USA, Nov. 27-Dec. 1, 2017, Source: CATT, Title: Discussion on inter-DU mobility without MN involved.
R3-174543 3GPP TSG-RAN WG3 Meeting #98, Reno, USA, Nov. 27-Dec. 1, 2017, Source: CATT, Title: Stage 3 TP on inter-DU mobility without MN involved.
R3-174545 3GPP TSG-RAN WG3 Meeting #98, Reno, USA, Nov. 27-Dec. 1, 2017, Source: CATT, Title: Discussion on the Intral-cell HO and SCG change procedure.
R3-174546 3GPP TSG-RAN WG3 Meeting #98, Reno, USA, Nov. 27-Dec. 1, 2017, Source: CATT, Title: TP for 38.473 on Intra-cell HO and SCG change procedure.
R3-174606 3GPP TSG-RAN WG3 Meeting #98, Reno, USA, Nov. 27-Dec. 1, 2017, Source: Samsung, KT, Title: Initial access procedure considering CU-DU split.
R3-174607 3GPP TSG-RAN WG3 Meeting #98, Reno, USA, Nov. 27-Dec. 1, 2017, Source: Samsung, KT, Title: Stage 3 TP for TS38.473 to reflect initial access procedure.
R3-174608 3GPP TSG-RAN WG3 Meeting #98, Reno, USA, Nov. 27-Dec. 1, 2017, Source: Samsung, KT, Title: RRC connection resume procedure considering CU-DU split.
R3-174609 3GPP TSG-RAN WG3 Meeting #98, Reno, USA, Nov. 27-Dec. 1, 2017, Source: Samsung, KT, Title: RRC connection reestablishment procedure considering CU-DU split.
R3-174611 3GPP TSG-RAN WG3 Meeting #98, Reno, USA, Nov. 27-Dec. 1, 2017, Source: Samsung, KT, Title: Mobility procedures with high layer split.
R3-174612 3GPP TSG-RAN WG3 Meeting #98, Reno, USA, Nov. 27-Dec. 1, 2017, Source: Samsung, KT, Title: Stage 2 TP for TS38.470 on mobility related procedures.
R3-174613 3GPP TSG-RAN WG3 Meeting #98, Reno, USA, Nov. 27-Dec. 1, 2017, Source: Samsung, KT, Title: Stage 3 TP for TS38.473 on mobility related procedures.
R3-174618 3GPP TSG-RAN WG3 Meeting #98, Reno, USA, Nov. 27-Dec. 1, 2017, Source: Samsung, KT, Title: Further discussions on PDCP duplication in high-layer split.
R3-174637 3GPP TSG-RAN WG3 Meeting #98, Reno, USA, Nov. 27-Dec. 1, 2017, Source: Intel Corporation, Title: Flow Control enhancements for downlink PDCP duplication.
R3-174638 3GPP TSG-RAN WG3 Meeting #98, Reno, USA, Nov. 27-Dec. 1, 2017, Source: Intel Corporation, Title: Flow Control enhancements for uplink PDCP duplication.
R3-174663 3GPP TSG-RAN WG3 Meeting #98, Reno, USA, Nov. 27-Dec. 1, 2017, Source: CMCC, Title: UE initial access procedure for CU-DU architecture.
R3-174769 3GPP TSG-RAN WG3 Meeting #98, Reno, USA, Nov. 27-Dec. 1, 2017, Source: Ericsson, Title: Discard the duplicated transmissions of PDCP PDUs.
R3-174772 3GPP TSG-RAN WG3 Meeting #98, Reno, USA, Nov. 27-Dec. 1, 2017, Source: Ericsson, Title: Benefits of F1AP Transaction IDs.
R3-174773 3GPP TSG-RAN WG3 Meeting #98, Reno, USA, Nov. 27-Dec. 1, 2017, Source: Ericsson, Title: Further discussion about TNL solution for F1-C.
R3-174774 3GPP TSG-RAN WG3 Meeting #98, Reno, USA, Nov. 27-Dec. 1, 2017, Source: Ericsson, Title: On parallel transaction over F1.
R3-174781 3GPP TSG-RAN WG3 Meeting #98, Reno, USA, Nov. 27-Dec. 1, 2017, Source: Ericsson, Title: Mobility procedures.
R3-174782 3GPP TSG-RAN WG3 Meeting #98, Reno, USA, Nov. 27-Dec. 1, 2017, Source: Ericsson, Title: Content for UE mobility command messages.
R3-174786 3GPP TSG-RAN WG3 Meeting #98, Reno, USA, Nov. 27-Dec. 1, 2017, Source: NTT Docomo, Inc., Title: How to acquire status of re-transmitted packets.
R3-174850 3GPP TSG-RAN WG3 Meeting #98, Reno, USA, Nov. 27-Dec. 1, 2017, Source: NTT Docomo, Inc., Title: Consideration on data volume reporting.
R3-174854 3GPP TSG-RAN WG3 Meeting #98, Reno, USA, Nov. 27-Dec. 1, 2017, Source: KT Corp., Title: Considerations for F1 Setup Procedure.
R1-1704159 3GPP TSG-RAN WG2 Meeting #98, Hangzhou, China, May 15-19, 2017, Source: Samsung, Title: Random Access Response in NR.
R1-1704672 3GPP TSG-RAN WG2 Meeting #98, Hangzhou, China, May 15-19, 2017, Source: ZTE, Title: Consideration on the 4-step random access procedure.
R2-1704901 3GPP TSG-RAN WG2 Meeting #98, Hangzhou, China, May 15-19, 2017, Source: Qualcomm Incorporated, Title: Prioritized random access in NR.
R3-172102 3GPP TSG-RAN3 NR AdHoc Meeting, Qingdao, China, Jun. 27-29, 2017, Source: China Telecom, Title: On the preliminary transport comparison between F1-C and F1-U protocols.
R3-172176 3GPP TSG-RAN3 NR AdHoc Meeting, Qingdao, China, Jun. 27-29, 2017, Source: Huawei, Title: F1AP procedures for RRC Connection Setup.
R3-172178 3GPP TSG-RAN3 NR AdHoc Meeting, Qingdao, China, Jun. 27-29, 2017, Source: Huawei, Title: TP on Transmitting RRC Connection Setup message over F1 to 38.470.
R3-172198 3GPP TSG-RAN3 NR AdHoc Meeting, Qingdao, China, Jun. 27-29, 2017, Source: Huawei, Title: Discussions on F1 interface management.
R3-172199 3GPP TSG-RAN3 NR AdHoc Meeting, Qingdao, China, Jun. 27-29, 2017, Source: Huawei, Title: TP on F1 interface management to 38.470.
R3-172200 3GPP TSG-RAN3 NR AdHoc Meeting, Qingdao, China, Jun. 27-29, 2017, Source: Huawei, HiSilicon, Title: TP on F1 interface management procedures to 38.473.
R3-172209 3GPP TSG-RAN3 NR AdHoc Meeting, Qingdao, China, Jun. 27-29, 2017, Source: Chinatelecom, Title: gNB and gNB-CU ID discussion.
R3-172218 3GPP TSG-RAN3 NR AdHoc Meeting, Qingdao, China, Jun. 27-29, 2017, Source: CATT, Title: Discussion on the F1AP functions necessary for Option 3.
R3-172244 3GPP TSG-RAN3 NR AdHoc Meeting, Qingdao, China, Jun. 27-29, 2017, Source: Samsung, KT, SK Telecom, Title: Centralized retransmission of lost PDUs.
R3-172250 3GPP TSG-RAN3 NR AdHoc Meeting, Qingdao, China, Jun. 27-29, 2017, Source: Samsung, KT, SK Telecom, Title: On-demand SI support in high layer functional split.
R3-172251 3GPP TSG-RAN3 NR AdHoc Meeting, Qingdao, China, Jun. 27-29, 2017, Source: Samsung, KT, SK Telecom, Title: Stage 2 text proposal for TS38.401 on mechanism of centralized retransmission of lost PDUs.
R3-172256 3GPP TSG-RAN3 NR AdHoc Meeting, Qingdao, China, Jun. 27-29, 2017, Source: Samsung, KT, SK Telecom, Title: Stage 2 text proposal for TS38.401 on supporting on-demand SI.
R3-172266 3GPP TSG-RAN3 NR AdHoc Meeting, Qingdao, China, Jun. 27-29, 2017, Source: LG Electronics Inc., Title: Issue on C-RNTI allocation for RRC connection resume.
R3-172309 3GPP TSG-RAN3 NR AdHoc Meeting, Qingdao, China, Jun. 27-29, 2017, Source: Nokia, Alcatel-Lucent Shanghai Bell, Title: Inter-gNB-DU Mobility procedure.

(56) References Cited

OTHER PUBLICATIONS

R3-172310 3GPP TSG-RAN3 NR AdHoc Meeting, Qingdao, China, Jun. 27-29, 2017, Source: Nokia, Alcatel-Lucent Shanghai Bell, Title: TP of Inter-gNB-DU Mobility procedure (TS 38.401).
R3-172321 3GPP TSG-RAN3 NR AdHoc Meeting, Qingdao, China, Jun. 27-29, 2017, Source: Nokia, Alcatel-Lucent Shanghai Bell, Title: Retransmission procedure in radio link outage.
R3-172322 3GPP TSG-RAN3 NR AdHoc Meeting, Qingdao, China, Jun. 27-29, 2017, Source: Nokia, Alcatel-Lucent Shanghai Bell, Title: TP of Retransmission procedure in radio link outage (TS 38.401).
R3-172323 3GPP TSG-RAN3 NR AdHoc Meeting, Qingdao, China, Jun. 27-29, 2017, Source: Nokia, Alcatel-Lucent Shanghai Bell, Title: TP of Retransmission procedure in radio link outage (TS 38.475).
R3-172324 3GPP TSG-RAN3 NR AdHoc Meeting, Qingdao, China, Jun. 27-29, 2017, Source: Nokia, Title: [DRAFT] LS on retransmission procedure in radio link outage.
R3-172333 3GPP TSG-RAN3 NR AdHoc Meeting, Qingdao, China, Jun. 27-29, 2017, Source: Nokia, Alcatel-Lucent Shanghai Bell, Title: UE Initial Access Procedure.
R3-172334 3GPP TSG-RAN3 NR AdHoc Meeting, Qingdao, China, Jun. 27-29, 2017, Source: Nokia, Alcatel-Lucent Shanghai Bell, Title: TP of UE Initial Access procedure (TS 38.401).
R3-172342 3GPP TSG-RAN3 NR AdHoc Meeting, Qingdao, China, Jun. 27-29, 2017, Source: LG Electronics Inc., Title: Consideration on C-RNTI during initial UE access.
R3-172343 3GPP TSG-RAN3 NR AdHoc Meeting, Qingdao, China, Jun. 27-29, 2017, Source: LG Electronics Inc., Title: TP for consideration on C-RNTI during initial UE access.
R3-172344 3GPP TSG-RAN3 NR AdHoc Meeting, Qingdao, China, Jun. 27-29, 2017, Source: LG Electronics Inc., Title: TP for consideration on C-RNTI during initial UE access.
R3-172345 3GPP TSG-RAN3 NR AdHoc Meeting, Qingdao, China, Jun. 27-29, 2017, Source: ZTE, Title: RRC message transmission over F1 interface for TS 38.401.
R3-172346 3GPP TSG-RAN3 NR AdHoc Meeting, Qingdao, China, Jun. 27-29, 2017, Source: ZTE, Title: RRC message transmission over F1 interface for TS 38.470.
R3-172347 3GPP TSG-RAN3 NR AdHoc Meeting, Qingdao, China, Jun. 27-29, 2017, Source: ZTE, Title: RRC message transmission over F1 interface for TS 38.473.
R3-172356 3GPP TSG-RAN3 NR AdHoc Meeting, Qingdao, China, Jun. 27-29, 2017, Source: ZTE, China Telecom, Title: Discussion on flow control over F1-U.
R3-172357 3GPP TSG-RAN3 NR AdHoc Meeting, Qingdao, China, Jun. 27-29, 2017, Source: ZTE, Title: Update on flow control over F1 interface for TS 38.401.
R3-172358 3GPP TSG-RAN3 NR AdHoc Meeting, Qingdao, China, Jun. 27-29, 2017, Source: ZTE, Title: Flow control over F1 interface for TS 38.475.
R3-172399 3GPP TSG-RAN3 NR AdHoc Meeting, Qingdao, China, Jun. 27-29, 2017, Source: NEC, Title: How many gNB-DUs can be operated by one gNB-CU.
R3-172401 3GPP TSG-RAN3 NR AdHoc Meeting, Qingdao, China, Jun. 27-29, 2017, Source: CMCC, Title: gNB ID and NCGI considering CU-DU split.
R3-172417 3GPP TSG-RAN3 NR AdHoc Meeting, Qingdao, China, Jun. 27-29, 2017, Source: ZTE, China Unicom, Title: Discussion on CU DU ID and NCGI.
R3-172418 3GPP TSG-RAN3 NR AdHoc Meeting, Qingdao, China, Jun. 27-29, 2017, Source: ZTE, China Unicom, Title: CUDU ID and NCGI for TS 38.300.
R3-172481 3GPP TSG-RAN3 NR AdHoc Meeting, Qingdao, China, Jun. 27-29, 2017, Source: Samsung, Title: dentification of gNB, gNB-CU/DU, and NR cell.
R3-172484 3GPP TSG-RAN3 NR AdHoc Meeting, Qingdao, China, Jun. 27-29, 2017, Source: Vodafone, Title: Common Radio Resource Management Functional Split for Different Deployment Scenarios.
R3-172511 3GPP TSG-RAN3 NR AdHoc Meeting, Qingdao, China, Jun. 27-29, 2017, Source: Ericsson, Title: Resilience and scalability in a disaggregated gNB.
3GPP TS 36.300 V14.3.0 (Jun. 2017), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14).
3GPP TS 38.300 V1.0.0 (Sep. 2017), Technical Specification, 3rd Generation Partnership Project; Technical Specification Group Radio Access Network; NR; NR and NG-RAN; Overall Description; Stage 2 (Release 15).
R2-1707705 3GPP TSG-RAN2 Meeting #99, Berlin, Germany, Aug. 21-25, 2017, Source: OPPO, Title: Control on UL packet duplication for split bearer.
R2-1707708 3GPP TSG-RAN2 Meeting #99, Berlin, Germany, Aug. 21-25, 2017, Source: OPPO, Title: PDCP operation for UL packet duplication.
R2-1707717 3GPP TSG-RAN2 Meeting #99, Berlin, Germany, Aug. 21-25, 2017, Source: Huawei, HiSilicon, Title: UE behaviors upon deactivation of DC duplication.
R2-1707718 3GPP TSG-RAN2 Meeting #99, Berlin, Germany, Aug. 21-25, 2017, Source: Huawei, ASUSTeK, HiSilicon, Title: RLC behaviors upon duplicate deactivation.
R2-1707719 3GPP TSG-RAN2 Meeting #99, Berlin, Germany, Aug. 21-25, 2017, Source: Huawei, ASUSTeK, HiSilicon, Title: PDCP operation for packet duplication.
R2-1707720 3GPP TSG-RAN2 Meeting #99, Berlin, Germany, Aug. 21-25, 2017, Source: Huawei, HiSilicon, Title: PDCP data volume calculation for packet duplication (Revision of R2-1706484).
R2-1707924 3GPP TSG-RAN2 Meeting #99, Berlin, Germany, Aug. 21-25, 2017, Source: CATT, Title: PDCP Status Report for Duplication.
R2-1707925 3GPP TSG-RAN2 Meeting #99, Berlin, Germany, Aug. 21-25, 2017, Source: CATT, Title: Duplication Bearer Type.
R3-180123 3GPP TSG-RAN WG3 NR Ad Hoc, Sophia Antipolis, France, Jan. 22-26, 2018, Source: ZTE, Title: QoS information transfer over F1 interface.
R3-180124 3GPP TSG-RAN WG3 NR Ad Hoc, Sophia Antipolis, France, Jan. 22-26, 2018, Source: ZTE, Title: Update on QoS information transfer for TS38.473.
R3-180139 3GPP TSG-RAN WG3 NR Ad Hoc, Sophia Antipolis, France, Jan. 22-26, 2018, Source: ZTE, Title: NW slicing for high layer functional split.
R3-180164 3GPP TSG-RAN WG3 NR Ad Hoc, Sophia Antipolis, France, Jan. 22-26, 2018, Source: CATT, Title: TP for 38.401 BL on UE Reconfiguration Completion procedure.
R3-180179 3GPP TSG-RAN WG3 NR Ad Hoc, Sophia Antipolis, France, Jan. 22-26, 2018, Source: CATT, Title: Discussion on UE Context Management procedure.
R3-180180 3GPP TSG-RAN WG3 NR Ad Hoc, Sophia Antipolis, France, Jan. 22-26, 2018, Source: CATT, Title: TP for TS 38.473 on UE Context Management procedure.
R3-180188 3GPP TSG-RAN WG3 NR Ad Hoc, Sophia Antipolis, France, Jan. 22-26, 2018, Source: Nokia, Nokia Shanghai Bell, Title: QoS handling for F1.
R3-180189 3GPP TSG-RAN WG3 NR Ad Hoc, Sophia Antipolis, France, Jan. 22-26, 2018, Source: Nokia, Nokia Shanghai Bell, Title: TP of QoS handling for F1 (TS38.473).
R3-180190 3GPP TSG-RAN WG3 NR Ad Hoc, Sophia Antipolis, France, Jan. 22-26, 2018, Source: Nokia, Nokia Shanghai Bell, KT, Title: User inactivity monitoring.
R3-180234 3GPP TSG-RAN WG3 NR Ad Hoc, Sophia Antipolis, France, Jan. 22-26, 2018, Source: LG Electronics Inc., KT Corp., Title: QoS aspect in UE context management function.
R3-180235 3GPP TSG-RAN WG3 NR Ad Hoc, Sophia Antipolis, France, Jan. 22-26, 2018, Source: LG Electronics Inc., KT Corp., Title: Stage 3 on QoS aspect in UE context management function.
R3-180244 3GPP TSG-RAN WG3 NR Ad Hoc, Sophia Antipolis, France, Jan. 22-26, 2018, Source: Samsung, KT, Title: UE context management update considering parameters over X2 for EN-DC.

(56) References Cited

OTHER PUBLICATIONS

R3-180285 3GPP TSG-RAN WG3 NR Ad Hoc, Sophia Antipolis, France, Jan. 22-26, 2018, Source: Samsung, KT, Title: User inactivity monitoring in CU-DU architecture.
R3-180286 3GPP TSG-RAN WG3 NR Ad Hoc, Sophia Antipolis, France, Jan. 22-26, 2018, Source: Samsung, KT, Title: TP for TS 38.473 on user inactivity monitoring.
R3-180300 3GPP TSG-RAN WG3 NR Ad Hoc, Sophia Antipolis, France, Jan. 22-26, 2018, Source: NEC, Title: RLC Mode indication in F1AP.
R3-180330 3GPP TSG-RAN WG3 NR Ad Hoc, Sophia Antipolis, France, Jan. 22-26, 2018, Source: CMCC, Title: QoS management over F1.
R3-180343 3GPP TSG-RAN WG3 NR Ad Hoc, Sophia Antipolis, France, Jan. 22-26, 2018, Source: Huawei, Title: Further discussions on QoS info transfer over F1.
R3-180344 3GPP TSG-RAN WG3 NR Ad Hoc, Sophia Antipolis, France, Jan. 22-26, 2018, Source: Huawei, Title: oCR to 38.473 on QoS info transfer over F1.
R3-180352 3GPP TSG-RAN WG3 NR Ad Hoc, Sophia Antipolis, France, Jan. 22-26, 2018, Source: Huawei, Title: Further discussions on UE context management.
R3-180355 3GPP TSG-RAN WG3 NR Ad Hoc, Sophia Antipolis, France, Jan. 22-26, 2018, Source: Huawei, Title: CR to BL 38.473 on inter-gNB-DU or intra-gNB-DU handover case for SA operation.
R3-180356 3GPP TSG-RAN WG3 NR Ad Hoc, Sophia Antipolis, France, Jan. 22-26, 2018, Source: Huawei, Title: PCR to 38.473 on the introduction of Handover Preparation Information for SA Operation.
R3-180357 3GPP TSG-RAN WG3 NR Ad Hoc, Sophia Antipolis, France, Jan. 22-26, 2018, Source: Huawei, Title: Further discussions on the content of serving cell info.
R3-180367 3GPP TSG-RAN WG3 NR Ad Hoc, Sophia Antipolis, France, Jan. 22-26, 2018, Source: Huawei, Title: Further discussions on confirmation to gNB-DU about completion of RRC messages.
R3-180425 3GPP TSG-RAN WG3 NR Ad Hoc, Sophia Antipolis, France, Jan. 22-26, 2018, Source: Ericsson, Title: UE radio capabilities over F1.
R3-180426 3GPP TSG-RAN WG3 NR Ad Hoc, Sophia Antipolis, France, Jan. 22-26, 2018, Source: Ericsson, Title: Cell information over F1.
R3-180427 3GPP TSG-RAN WG3 NR Ad Hoc, Sophia Antipolis, France, Jan. 22-26, 2018, Source: Ericsson, Title: UE Context Setup over the F1.
R3-180428 3GPP TSG-RAN WG3 NR Ad Hoc, Sophia Antipolis, France, Jan. 22-26, 2018, Source: Ericsson, Title: UE Reject Indication and gNB-DU admission result.
R3-180429 3GPP TSG-RAN WG3 NR Ad Hoc, Sophia Antipolis, France, Jan. 22-26, 2018, Source: Ericsson, Title: Further analysis on inactivity monitoring.
R3-180430 3GPP TSG-RAN WG3 NR Ad Hoc, Sophia Antipolis, France, Jan. 22-26, 2018, Source: Ericsson, Title: Creation of signalling connection.
R3-180431 3GPP TSG-RAN WG3 NR Ad Hoc, Sophia Antipolis, France, Jan. 22-26, 2018, Source: Ericsson, Title: RRC Container in UE Context Setup Request.
R3-180432 3GPP TSG-RAN WG3 NR Ad Hoc, Sophia Antipolis, France, Jan. 22-26, 2018, Source: Ericsson, Title: RLC mode indication.
R3-180433 3GPP TSG-RAN WG3 NR Ad Hoc, Sophia Antipolis, France, Jan. 22-26, 2018, Source: Ericsson, Title: Introduction of UE Reconfiguration Complete procedure.
R3-180518 3GPP TSG-RAN WG3 NR Ad Hoc, Sophia Antipolis, France, Jan. 22-26, 2018, Source: Ericsson, Vodafone, Title: UE context Setup over the F1.
R3-180596 3GPP TSG-RAN WG3 NR Ad Hoc, Sophia Antipolis, France, Jan. 22-26, 2018, Source: Ericsson, Title: UE Reject Indication.
R3-180599 3GPP TSG-RAN WG3 NR Ad Hoc, Sophia Antipolis, France, Jan. 22-26, 2018, Source: Huawei, Title: oCR to 38.473 on UE context management for mobility handling for SA operation.
R3-180606 3GPP TSG-RAN WG3 NR Ad Hoc, Sophia Antipolis, France, Jan. 22-26, 2018, Source: NTT Docomo, Inc., Title: Summary of offline discussion on CU-DU QoS handling.
R3-180807 3GPP TSG-RAN WG3 Meeting #99, Athens, Greece, Feb. 26-Mar. 2, 2018, Source: CATT, Title: Discussion on activation of PDCP Duplication.
R3-181732 3GPP TSG RAN WG3 Meeting #99bis, Sanya, China, Apr. 16-20, 2018, Source: ZTE, Title: Bearer Context Modification over E1 interface for TS38.460.
R3-181733 3GPP TSG RAN WG3 Meeting #99bis, Sanya, China, Apr. 16-20, 2018, Source: ZTE, Title: Bearer Context Modification over E1 interface for TS38.463.
R3-181735 3GPP TSG RAN WG3 Meeting #99bis, Sanya, China, Apr. 16-20, 2018, Source: ZTE, Title: Discussion on PDCP COUNT wrap around.
R3-181736 3GPP TSG RAN WG3 Meeting #99bis, Sanya, China, Apr. 16-20, 2018, Source: ZTE, Title: Discussion on E1 interface setup.
R3-181833 3GPP TSG RAN WG3 Meeting #99bis, Sanya, China, Apr. 16-20, 2018, Source: NEC (Rapporteur), Title: Baseline CR for June version of TS 38.401 covering agreements of RAN3#99 on CPUP_Split.
R3-181842 3GPP TSG RAN WG3 Meeting #99bis, Sanya, China, Apr. 16-20, 2018, Source: Nokia, Nokia Shanghai Bell, Title: (TP for CPUP_Split BL CR for TS 38.401) Support of change of gNB-CU-UP.
R3-181843 3GPP TSG RAN WG3 Meeting #99bis, Sanya, China, Apr. 16-20, 2018, Source: Nokia, Nokia Shanghai Bell, Title: (TP for CPUP_Split BL CR for TS 38.401) FFS resolution for E1 overall procedures.
R3-181844 3GPP TSG RAN WG3 Meeting #99bis, Sanya, China, Apr. 16-20, 2018, Source: Nokia, Nokia Shanghai Bell, Title: Definition of gNB-CU-CP/UP.
R3-181845 3GPP TSG RAN WG3 Meeting #99bis, Sanya, China, Apr. 16-20, 2018, Source: Nokia, Nokia Shanghai Bell, Title: E1 non-UE associated functions.
R3-181846 3GPP TSG RAN WG3 Meeting #99bis, Sanya, China, Apr. 16-20, 2018, Source: Nokia, Nokia Shanghai Bell, Title: E1 non-UE associated procedures.
R3-181847 3GPP TSG RAN WG3 Meeting #99bis, Sanya, China, Apr. 16-20, 2018, Source: Nokia, Nokia Shanghai Bell, Title: gNB-CU-UP notification function.
R3-181848 3GPP TSG RAN WG3 Meeting #99bis, Sanya, China, Apr. 16-20, 2018, Source: Nokia, Nokia Shanghai Bell, Title: gNB-CU-UP notification procedure.
R3-181849 3GPP TSG RAN WG3 Meeting #99bis, Sanya, China, Apr. 16-20, 2018, Source: Nokia, Nokia Shanghai Bell, Title: Bearer Context Management procedures.
R2-1712914 3GPP TSG-RAN WG2 Meeting #100, Reno, USA, Nov. 27-Dec. 1, 2017, Source: Lenovo, Motorola Mobility, Title: PDCP packet duplication.
R2-1712926 3GPP TSG-RAN WG2 Meeting #100, Reno, USA, Nov. 27-Dec. 1, 2017, Source: Ericsson, Title: PDCP duplication and discard.
R2-1712928 3GPP TSG-RAN WG2 Meeting #100, Reno, USA, Nov. 27-Dec. 1, 2017, Source: Ericsson, Title: PDCP duplication for AM operation.
R2-1712929 3GPP TSG-RAN WG2 Meeting #100, Reno, USA, Nov. 27-Dec. 1, 2017, Source: Ericsson, Title: PDCP duplication transmit procedure.
R2-1712932 3GPP TSG-RAN WG2 Meeting #100, Reno, USA, Nov. 27-Dec. 1, 2017, Source: Ericsson, Title: PDCP data volume reporting in duplication.
R2-1712964 3GPP TSG-RAN WG2 Meeting #100, Reno, USA, Nov. 27-Dec. 1, 2017, Source: Samsung, Title: Discussion on PDCP data volume calculation during PDCP Duplication.
R2-1712965 3GPP TSG-RAN WG2 Meeting #100, Reno, USA, Nov. 27-Dec. 1, 2017, Source: Institute for Information Industry (III), Title: Discussion on Uplink Packet Duplication.

(56) References Cited

OTHER PUBLICATIONS

R2-1713004 3GPP TSG-RAN WG2 Meeting #100, Reno, USA, Nov. 27-Dec. 1, 2017, Source: vivo, Title: Layer-2 behaviors of PDCP duplication deactivation.
R2-1713005 3GPP TSG-RAN WG2 Meeting #100, Reno, USA, Nov. 27-Dec. 1, 2017, Source: vivo, Title: PDCP duplication impacts on LCP.
R2-1713006 3GPP TSG-RAN WG2 Meeting #100, Reno, USA, Nov. 27-Dec. 1, 2017, Source: vivo, Title: Discussion on the PDCP data volume.
R2-1713009 3GPP TSG-RAN WG2 Meeting #100, Reno, USA, Nov. 27-Dec. 1, 2017, Source: vivo, Title: UE layer-2 behaviors at Scell-failure.
R2-1713584 3GPP TSG-RAN WG2 Meeting #100, Reno, USA, Nov. 27-Dec. 1, 2017, Source: Qualcomm Incorporated, Title: PDCP duplication.
R2-1713588 3GPP TSG-RAN WG2 Meeting #100, Reno, USA, Nov. 27-Dec. 1, 2017, Source: Ericsson, Title: Remaining open issues of RLM and RLF in NR.
R2-1713641 3GPP TSG-RAN WG2 Meeting #100, Reno, USA, Nov. 27-Dec. 1, 2017, Source: ITL, Title: Configuration of PDCP duplication on default DRB.
R2-1713829 3GPP TSG-RAN WG2 Meeting #100, Reno, USA, Nov. 27-Dec. 1, 2017, Source: Samsung, Title: Activation and Deactivation of PDCP Duplication.
R2-1713830 3GPP TSG-RAN WG2 Meeting #100, Reno, USA, Nov. 27-Dec. 1, 2017, Source: Samsung, Title: Discussion on CA Duplication.
R2-1713831 3GPP TSG-RAN WG2 Meeting #100, Reno, USA, Nov. 27-Dec. 1, 2017, Source: Samsung, Title: Initial State of Uplink Packet Duplication.
R2-1713848 3GPP TSG-RAN WG2 Meeting #100, Reno, USA, Nov. 27-Dec. 1, 2017, Source: Samsung, Title: The Necessity of Fast RLF Recovery based on T312 in NR.
R2-1800155 3GPP TSG-RAN WG2 AH, Vancouver, Canada, Jan. 22-26, 2018, Source: OPPO, Title: Discussion on behaviour of ConfiguredGrantTimer.
R2-1800165 3GPP TSG-RAN WG2 AH, Vancouver, Canada, Jan. 22-26, 2018, Source: CATT, Title: UE behavior on configured grant timer upon DCI reception.
R2-1800334 3GPP TSG-RAN WG2 AH, Vancouver, Canada, Jan. 22-26, 2018, Source: Ericsson, Title: SPS and BWP inactivity timer interaction.
R2-1800373 3GPP TSG-RAN WG2 AH, Vancouver, Canada, Jan. 22-26, 2018, Source: Samsung Electronics R&D Institute UK, Title: Preventing simultaneous Type 1 configured grants on SUL and UL.
R2-1800374 3GPP TSG-RAN WG2 AH, Vancouver, Canada, Jan. 22-26, 2018, Source: Samsung Electronics R&D Institute UK, Title: Corrections to preventing simultaneous Type 1 configured grants on SUL and UL.
R2-1800566 3GPP TSG-RAN WG2 AH, Vancouver, Canada, Jan. 22-26, 2018, Source: LG Electronics Inc., Title: BWP timer restart for DL SPS.
R2-1800586 3GPP TSG-RAN WG2 AH, Vancouver, Canada, Jan. 22-26, 2018, Source: Nokia, Nokia Shanghai Bell, Title: Prioritization between dynamic grant and configured grant.
R2-1800587 3GPP TSG-RAN WG2 AH, Vancouver, Canada, Jan. 22-26, 2018, Source: Nokia, Nokia Shanghai Bell, Title: Correction on prioritization between dynamic grant and configured grant.
R2-1800622 3GPP TSG-RAN WG2 AH, Vancouver, Canada, Jan. 22-26, 2018, Source: Samsung, Title: Correction for SPS and Type-2 Configured Grant Calculation.
R2-1800624 3GPP TSG-RAN WG2 AH, Vancouver, Canada, Jan. 22-26, 2018, Source: Samsung, Title: Impact of Flexible Transmission on Configured Grant Operation.
R2-1800659 3GPP TSG-RAN WG2 AH, Vancouver, Canada, Jan. 22-26, 2018, Source: Samsung, Title: Draft CR for correction on SPS and Type-2 configured grant.
R2-1800661 3GPP TSG-RAN WG2 AH, Vancouver, Canada, Jan. 22-26, 2018, Source: Samsung, Title: Draft CR for flexible configured grant transmission.
R2-1800708 3GPP TSG-RAN WG2 AH, Vancouver, Canada, Jan. 22-26, 2018, Source: Ericsson, Title: Confirmation of Configured UL Grant Type 2 Activation for Multiple Aggregated Cells.
R2-1800709 3GPP TSG-RAN WG2 AH, Vancouver, Canada, Jan. 22-26, 2018, Source: Ericsson, Title: Alignment of terminology for Configured Scheduling and SPS.
R2-1800818 3GPP TSG-RAN WG2 AH, Vancouver, Canada, Jan. 22-26, 2018, Source: Samsung Electronics R&D Institute UK, Title: Corrections to prevent simultaneous Type 1 configured grants on SUL and UL.
R2-1800819 3GPP TSG-RAN WG2 AH, Vancouver, Canada, Jan. 22-26, 2018, Source: Samsung Electronics R&D Institute UK, Title: Preventing simultaneous Type 1 configured grants on SUL and UL.
R2-1800898 3GPP TSG-RAN WG2 AH, Vancouver, Canada, Jan. 22-26, 2018, Source: vivo, Title: Text proposal for repetition of the configured grant.
R2-1800902 3GPP TSG-RAN WG2 AH, Vancouver, Canada, Jan. 22-26, 2018, Source: vivo, Title: Collision between dynamic grant and configured grant.
R2-1800925 3GPP TSG-RAN WG2 AH, Vancouver, Canada, Jan. 22-26, 2018, Source: Intel Corporation, Title: URLLC exception for dynamic grant.
R2-1801032 3GPP TSG-RAN WG2 AH, Vancouver, Canada, Jan. 22-26, 2018, Source: Huawei, HiSilicon, Title: Leftovers of HARQ Transmission with Configured Grant Timer.
R2-1801033 3GPP TSG-RAN WG2 AH, Vancouver, Canada, Jan. 22-26, 2018, Source: Huawei, HiSilicon, Title: Corrections on HARQ Transmission with ConfiguredGrantTimer in TS 38.321.
R2-1801034 3GPP TSG-RAN WG2 AH, Vancouver, Canada, Jan. 22-26, 2018, Source: Huawei, HiSilicon, Title: Corrections on Retransmission for Configured Grant.
R2-1801035 3GPP TSG-RAN WG2 AH, Vancouver, Canada, Jan. 22-26, 2018, Source: Huawei, HiSilicon, Title: Corrections on calculations of transmission occasions of configured grant.
R2-1801036 3GPP TSG-RAN WG2 AH, Vancouver, Canada, Jan. 22-26, 2018, Source: Huawei, HiSilicon, Title: Further discussion on configuration of ConfiguredGrantTimer.
R2-1801037 3GPP TSG-RAN WG2 AH, Vancouver, Canada, Jan. 22-26, 2018, Source: Huawei, HiSilicon, Title: Corrections on flexible occasion of initial transmission and repetition for configured grant.
R2-1801038 3GPP TSG-RAN WG2 AH, Vancouver, Canada, Jan. 22-26, 2018, Source: Huawei, HiSilicon, Title: Impact of SUL on configured grant.
R2-1801039 3GPP TSG-RAN WG2 AH, Vancouver, Canada, Jan. 22-26, 2018, Source: Huawei, HiSilicon, Title: Configured grant Type1 operation with BWP switch.
R2-1801052 3GPP TSG-RAN WG2 AH, Vancouver, Canada, Jan. 22-26, 2018, Source: LG Electronics Inc., Title: Correction on ConfiguredGrantTimer.
R2-1801063 3GPP TSG-RAN WG2 AH, Vancouver, Canada, Jan. 22-26, 2018, Source: LG Electronics Inc., Title: Repetition transmission on configured uplink grant.
R2-1801081 3GPP TSG-RAN WG2 AH, Vancouver, Canada, Jan. 22-26, 2018, Source: ZTE, Title: Consideration on the configured grant for supporting SUL.
R2-1801125 3GPP TSG-RAN WG2 AH, Vancouver, Canada, Jan. 22-26, 2018, Source: InterDigital Inc., Title: Correction on override of configured assignment by dynamic assignment.
R2-1801126 3GPP TSG-RAN WG2 AH, Vancouver, Canada, Jan. 22-26, 2018, Source: InterDigital Inc., Title: Override of configured grant by dynamic grant in case of URLLC.
R2-1707982 3GPP TSG-RAN2 Meeting #99, Berlin, Germany, Aug. 21-25, 2017, Source: Nokia, Mediatek, Nokia Shanghai Bell, Title: Initial State of PDCP Duplication (Revision of R2-1706545).
R2-1707990 3GPP TSG-RAN2 Meeting #99, Berlin, Germany, Aug. 21-25, 2017, Source: Nokia, Nokia Shanghai Bell, Title: Duplication Impacts to PDCP.

(56) References Cited

OTHER PUBLICATIONS

R2-1708017 3GPP TSG-RAN2 Meeting #99, Berlin, Germany, Aug. 21-25, 2017, Source: Ericsson, Title: Aligned duplication support for DRBs and SRBs.
R2-1708097 3GPP TSG-RAN2 Meeting #99, Berlin, Germany, Aug. 21-25, 2017, Source: MediaTek Inc., Title: Stage-2 aspects of data duplication (Revision of R2-1707260).
R2-1708098 3GPP TSG-RAN2 Meeting #99, Berlin, Germany, Aug. 21-25, 2017, Source: MediaTek Inc., Title: Data duplication in NR (Revision of R2-1707261).
R2-1708329 3GPP TSG-RAN2 Meeting #99, Berlin, Germany, Aug. 21-25, 2017, Source: Ericsson, Title: PDCP and RLC behaviour for PDCP data duplication.
R2-1708333 3GPP TSG-RAN2 Meeting #99, Berlin, Germany, Aug. 21-25, 2017, Source: Ericsson, Title: Packet duplication in CA (Revision of R2-1707172).
R2-1708335 3GPP TSG-RAN2 Meeting #99, Berlin, Germany, Aug. 21-25, 2017, Source: Ericsson, Title: PDCP dynamic link switching.
R2-1708336 3GPP TSG-RAN2 Meeting #99, Berlin, Germany, Aug. 21-25, 2017, Source: Ericsson, Title: PDCP data volume reporting in duplication (Revision of R2-1704370).
R2-1708337 3GPP TSG-RAN2 Meeting #99, Berlin, Germany, Aug. 21-25, 2017, Source: Ericsson, Title: PDCP duplication control related to SCell control.
R2-1708444 3GPP TSG-RAN2 Meeting #99, Berlin, Germany, Aug. 21-25, 2017, Source: Samsung, Title: Discussion on PDCP data volume calculation.
R2-1708489 3GPP TSG-RAN2 Meeting #99, Berlin, Germany, Aug. 21-25, 2017, Source: Vivo, Title: Duplication deactivation due to SCell or BWP deactivation.
R2-1708508 3GPP TSG-RAN2 Meeting #99, Berlin, Germany, Aug. 21-25, 2017, Source: Vivo, Title: Layer-2 behaviors of PDCP duplication activation deactivation.
R2-1708573 3GPP TSG-RAN2 Meeting #99, Berlin, Germany, Aug. 21-25, 2017, Source: Panasonic, Title: Packet duplication during the handover.
R2-1708624 3GPP TSG-RAN2 Meeting #99, Berlin, Germany, Aug. 21-25, 2017, Source: Lenovo, Motorola Mobility, Title: PDCP packet duplication.
R2-1708691 3GPP TSG-RAN2 Meeting #99, Berlin, Germany, Aug. 21-25, 2017, Source: Huawei, HiSilicon, Title: Remaining stage 2 issues for CA duplication and for DC duplication.
R2-1708735 3GPP TSG-RAN2 Meeting #99, Berlin, Germany, Aug. 21-25, 2017, Source: InterDigital Inc., Title: Details of duplication and routing for SRB.
R2-1708821 3GPP TSG-RAN2 Meeting #99, Berlin, Germany, Aug. 21-25, 2017, Source: Intel Corporation, Title: Support of CA packet duplication for RLC AM.
R2-1708862 3GPP TSG-RAN2 Meeting #99, Berlin, Germany, Aug. 21-25, 2017, Source: Fujitsu, Title: Stage 2 TP for RLC AM duplication.
R2-1708950 3GPP TSG-RAN2 Meeting #99, Berlin, Germany, Aug. 21-25, 2017, Source: Qualcomm Incorporated, Title: Further considerations for Packet duplication.
R2-1708951 3GPP TSG-RAN2 Meeting #99, Berlin, Germany, Aug. 21-25, 2017, Source: Qualcomm Incorporated, Title: PDCP duplication.
R2-1709032 3GPP TSG-RAN2 Meeting #99, Berlin, Germany, Aug. 21-25, 2017, Source: Samsung, Title: PDCP Duplication Operations (Revision of R2-177368).
R2-1709036 3GPP TSG-RAN2 Meeting #99, Berlin, Germany, Aug. 21-25, 2017, Source: Samsung, Title: Uplink DRB Duplication.
R2-1709061 3GPP TSG-RAN2 Meeting #99, Berlin, Germany, Aug. 21-25, 2017, Source: LG Electronics Inc., Title: Discussion on the duplicate detection in PDCP.
R2-1709077 3GPP TSG-RAN2 Meeting #99, Berlin, Germany, Aug. 21-25, 2017, Source: ITRI, Title: SCG Failure Case for Duplication SRB.

R2-1709095 3GPP TSG-RAN2 Meeting #99, Berlin, Germany, Aug. 21-25, 2017, Source: LG Electronics Inc., Title: Need for Duplicate RB.
R2-1709100 3GPP TSG-RAN2 Meeting #99, Berlin, Germany, Aug. 21-25, 2017, Source: LG Electronics Inc., Title: Packet duplication in PDCP (Revision of R2-1706870).
R2-1709870 3GPP TSG-RAN2 Meeting #99, Berlin, Germany, Aug. 21-25, 2017, Source: Ericsson, Title: TP on Radio Link Failure for 38.300.
R3-173128 3GPP TSG-RAN2 Meeting #99, Berlin, Germany, Aug. 21-25, 2017, Source: Huawei, Title: PDCP duplication for CU-DU.
R2-1800376 3GPP TSG-RAN WG2 NR Ad Hoc, Vancouver, Canada, Jan. 22-26, 2018, Source: Huawei, HiSilicon, Title: CR on the prioritization between dynamic scheduling and configured scheduling.
R2-1800158 3GPP TSG-RAN WG2 AH, Vancouver, Canada, Jan. 22-26, 2018, Source: OPPO, Title: CR on ConfiguredGrantTimer for C-RNTI based grant.
R2-1800647 3GPP TSG-RAN WG2 AH, Vancouver, Canada, Jan. 22-26, 2018, Source: OPPO, Title: Correction on ConfiguredGrantTimer.
R2-1800710 3GPP TSG-RAN WG2 AH, Vancouver, Canada, Jan. 22-26, 2018, Source: Ericsson, Title: Alignment of terminology for Configured Scheduling and SPS.
R2-1801053 3GPP TSG-RAN WG2 AH, Vancouver, Canada, Jan. 22-26, 2018, Source: LG Electronics Inc., Title: Correction on ConfiguredGrantTimer.
3GPP TS 38.331 V15.0.0 (Dec. 2017), Technical Specification, 3rd Generation Partnership Project; Technical Specification Group Radio Access Network; NR; Radio Resource Control (RRC) Protocol Specification (Release 15).
3GPP TS 38.331 V15.3.0 (Sep. 2018), Technical Specification, 3rd Generation Partnership Project; Technical Specification Group Radio Access Network; NR; Radio Resource Control (RRC) Protocol Specification (Release 15).
3GPP TS 38.463 V0.2.0 (Apr. 2018), Technical Specification, 3rd Generation Partnership Project; Technical Specification Group Radio Access Network; NG-RAN; E1 application protocol (E1AP) (Release 15).
3GPP TS 38.473 V15.0.0 (Dec. 2017), Technical Specification, 3rd Generation Partnership Project; Technical Specification Group Radio Access Network; NG-RAN; F1 application protocol (F1AP) (Release 15).
3GPP TS 38.473 V15.3.0 (Sep. 2018), Technical Specification, 3rd Generation Partnership Project; Technical Specification Group Radio Access Network; NG-RAN; F1 application protocol (F1AP) (Release 15).
R2-1801279 3GPP TSG-RAN WG2 AH, Vancouver, Canada, Jan. 22-26, 2018, Source: LG Electronics Inc., Title: Restart condition of sCellDeactivation Timer with skipping operation.
R2-1712238 3GPP TSG-RAN WG2 Meeting #100, Reno, USA, Nov. 27-Dec. 1, 2017, Source: OPPO, Title: Discussion on Detailed Issues on RLM.
R2-1712276 3GPP TSG-RAN WG2 Meeting #100, Reno, USA, Nov. 27-Dec. 1, 2017, Source: Spreadtrum Communications, Title: Discussions on the IS and OOS Counting Procedure.
R2-1712308 3GPP TSG-RAN WG2 Meeting #100, Reno, USA, Nov. 27-Dec. 1, 2017, Source: TCL, Title: Interaction between PDCP and RLC Entities for duplication in NR-NR DC.
R2-1712435 3GPP TSG-RAN WG2 Meeting #100, Reno, USA, Nov. 27-Dec. 1, 2017, Source: ZTE Corporation, Title: Consideration on PDCP Duplication in NR.
R2-1712559 3GPP TSG-RAN WG2 Meeting #100, Reno, USA, Nov. 27-Dec. 1, 2017, Source: Huawei, HiSilicon, Title: RLF for NR.
R2-1712736 3GPP TSG-RAN WG2 Meeting #100, Reno, USA, Nov. 27-Dec. 1, 2017, Source: Huawei, ASUSTek, HiSilicon, Title: PDCP operation for packet duplication.
R2-1712737 3GPP TSG-RAN WG2 Meeting #100, Reno, USA, Nov. 27-Dec. 1, 2017, Source: Huawei, HiSilicon, Title: PDCP data volume calculation for packet duplication.
R2-1712738 3GPP TSG-RAN WG2 Meeting #100, Reno, USA, Nov. 27-Dec. 1, 2017, Source: Huawei, HiSilicon, Title: Clarification on bearer type for packet duplication.

(56) References Cited

OTHER PUBLICATIONS

R2-1712739 3GPP TSG-RAN WG2 Meeting #100, Reno, USA, Nov. 27-Dec. 1, 2017, Source: Huawei, HiSilicon, Title: Enhancements for DL packet duplication.
R2-1712753 3GPP TSG-RAN WG2 Meeting #100, Reno, USA, Nov. 27-Dec. 1, 2017, Source: vivo, Title: RLM/RLF in NR.
R3-181850 3GPP TSG RAN WG3 Meeting #99bis, Sanya, China, Apr. 16-20, 2018, Source: Nokia, Nokia Shanghai Bell, Title: Signalling transport for E1.
R3-181893 3GPP TSG RAN WG3 Meeting #99bis, Sanya, China, Apr. 16-20, 2018, Source: LG Electronics, KT Corp., Title: Procedures for Security Support in CU-CP/UP Separation.
R3-182056 3GPP TSG RAN WG3 Meeting #99bis, Sanya, China, Apr. 16-20, 2018, Source: LG Electronics, KT Corp., Title: Discussion on Bearer Context Modification.
R3-182078 3GPP TSG RAN WG3 Meeting #99bis, Sanya, China, Apr. 16-20, 2018, Source: Samsung, Title: E1 Interface management procedures.
R3-182079 3GPP TSG RAN WG3 Meeting #99bis, Sanya, China, Apr. 16-20, 2018, Source: Samsung, Title: CU-UP Security Capability indication to CU-CP.
R3-182080 3GPP TSG RAN WG3 Meeting #99bis, Sanya, China, Apr. 16-20, 2018, Source: Samsung, Title: TP for TS 38.463 on E1 interface management.
R3-182081 3GPP TSG RAN WG3 Meeting #99bis, Sanya, China, Apr. 16-20, 2018, Source: Samsung, Title: Additional UE-associated E1 procedures.
R3-182082 3GPP TSG RAN WG3 Meeting #99bis, Sanya, China, Apr. 16-20, 2018, Source: Samsung, Title: TP for TS 38.463 on additional UE-associated E1 procedures.
R3-182109 3GPP TSG RAN WG3 Meeting #99bis, Sanya, China, Apr. 16-20, 2018, Source: Huawei, Title: Initial TPs to 38.462.
R3-182110 3GPP TSG RAN WG3 Meeting #99bis, Sanya, China, Apr. 16-20, 2018, Source: Huawei, Title: Rapporteur editorial updates to 38.462.
R3-182129 3GPP TSG RAN WG3 Meeting #99bis, Sanya, China, Apr. 16-20, 2018, Source: Huawei, Title: Inactivity monitoring in CP/UP separation.
R3-182130 3GPP TSG RAN WG3 Meeting #99bis, Sanya, China, Apr. 16-20, 2018, Source: Huawei, Title: (TP for NR BL CR for TS 38.401) On RRC state transition for CP-UP separation.
R3-182131 3GPP TSG RAN WG3 Meeting #99bis, Sanya, China, Apr. 16-20, 2018, Source: Huawei, Title: Data Forwarding in CP/UP separation.
R3-182132 3GPP TSG RAN WG3 Meeting #99bis, Sanya, China, Apr. 16-20, 2018, Source: Huawei, Title: pCR to 38.460 on QoS handling over E1.
R3-182134 3GPP TSG RAN WG3 Meeting #99bis, Sanya, China, Apr. 16-20, 2018, Source: Huawei, Title: pCR to 38.460 on secondary node modification triggered by gNB-CU-CP.
R3-182136 3GPP TSG RAN WG3 Meeting #99bis, Sanya, China, Apr. 16-20, 2018, Source: Huawei, Title: pCR to 38.460 on centralized retransmission for CP-UP separation.
R3-182224 3GPP TSG RAN WG3 Meeting #99bis, Sanya, China, Apr. 16-20, 2018, Source: Ericsson, Title: E1 support for RRC-inactive.
R3-182225 3GPP TSG RAN WG3 Meeting #99bis, Sanya, China, Apr. 16-20, 2018, Source: Ericsson, Title: Dual-connectivity configuration over E1.
R3-182226 3GPP TSG RAN WG3 Meeting #99bis, Sanya, China, Apr. 16-20, 2018, Source: Ericsson, Title: Potentials of RAN UP network function virtualization.
R3-182227 3GPP TSG RAN WG3 Meeting #99bis, Sanya, China, Apr. 16-20, 2018, Source: Ericsson, Title: PDCP duplication configuration.
R3-182228 3GPP TSG RAN WG3 Meeting #99bis, Sanya, China, Apr. 16-20, 2018, Source: Ericsson, Vodafone, KT, AT&T, Title: Support of RAN UP network function virtualization at handover.
R3-182229 3GPP TSG RAN WG3 Meeting #99bis, Sanya, China, Apr. 16-20, 2018, Source: Ericsson, Title: Support of RAN UP network function virtualization at handover—for 38.300.
R3-182230 3GPP TSG RAN WG3 Meeting #99bis, Sanya, China, Apr. 16-20, 2018, Source: Ericsson, Title: Support of RAN UP network function virtualization at handover—for 38.413.
R3-182231 3GPP TSG RAN WG3 Meeting #99bis, Sanya, China, Apr. 16-20, 2018, Source: Ericsson, Title: Support of RAN UP network function virtualization at handover—for 38.423.
R3-182232 3GPP TSG RAN WG3 Meeting #99bis, Sanya, China, Apr. 16-20, 2018, Source: Ericsson, Title: Support of RAN UP network function virtualization at handover—for 36.300.
R3-182233 3GPP TSG RAN WG3 Meeting #99bis, Sanya, China, Apr. 16-20, 2018, Source: Ericsson, Title: Bearer Context definition.
R3-182234 3GPP TSG RAN WG3 Meeting #99bis, Sanya, China, Apr. 16-20, 2018, Source: Ericsson, Title: Resolve FFS in procedures in TS 38.401.
R3-182235 3GPP TSG RAN WG3 Meeting #99bis, Sanya, China, Apr. 16-20, 2018, Source: Ericsson, Title: Multiple TNL associations over E1.
R3-182237 3GPP TSG RAN WG3 Meeting #99bis, Sanya, China, Apr. 16-20, 2018, Source: Ericsson, Title: E1 Setup procedure.
R3-182238 3GPP TSG RAN WG3 Meeting #99bis, Sanya, China, Apr. 16-20, 2018, Source: Ericsson, Title: E1 Reset procedure.
R3-182239 3GPP TSG RAN WG3 Meeting #99bis, Sanya, China, Apr. 16-20, 2018, Source: Ericsson, Title: E1 Release procedure.
R3-182240 3GPP TSG RAN WG3 Meeting #99bis, Sanya, China, Apr. 16-20, 2018, Source: Ericsson, Title: E1 Error Indication.
R3-182241 3GPP TSG RAN WG3 Meeting #99bis, Sanya, China, Apr. 16-20, 2018, Source: Ericsson, Title: Bearer Context Modification procedure.
R3-182242 3GPP TSG RAN WG3 Meeting #99bis, Sanya, China, Apr. 16-20, 2018, Source: Ericsson, Title: E1 Configuration Update.
R3-182243 3GPP TSG RAN WG3 Meeting #99bis, Sanya, China, Apr. 16-20, 2018, Source: Ericsson, Title: Bearer Context Setup procedure.
R2-1713898 3GPP TSG-RAN WG2 Meeting #100, Reno, USA, Nov. 27-Dec. 1, 2017, Source: Samsung, Title: RLM RS type and L3 parameter differentiation.
Dec. 2, 2019—European Extended Search Report—EP 19173901.0.
R3-183279 3GPP TSG-RAN2 Meeting #100, Busan, Korea, May 21-25, 2019, Source: Huawei, Title: pCR to 38.460 on indication of PDCP duplication over E1 interface.
Feb. 15, 2021—European Office Action—EP 19151430.6.
Jul. 22, 2022—European Search Report—EP App. No. 21211438.3.
R3-174899 3GPP TSG-RAN WG3 Meeting #98, Reno, USA, Nov. 27-Dec. 1, 2017, Source: Nokia, Nokia Shanghai Bell, Title: TP of UE Context Modification.
R3-172202 3GPP TSG RAN WG3 Meeting #NR Ad-Hoc, Qingdao, China, Jun. 27-29, 2017, Source: Huawei, Title: Fast retransmission of lost PDUs.
R3-174590 3GPP TSG-RAN WG3 Meeting #98, Reno, USA, Nov. 27-Dec. 1, 2017, Source: NTT Docomo, Inc., Nokia, Nokia Shanghai Bell, Title: RLC failure indication over F1.

\* cited by examiner

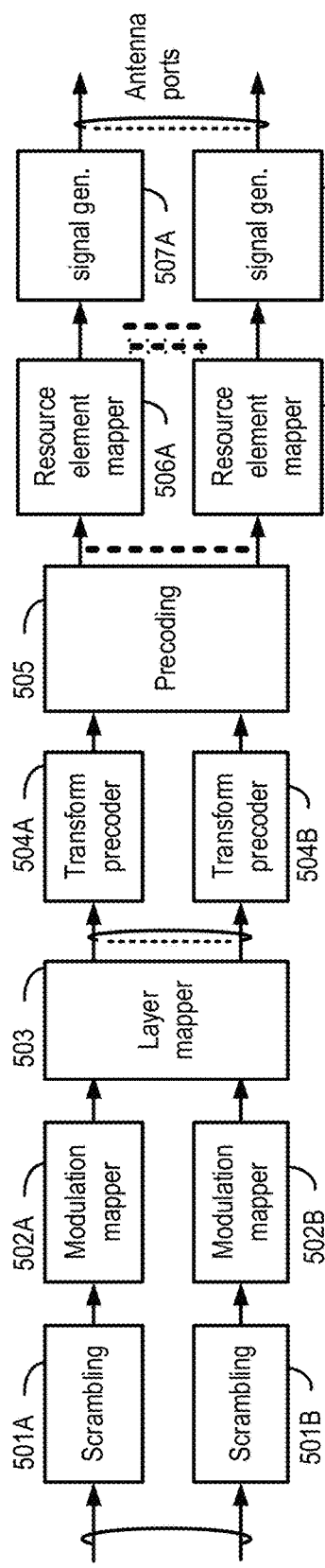
FIG. 5A Example uplink physical channel
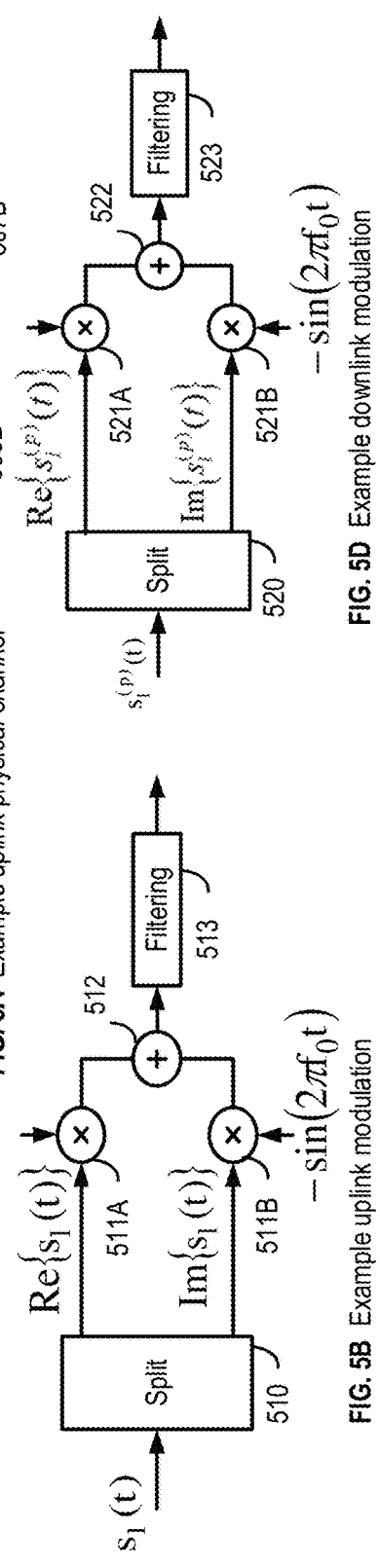
FIG. 5B Example uplink modulation
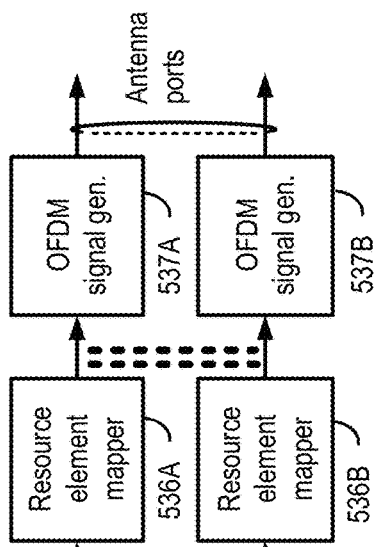
FIG. 5D Example downlink modulation
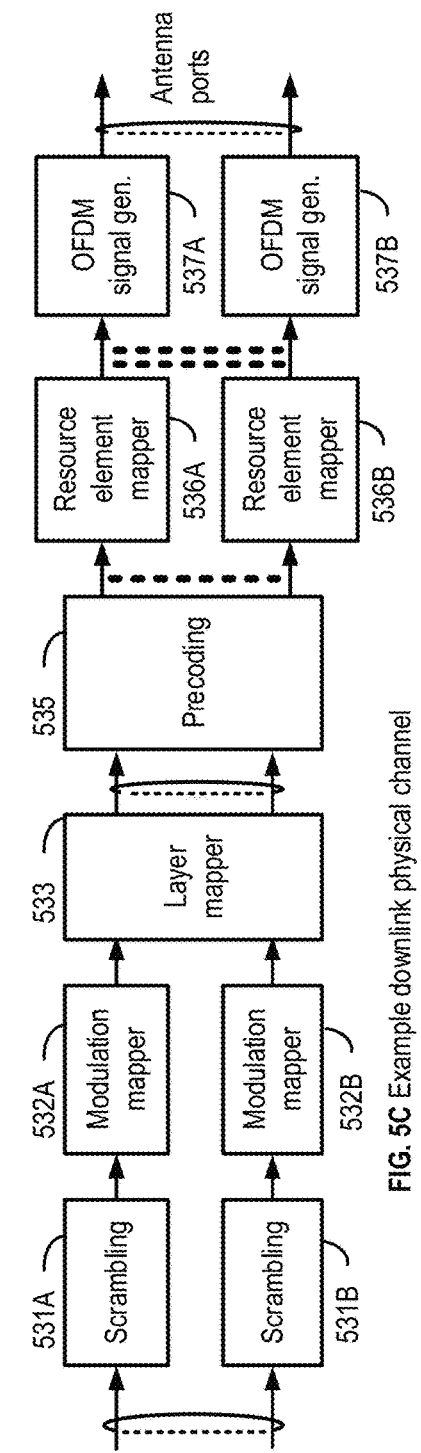
FIG. 5C Example downlink physical channel Example 1:
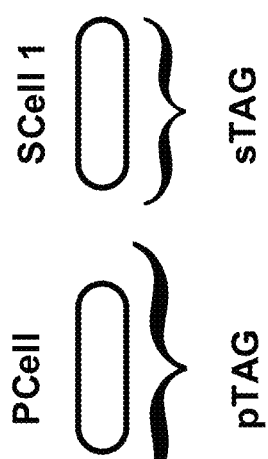
Example 2:
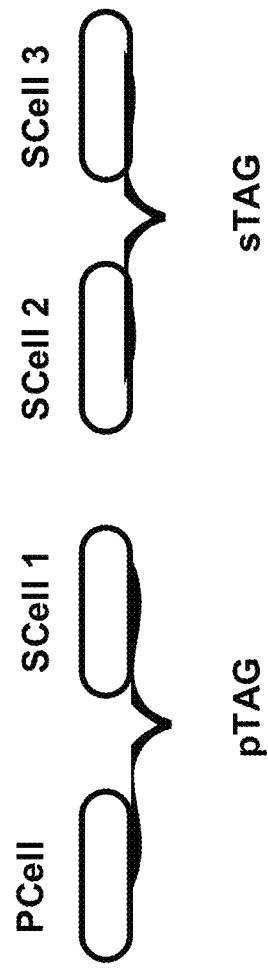
Example 3:
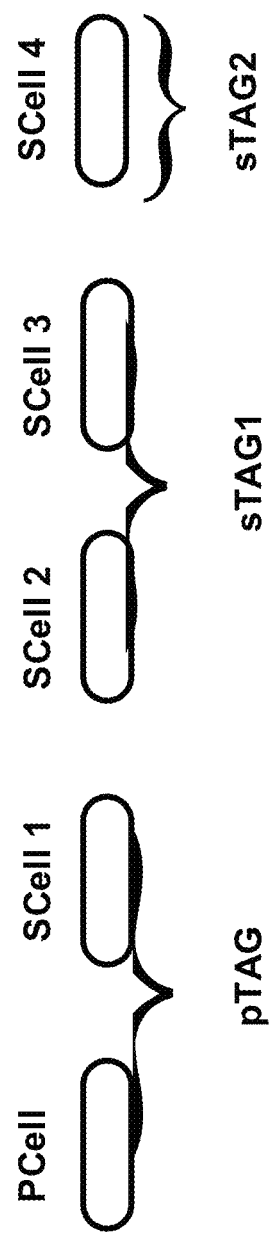
FIG. 8

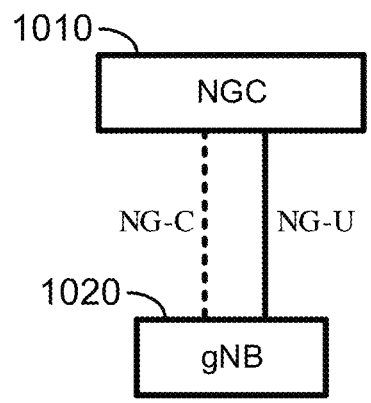
FIG. 10A gNB connected to NGC
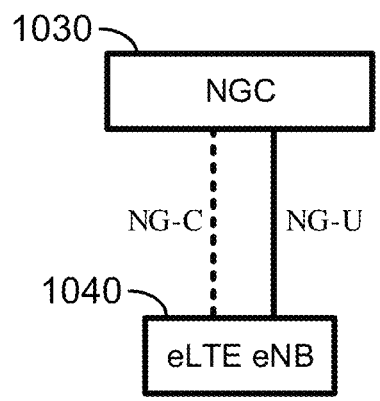
FIG. 10B eLTE eNB connected to NGC

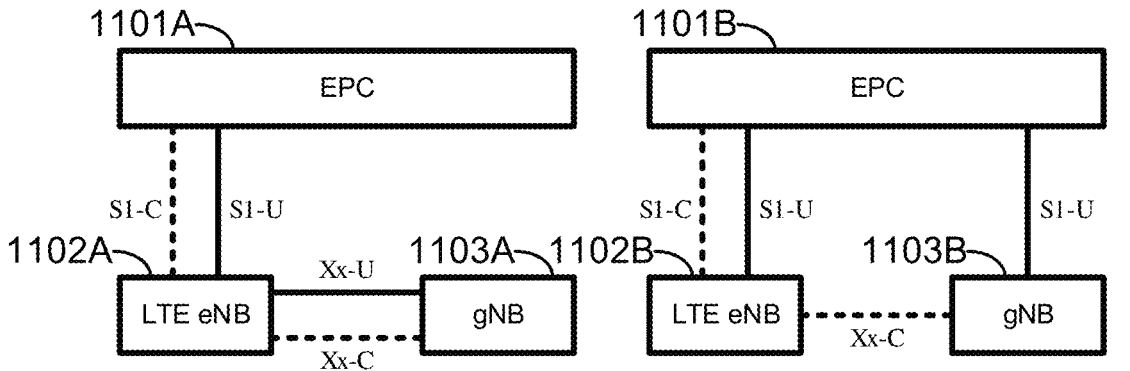

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

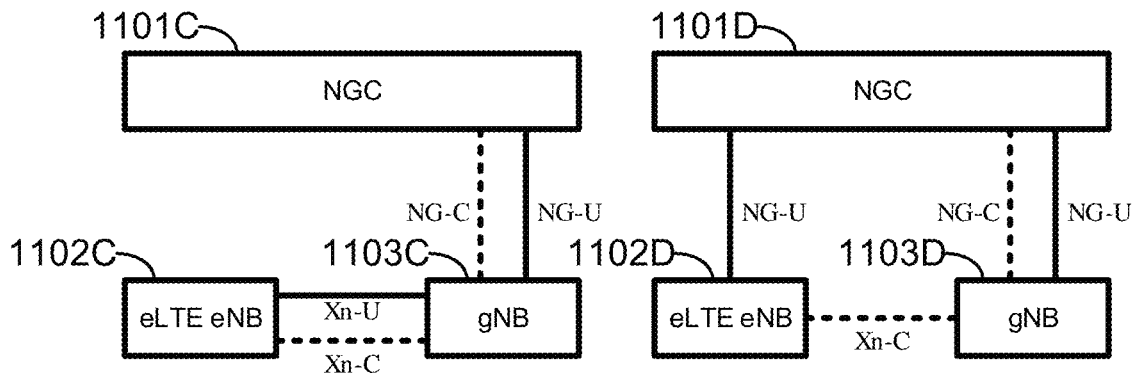

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

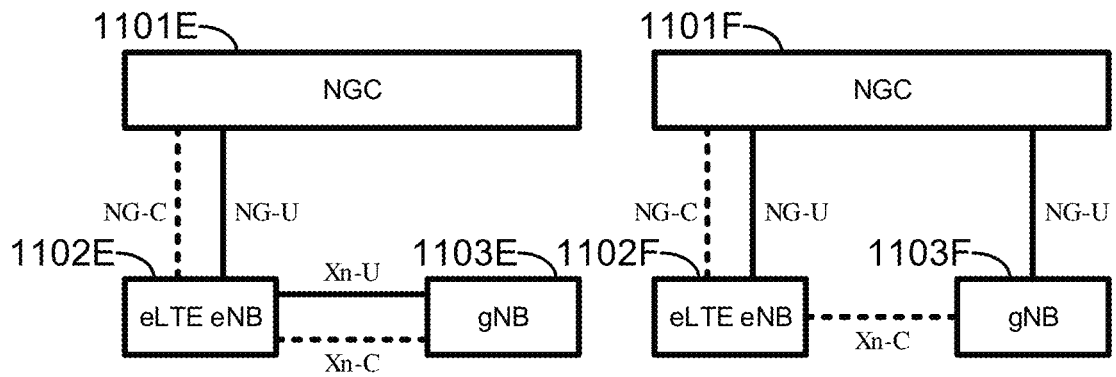

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

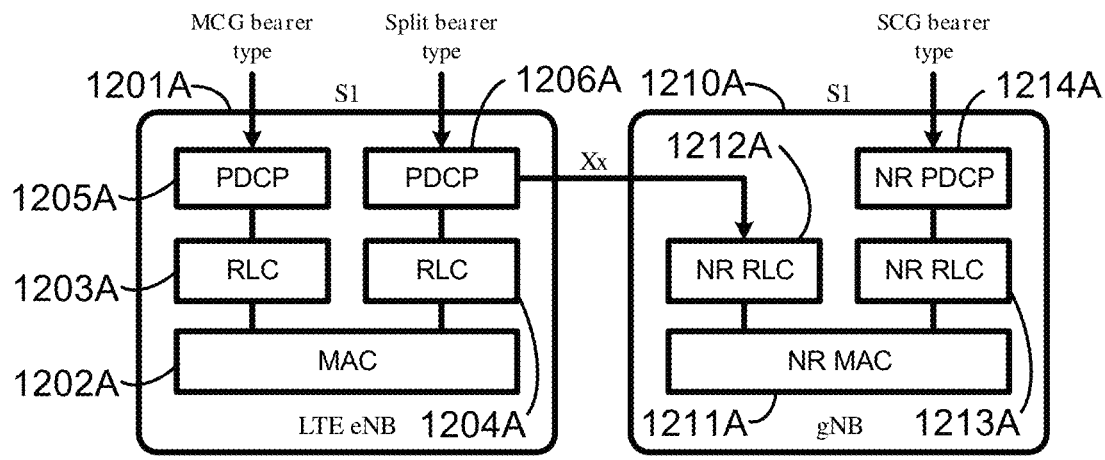
FIG. 12A Radio protocol architecture for split bearer and SCG bearer. LTE eNB connected to EPC with non-standalone gNB.
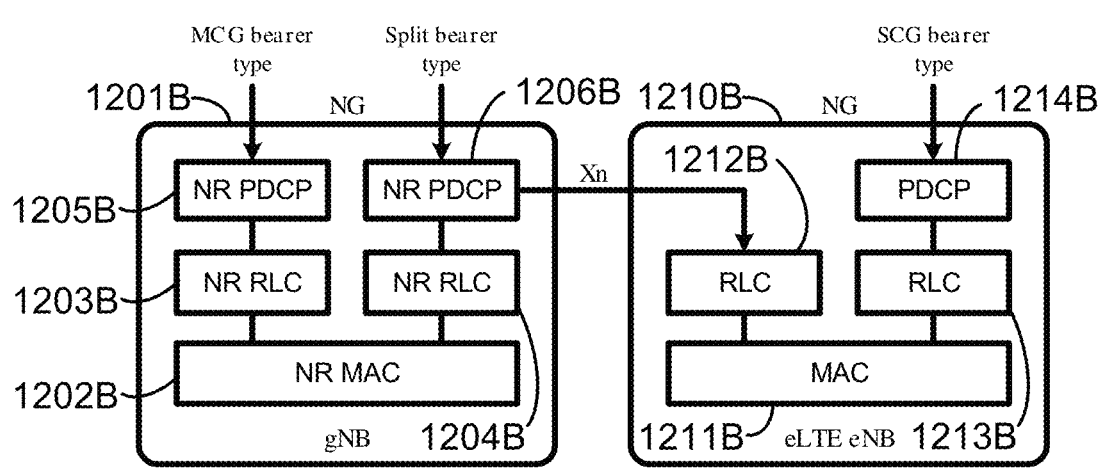
FIG. 12B Radio protocol architecture for split bearer and SCG bearer. gNB connected to NGC with non-standalone eLTE eNB.
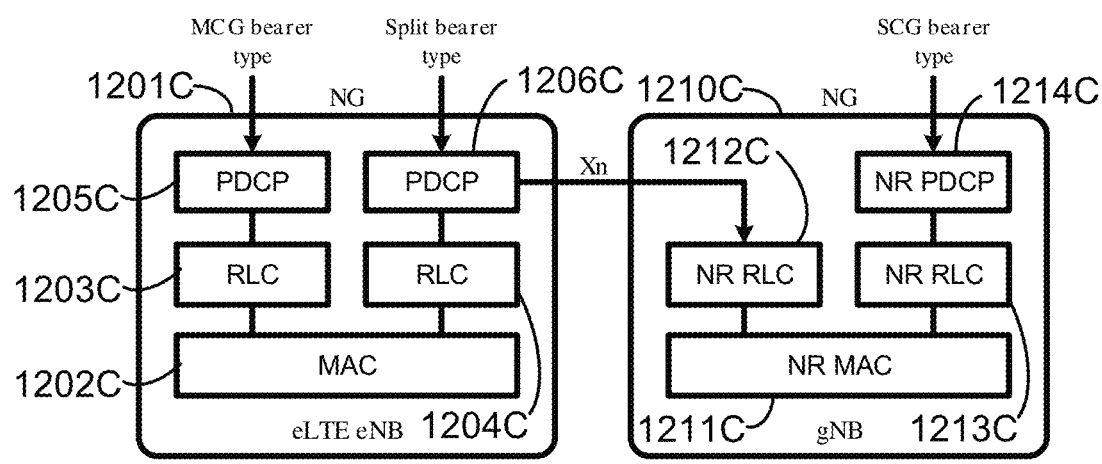
FIG. 12C Radio protocol architecture for split bearer and SCG bearer. eLTE eNB connected to NGC with non-standalone gNB.

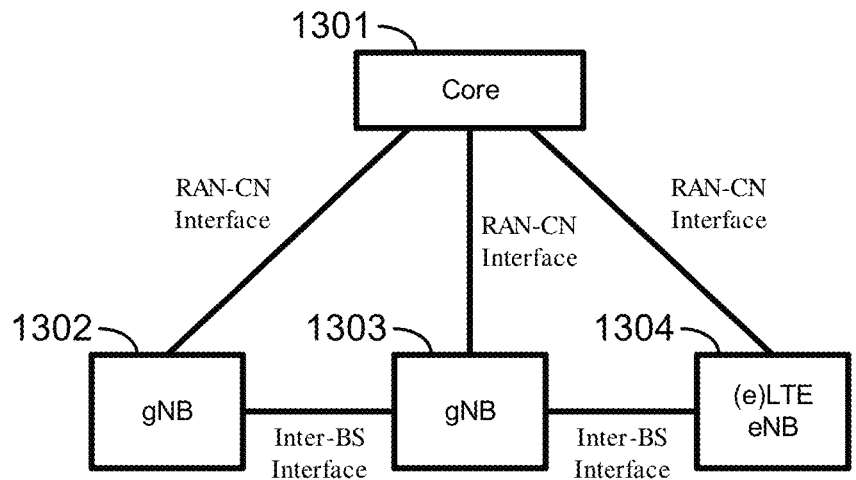
FIG. 13A Non-centralized deployment
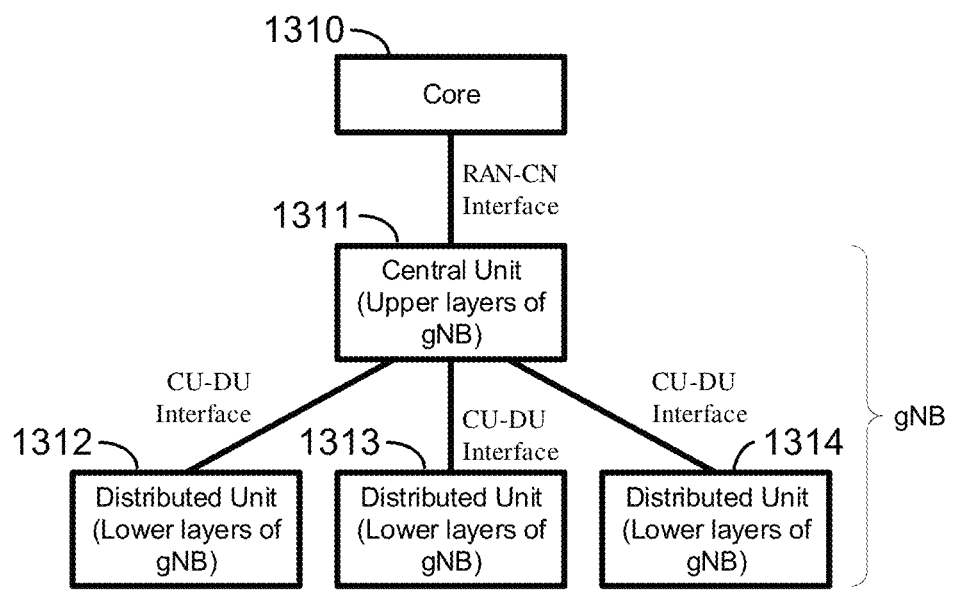
FIG. 13B Centralized deployment

CONNECTION FAILURE REPORTING

CROSS-REFERENCE TO RELATED APPLICATIONS

This application claims the benefit of U.S. Provisional Application No. 62/616,388, titled "Radio Link Failure Report Via F1 Interface" and filed on Jan. 11, 2018, the disclosure of which is hereby incorporated by reference in its entirety.

BACKGROUND

Connection or other failures may occur during wireless communications. An insufficient response to a connection failure may decrease the reliability of a wireless device. It is desired to improve wireless communications by improving responses to failures without adversely increasing signaling overhead and/or decreasing spectral efficiency.

SUMMARY

The following summary presents a simplified summary of certain features. The summary is not an extensive overview and is not intended to identify key or critical elements.

Systems, apparatuses, and methods are described for connection failure reporting in wireless communications. A base station distributed unit may receive and forward to a base station central unit one or more first messages comprising connection failure information. The base station central unit may evaluate the one or more first messages to identify the connection failure information that may be associated with the base station distributed unit (e.g., such as a connection failure between a wireless device and the base station distributed unit). The base station central unit may send, to the base station distributed unit, the connection failure information in one or more second messages. Based on the received connection failure information, the base station distributed unit may determine updated cell parameters to reduce the likelihood of future connection failures.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 8 shows example timing advance group (TAG) configurations.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment.

DETAILED DESCRIPTION

Figure 1:
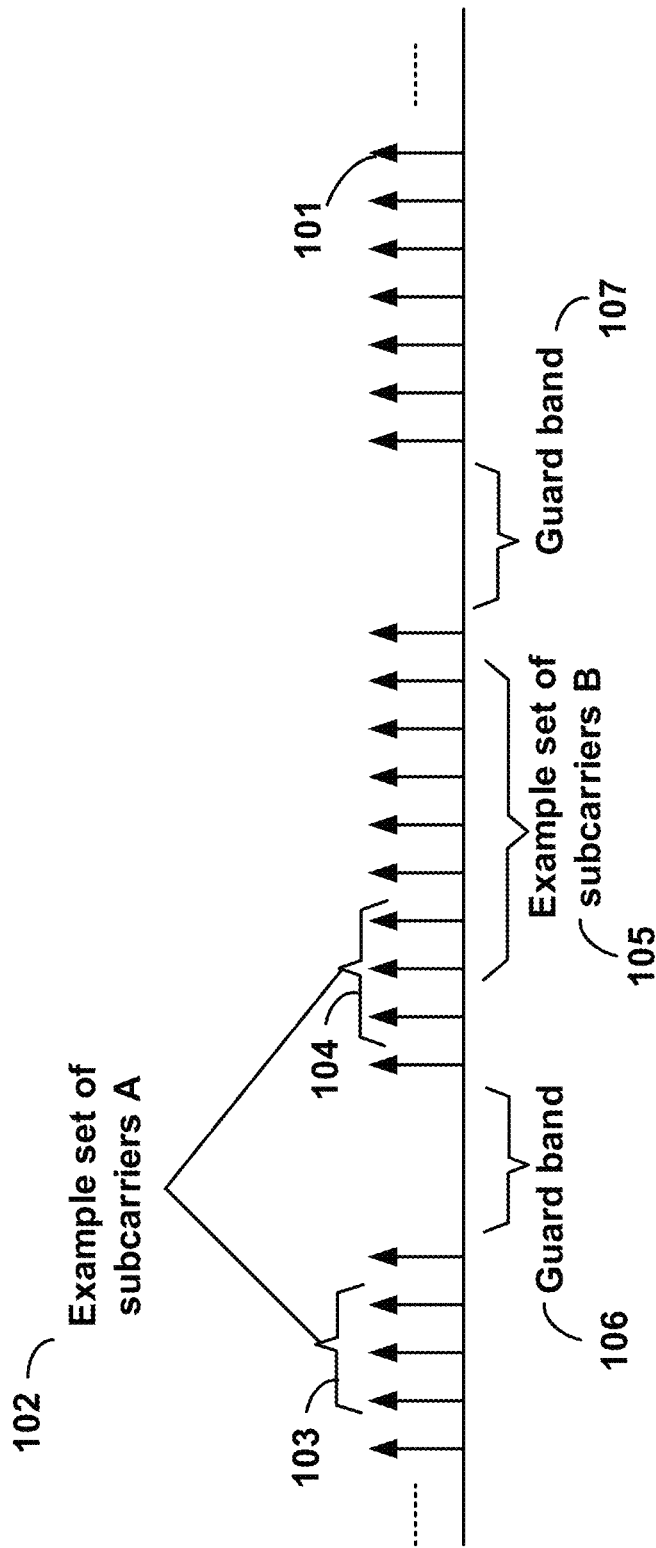
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

The features described herein may enable operation of carrier aggregation and may be used in the technical field of multicarrier communication systems. Examples may relate to connection failures in multicarrier communication systems.

The following acronyms are used throughout the present disclosure, provided below for convenience although other acronyms may be introduced in the detailed description:

3GPP 3rd Generation Partnership Project
5G 5th generation wireless systems
5GC 5G Core Network
ACK Acknowledgement
AMF Access and Mobility Management Function
ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DFTS-OFDM discrete Fourier transform spreading OFDM DL downlink
DU distributed unit
eLTE enhanced LTE
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be used for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
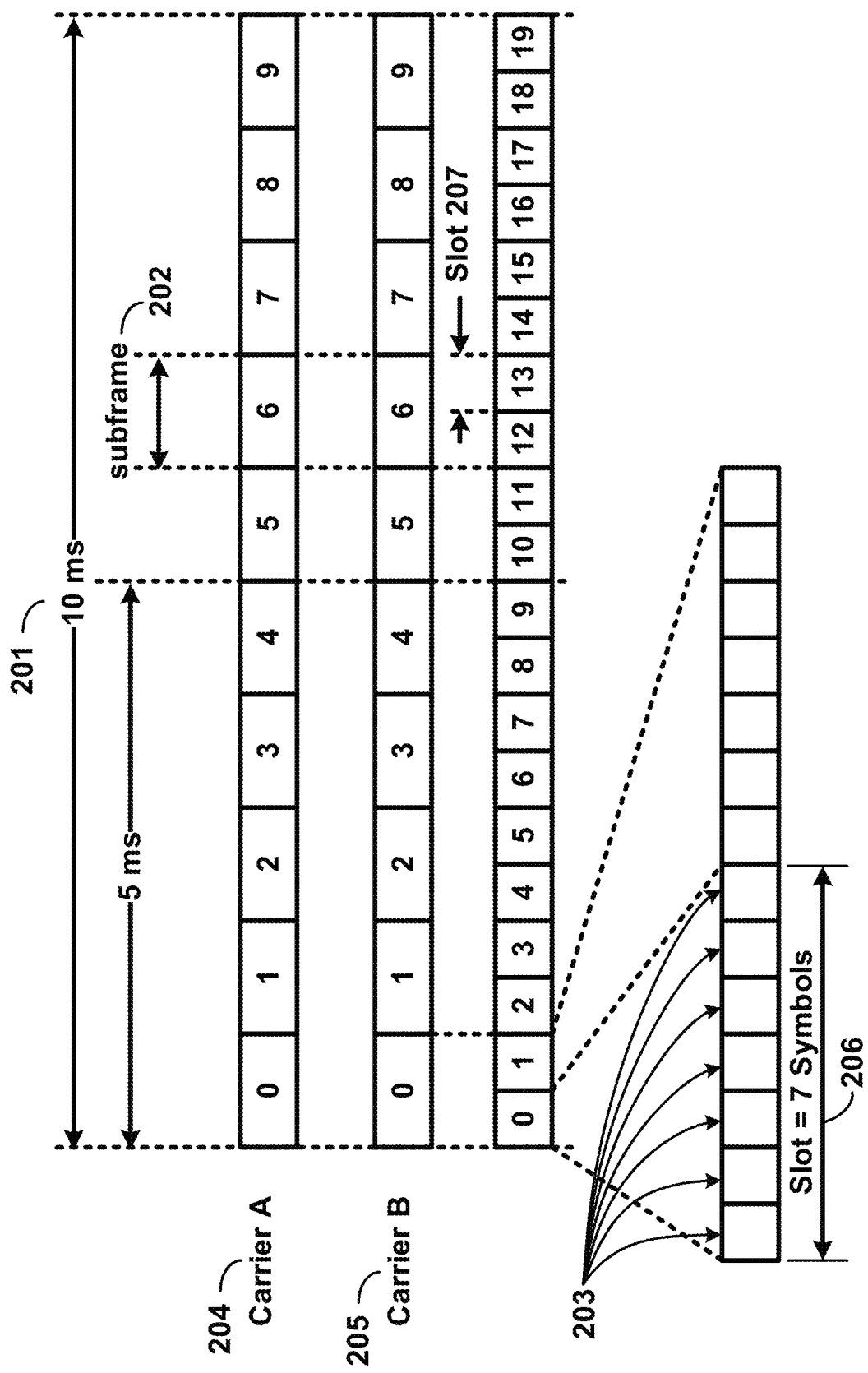
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. Each 10 msec radio frame 201 may be divided into ten equally sized subframes 202. Other subframe durations such as including 0.5 msec, 1 msec, 2 msec, and 5 msec may also be supported. Subframe(s) may comprise two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, for example, data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
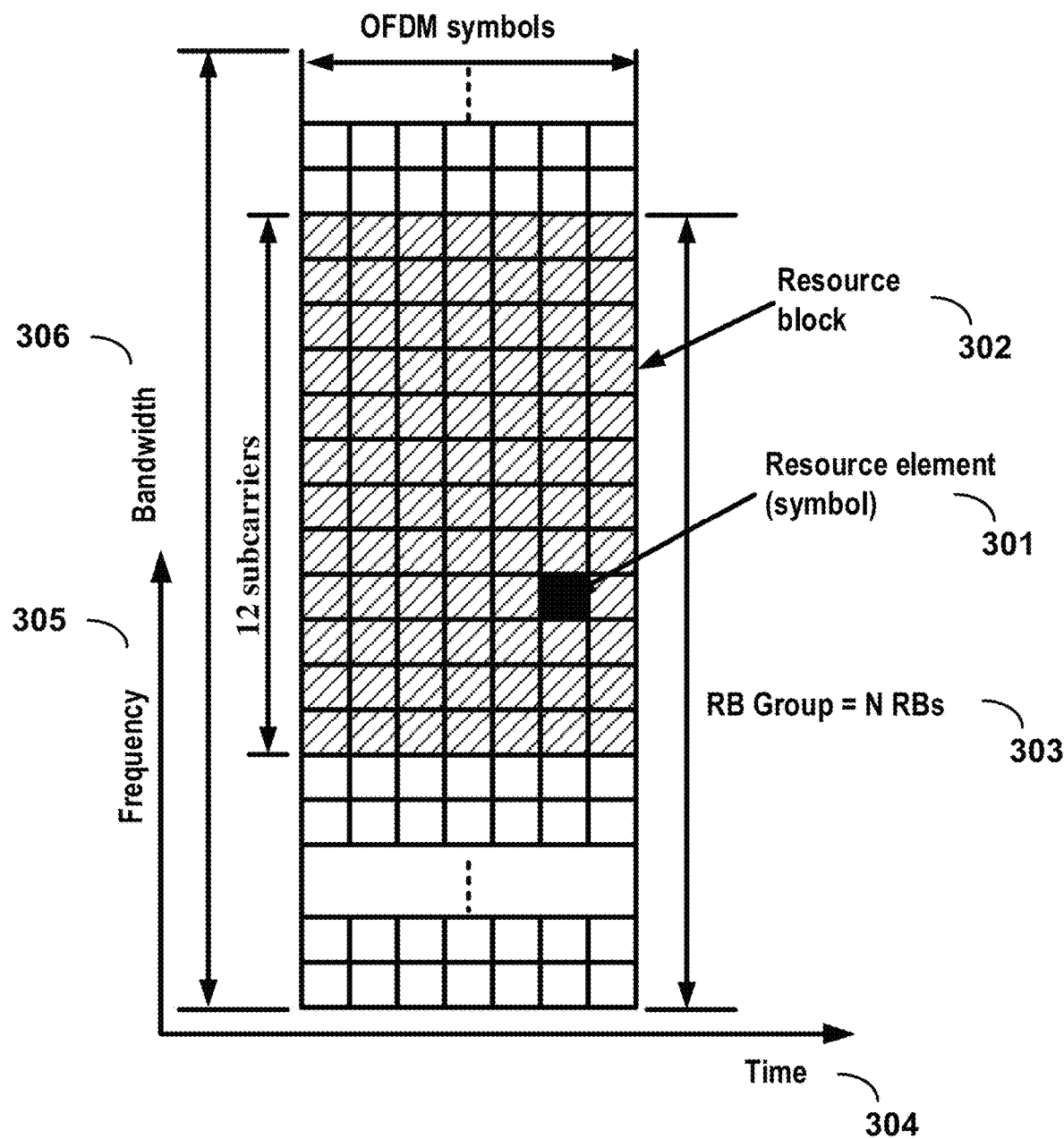
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
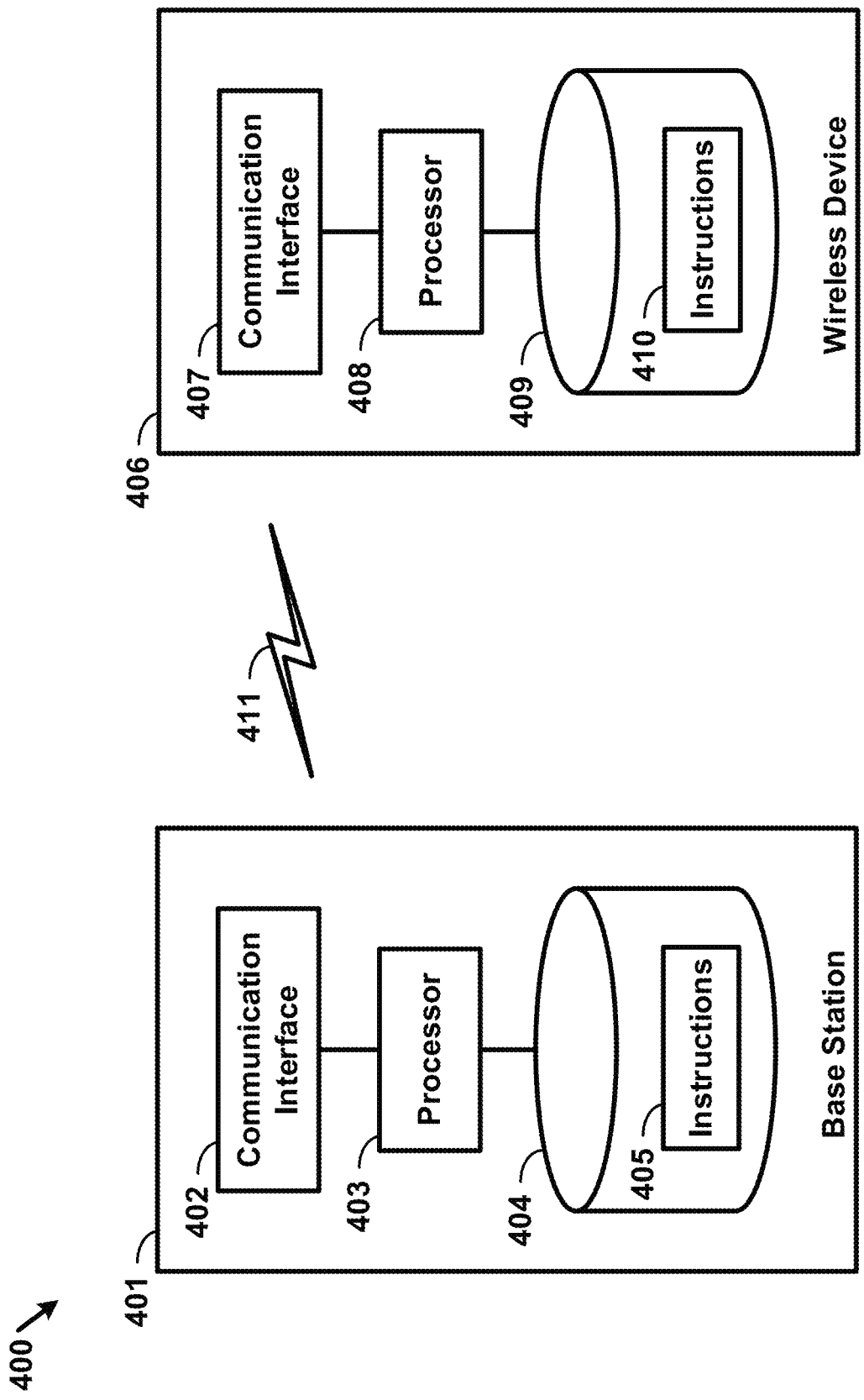
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). Transceivers, which may comprise both a transmitter and receiver, may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_I-NACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, for example, packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. The hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A network (e.g., a 5G network) may include a multitude of base stations, providing a user plane NR PDCP/NR RLC/NR MAC/NR PHY and control plane (e.g., NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may equally mean that the cell comprising the first carrier is activated.

A device may be configured to operate as needed by freely combining any of the example features described herein. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. If the one or more criteria are met, various example embodiments may be satisfied. Therefore, it may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, for example, after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may perform the following processes, which may be performed by the structures described below. These structures and corresponding functions are shown as examples, and it is anticipated that other mechanisms may be implemented in various examples. The structures and corresponding functions may comprise, for example, one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-FDMA baseband signal, for example, for each antenna port and/or for the complex-valued physical random access channel (PRACH) baseband signal. For example, the baseband signal, represented as $s_1(t)$, may be split, by a signal splitter 510, into real and imaginary components, $\text{Re}\{s_1(t)\}$ and $\text{Im}\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may perform the following processes, which may be performed by structures described below. These structures and corresponding functions are shown as examples, and it is anticipated that other mechanisms may be implemented in various examples. The structures and corresponding functions may comprise, for example, one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_1^{(p)}(t)$, may be split, by a signal splitter 520, into real and imaginary components, $\text{Re}\{s_1^{(p)}(t)\}$ and $\text{Im}\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
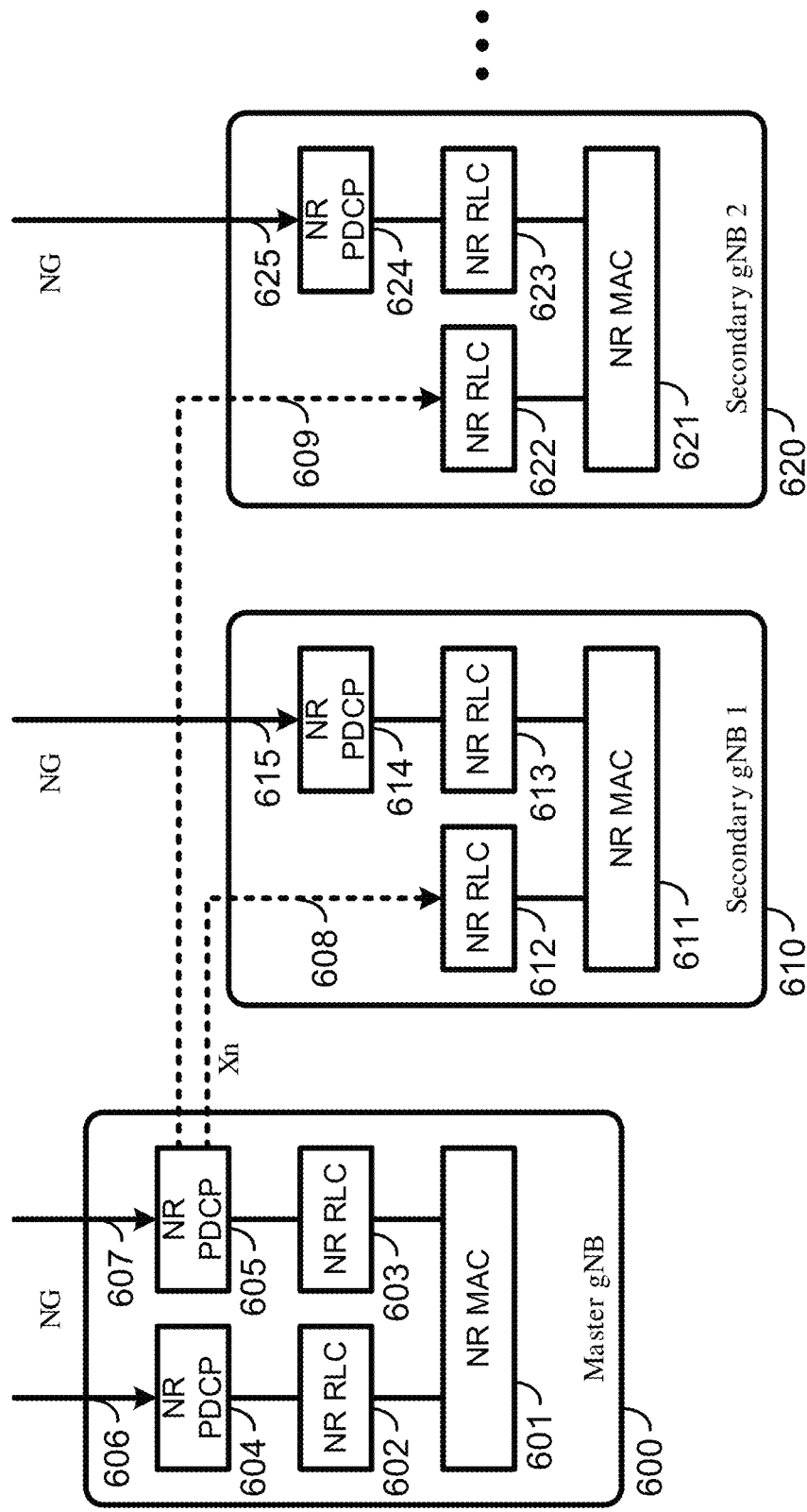
FIG. 6 shows an example protocol structure with multi-connectivity.
Figure 7:
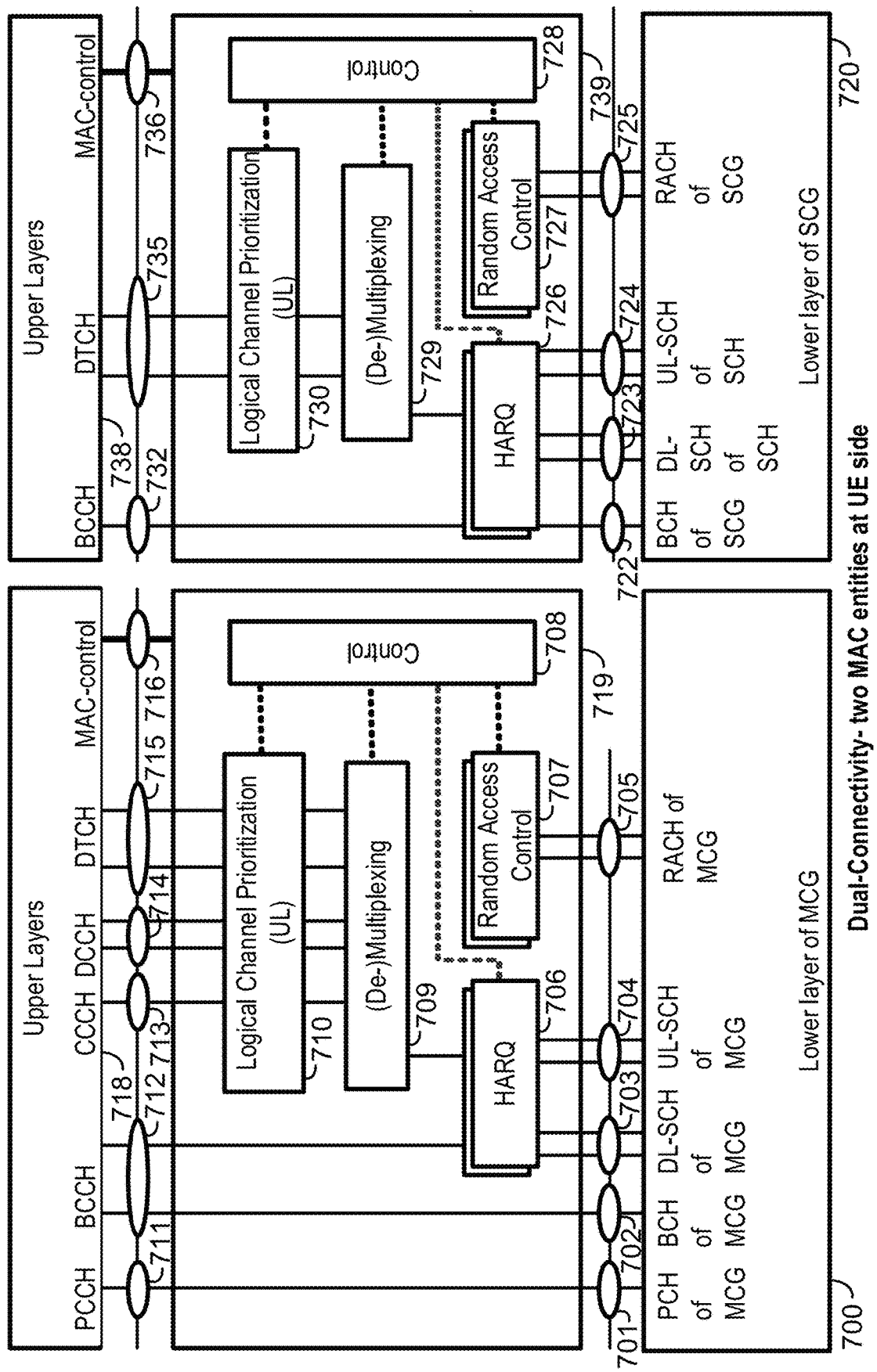
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, for example, if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, for example, named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, for example, for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, for example, a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, for example, one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, for example, a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, for example, a BCH 722, a DL-SCH 723, an UL-SCH 724, and a RACH 725. The one or more intermediate layers of the SCG 739 may comprise, for example, one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, for example, a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
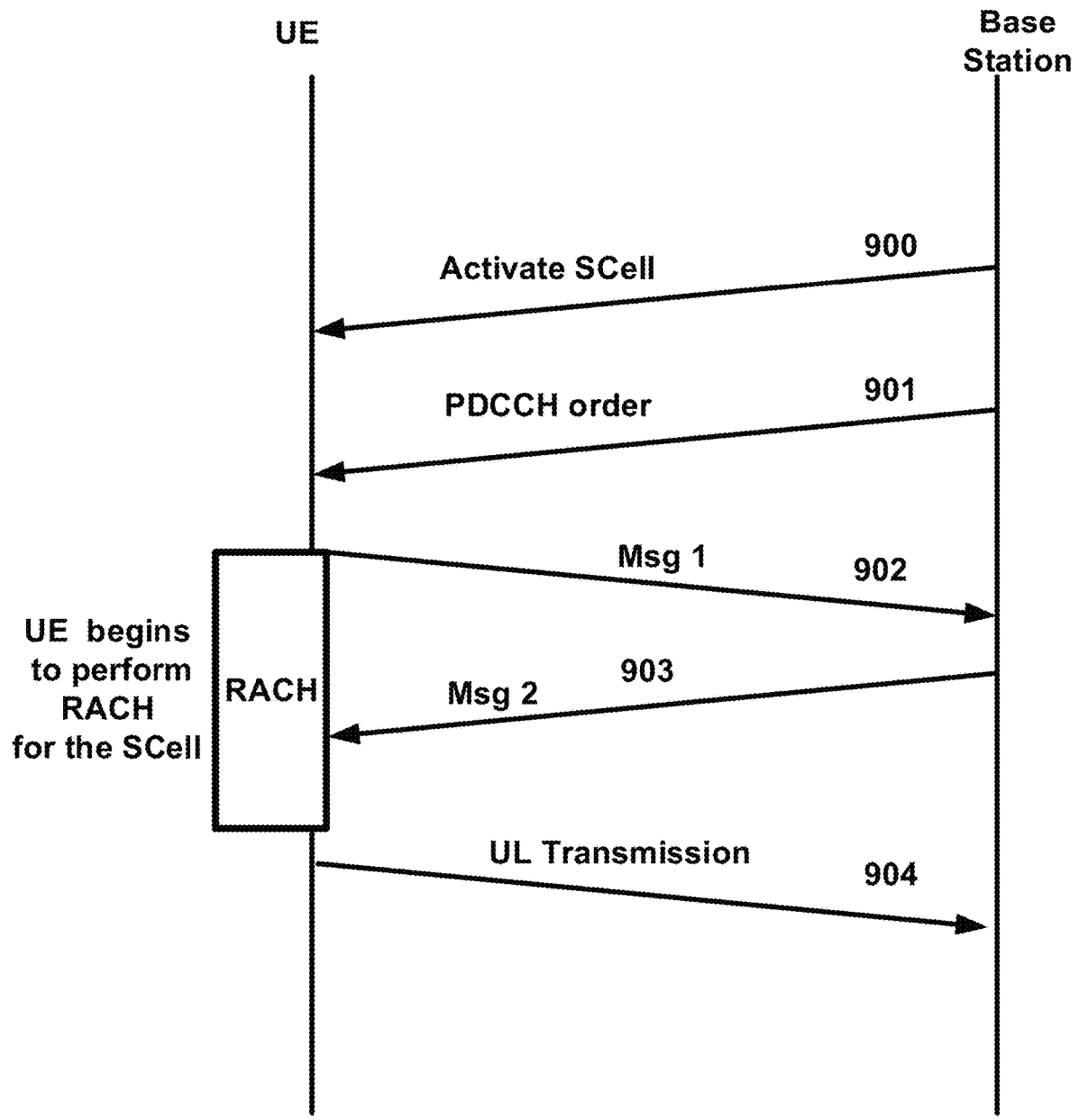
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted, for example, after the activation command 900. The wireless device may begin to perform a RACH process for the SCell, which may be initiated, for example, after receiving the PDDCH order 901. A wireless device may transmit to the base station (e.g., as part of a RACH process) a preamble 902 (e.g., Msg1), such as a random access preamble (RAP). The preamble 902 may be transmitted after or in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be after or in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, for example, after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Timing alignment (e.g., initial timing alignment) for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, for example, by releasing the SCell and configuring the SCell as a part of the pTAG. If, for example, an SCell is added or configured without a TAG index, the SCell may be explicitly assigned to the pTAG. The PCell may not change its TA group and may be a member of the pTAG.

The purpose of an RRC connection reconfiguration procedure may be to modify an RRC connection, (e.g., to establish, modify and/or release RBs, to perform handover, to setup, modify, and/or release measurements, to add, modify, and/or release SCells). If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increases, and as the number of aggregated carriers increases, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cells within a group may be configured with a PUCCH. One SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, for example, timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

A timer may be considered to be running after it is started, until it is stopped, or until it expires; otherwise it may be considered to not be running A timer can be started if it is not running or restarted if it is running. For example, a timer may be started or restarted from its initial value.

Features described herein may enable operation of multi-carrier communications. Features may comprise a non-transitory tangible computer readable media comprising instructions executable by one or more processors to cause operation of multi-carrier communications. The features may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The devices herein may include processors, memory, interfaces, and/or the like. Features may comprise communication networks comprising devices such as base stations, wireless devices (or user equipment: UE), servers, switches, antennas, and/or the like.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, for example, the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, for example, the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, for example, to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, for example, to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, for example, to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, for example, an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, for example, a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, for example, with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, for example, received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, for example, for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, for example, for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
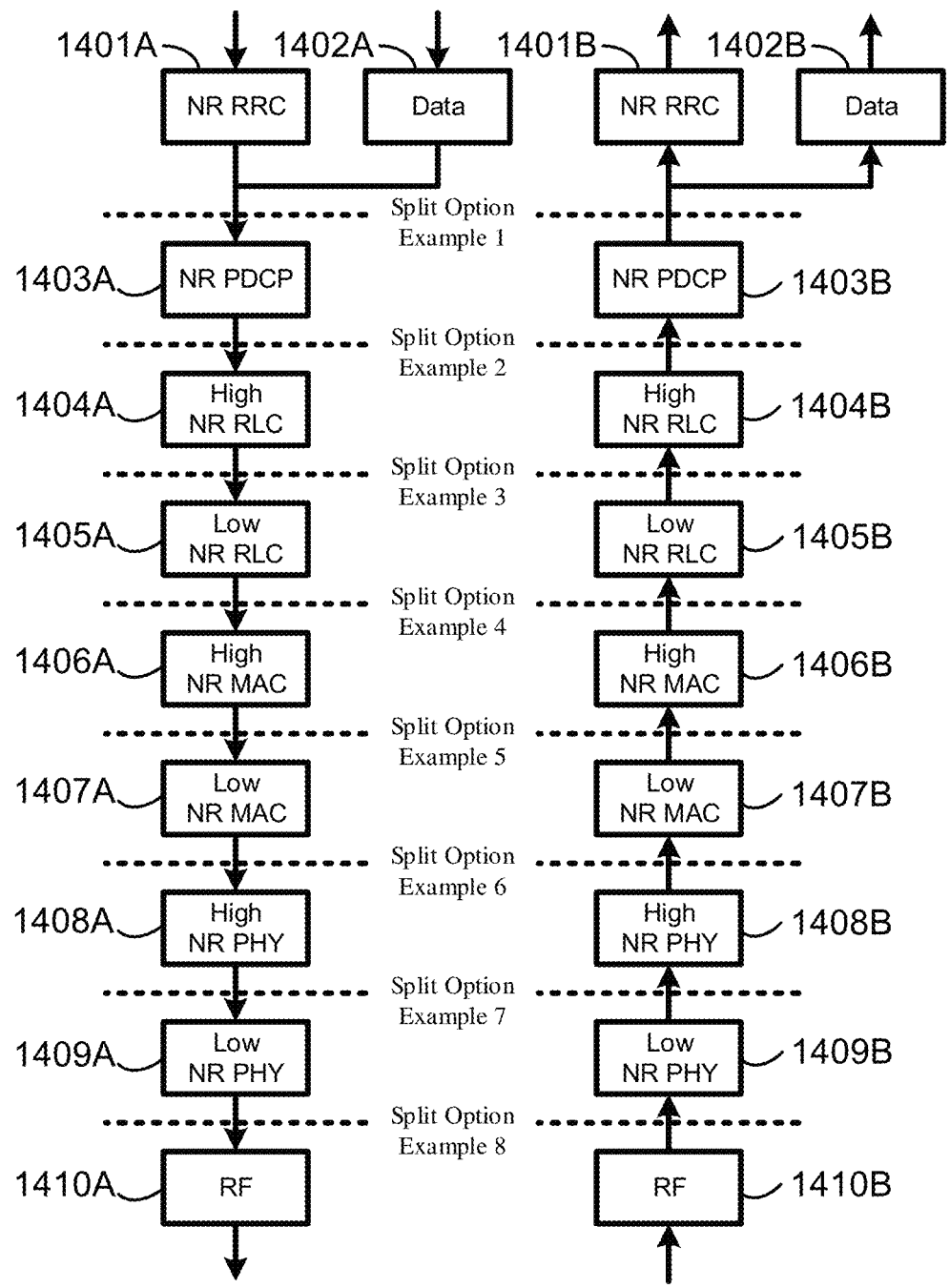
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, for example, either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, for example, by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing, and each user/device accesses an increasing number and variety of services, for example, video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, for example, to help address the traffic explosion in some examples, such as hotspot areas. Licensed Assisted Access (LAA) offers an alternative for operators to make use of unlicensed spectrum, for example, if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, for example, via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, for example, in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, for example, LAA may employ a mechanism to adaptively change (e.g., lower or increase) the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. Category 2 (e.g., LBT without random back-off) may be implemented. The duration of time that the channel is sensed to be idle before the transmitting entity transmits may be deterministic. Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, for example, before the transmitting entity transmits on the channel. Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, for example, before the transmitting entity transmits on the channel.

LAA may employ uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

LAA may use uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, for example, with no transmission immediately before or after from the same node on the same CC. An UL transmission burst from a wireless device perspective may be a continuous transmission from a wireless device, for example, with no transmission immediately before or after from the same wireless device on the same CC. A UL transmission burst may be defined from a wireless device perspective or from a base station perspective. If a base station is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

A base station central unit (CU) (e.g., gNB-CU) may send, to a base station distributed unit (DU) (e.g., gNB-DU), one or more elements of a radio link failure (RLF) report.

The base station CU may receive the RLF report from a wireless device (e.g., via the base station DU). The base station DU may configure cell configuration parameters of one or more served cells of the base station DU, for example, based on the one or more elements of the RLF report.

In some communication systems, such as in a legacy system, a base station CU may not provide information elements associated with a connection failure (e.g., a RLF report) that may be received, for example, via a radio resource control (RRC) message from a wireless device. A base station DU may not be able to take into account information elements associated with a connection failure (e.g., a RLF report) from a wireless device. For example, the base station DU may not interpret RRC messages even though the base station DU may forward the RRC messages (e.g., comprising the RLF report) from a wireless device to a base station CU, and/or from a base station CU to a wireless device. A base station DU may be able to configure cell configuration parameters based on the one or more elements of the RLF report, for example, if the base station DU receives one or more elements associated with a connection failure (e.g., an RLF report, which may be created by a wireless device) from a base station CU.

Connection or other failures may occur during wireless communications. A base station DU and/or a base station CU may not be aware of failures. If a base station DU and/or a base station CU is made aware of failures and/or about information associated with the failures, it may be able to improve wireless communications. The wireless device may send information associated with the connection failure to a base station. The wireless device may send, to the base station CU via the base station DU, the connection failure information (e.g., SCGFailureInformation). The wireless device may send, to the base station CU (e.g., via the base station DU which may send and/or forward to the base station CU), one or more messages comprising: an indication of the connection failure (e.g., RLF report message, SCFFailureInformationNR message, etc.), identifier of a failed cell, and/or an indication of the base station DU (e.g., base station DU identifier). The wireless device may send the connection failure information to the base station CU via one or more RRC messages. The wireless device may send information elements associated with the connection failure to the base station DU (e.g., via the base station CU, via a second base station DU, via a neighboring station, and/or via a core network node). The wireless device may send information associated with the connection failure. The base station DU may not open the one or more RRC messages that may comprise the connection failure information. The base station DU may not open (e.g., may not interpret and/or may not decode in an RRC layer) the one or more messages, for example, because the base station DU may receive many RRC messages (e.g., some or many of which do not comprise connection failure information) and may not know that the one or more RRC messages comprises the connection failure information. The base station DU may receive RRC messages from a plurality of wireless device, and these RRC messages may comprise connection failure information associated with a plurality of connection failures over a time period (e.g., such as 12 hours, 24 hours, 36 hours, 48 hours or any other duration). The base station DU may not be able to open one or more of a plurality of RRC messages (e.g., to identify connection failure information) due to resource burdens that may be imposed on the base station DU to do so. The base station DU may have less processing power, less capability, and/or less capacity than the base station CU. The base station CU may be better equipped to open RRC messages to determine whether they contain connection failure information, for example, due to high load requirements to open a plurality of RRC messages (that may not be available at the base station DU), because information in the RRC messages may be associated with neighboring cells known to the base station CU and/or associated with neighboring cells unknown to the base station DU such that the base station CU may be better suited to evaluate the connection failure information, because the base station DU may (and/or the base station CU may not) be configured for some lower layer procedures such as configuring cell parameters and/or resource configuration parameters, and/or because the base station CU may have information about wireless devices (such as from CSI reports) that the base station DU may not have such that the base station CU may configure parameters and/or resources more efficiently. The base station DU may forward the one or more RRC messages to the base station CU. The base station CU may evaluate the contents of the one or more RRC messages, for example, to identify the connection failure information. The base station CU may assist the base station DU, for example, by forwarding the connection failure information back to the base station DU so that the base station DU may evaluate the connection failure information. The base station CU may send, to the base station DU, the connection failure information via one or more: F1 interface message, RRC message, MAC CE, DCI, or other message. The base station DU may have information (such as timing information, resource scheduling information, up-to-date radio channel quality information, etc.) that may not be available at the base station CU and/or that may enable the base station DU to more efficiently determine, based on the connection failure information, one or more cell parameters for the wireless device.

A base station (e.g., a gNB, eNB, and/or the like) may comprise a base station central unit (CU) (e.g., gNB-CU) and one or more base station distributed units (DUs) (e.g., gNB-DU). The base station CU may provide functionalities of a PDCP layer and/or functionalities of an SDAP layer for wireless devices. A base station DU of the one or more base station DUs may provide functionalities of an RLC layer, a MAC layer, and/or a PHY layer for wireless devices. The base station CU may provide one or more upper layers among a PDCP layer, an SDAP layer, an RLC layer, a MAC layer, and/or PHY layer. The base station DU may provide one or more lower layers among a PDCP layer, an SDAP layer, an RLC layer, a MAC layer, and/or PHY layer. The base station CU may be connected to the one or more base station DUs via one or more F1 interfaces. The base station CU may communicate with the base station DU, for example, via an F1 interface.

A wireless device may experience a connection failure in a first cell (e.g., a failed cell). The failed cell may be a served cell of the base station DU (e.g., of the base station CU, of the base station, and/or the like). The connection failure may comprise at least one of a radio link failure (RLF), a handover failure (HOF), and/or a secondary cell group (SCG) failure. The wireless device may determine the RLF if, for example, one or more of the following criteria are met: expiry of a timer started after indication of radio problems (e.g., out of sync) from a physical layer (e.g., if radio problems are recovered before the timer is expired, the wireless device may stop the timer); random access procedure failure; RLC failure (e.g., a number of retransmission is above a threshold); and/or the like. After the RLF is declared, the wireless device may perform one or more of the following: stay in an RRC_CONNECTED state (e.g., RRC connected state); select a suitable cell and/or initiate RRC re-establishment; enter an RRC_IDLE state (e.g., RRC idle state), for example, if a suitable cell is not found within a certain time after the RLF is declared; stay in an RRC_INACTIVE state (e.g., RRC inactive state), for example, if a suitable cell is not found within a certain time after the RLF is declared; and/or the like.

A wireless device associated with the RLF may perform processes associated with one or more phases. A first phase may be started, for example, after or in response to a radio problem detection. During the first phase the wireless device may perform the RLF detection; the wireless device may not initiate a wireless device based mobility; the wireless device may perform processes that may be based on a timer (e.g., T1) or other criteria (e.g., counting); and/or the like. A second phase may be started, for example, after or in response to a determination (e.g., by the wireless device) of the RLF and/or the HOF. During the second phase, the wireless device may perform one or more processes that may lead to an RRC idle state of the wireless device; the wireless device may initiate a wireless device based mobility; the wireless device may perform one or more processes that may be based on a timer (e.g., T2); and/or the like. The wireless device may be in a normal operation of an RRC connected state, for example, during the first phase. The wireless device may experience the first phase, for example, comprising the radio problem detection and no recovery during a first time period (e.g., when T1 may be running) The wireless device may experience the second phase, for example, comprising no recovery during a second time period (e.g., when T2 may be running) The second phase may be followed by an RRC idle state (e.g., the wireless device may change from an RRC connected state to an RRC idle state). During a normal operation (e.g., in which wireless device may be in an RRC connected state) of the first phase and/or the second phase, the wireless device may be considered to be in an RRC connected state. The RLF may occur, or may be considered to be occurring, between the first phase and the second phase (e.g., at an ending time of the first phase and/or at the starting time of the second phase).

The wireless device may detect the HOF that may occur based on or as a result of a handover that is too early, too late, to a wrong cell, and/or the like. If a handover is too early, an RLF may occur, for example, after (e.g., a short time after, such as 1 msec, 10 msec, 20 msec, or any other time period after) a successful handover from a source cell to a target cell, and/or an HOF may occur during a handover procedure. If a handover is too early, the wireless device may attempt to reestablish a radio link connection in the source cell. If a handover is too late, an RLF may occur, for example after the wireless device may stay for a threshold period of time (e.g., such as for 1 msec or any other time period) in a cell (e.g., an RLF may occur because a serving base station may not initiate a handover for the wireless device when a radio link quality is insufficient to serve the wireless device in a current cell), and/or the wireless device may attempt to reestablish a radio link connection in a different cell. If the handover is to a wrong cell, an RLF may occur after (e.g., a short time after, such as 1 msec, 10 msec, 20 msec, or any other time period after) a successful handover from a source cell to a target cell, and/or an HOF may occur during a handover procedure. If the handover is to a wrong cell, the wireless device may attempt to reestablish a radio link connection in a cell other than the source cell and the target cell. A successful handover may refer to wireless device's state of a successful completion of a random access (RA) procedure.

The wireless device and/or a network (e.g., a base station, a base station CU, a base station DU, a gNB, an eNB, a core network, and/or the like) may trigger one or more of following functions, for example, to resolve a problem of a connection failure: a detection of the connection failure after an RRC reestablishment attempt; a detection of the connection failure after an RRC connection setup; a retrieval of information needed for problem analysis; and/or the like. Triggering of one or more of the above functions may be optional, and/or may depend on one or more conditions or settings.

The base station CU may receive, from the wireless device, an RLF report for a connection failure of the wireless device. The base station CU may receive the RLF report via a radio resource control (RRC) message (e.g., a wireless device information response message, a wireless device assistance information message, and/or the like). The base station CU may send (e.g., transmit), to the wireless device, a wireless device information request message (e.g., an RRC message) indicating an RLF report request. The base station CU may receive, from the wireless device, the wireless device information response message after or in response to the wireless device information request message.

Figure 15:
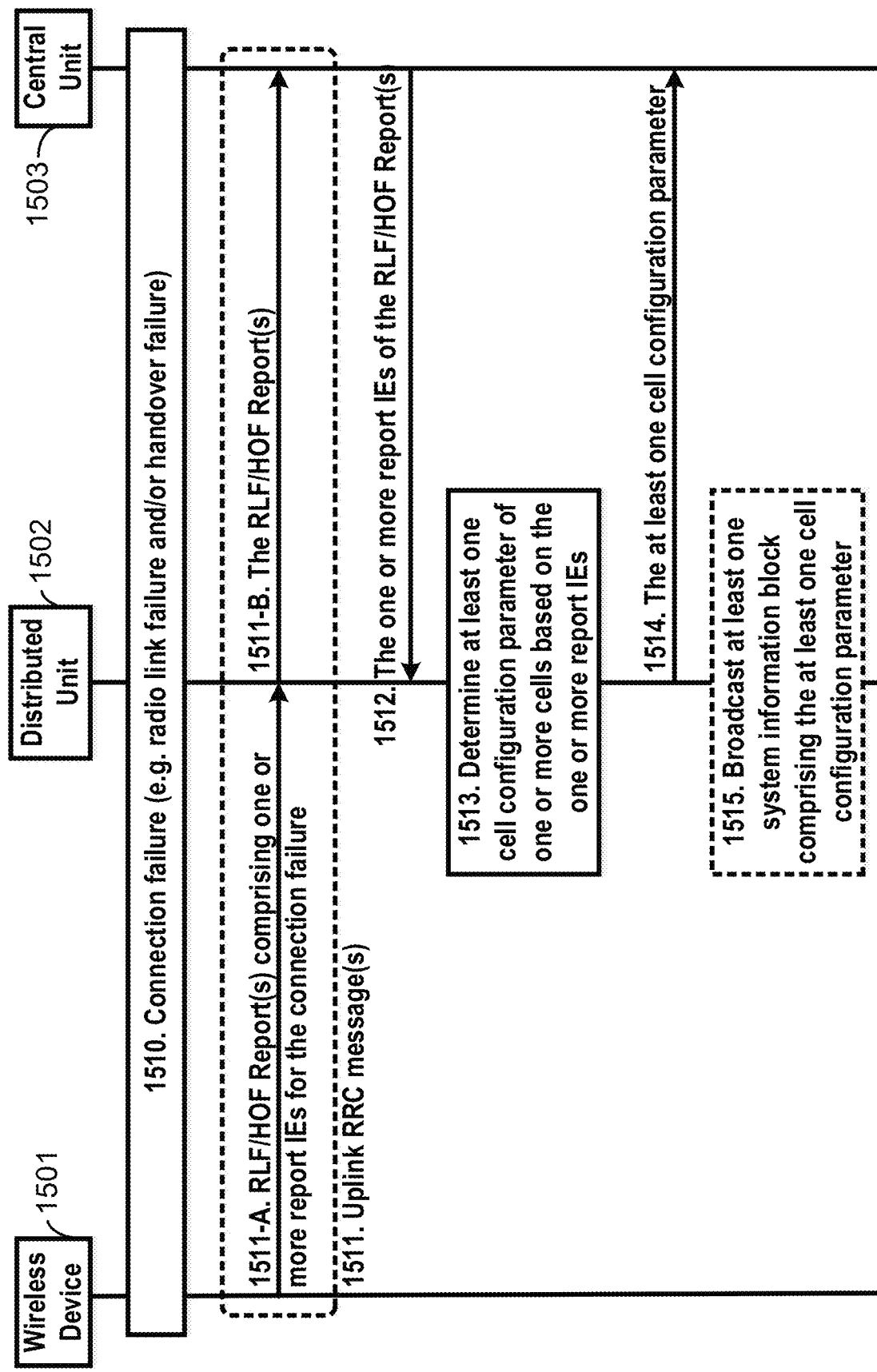
FIG. 15 shows an example diagram for addressing a connection failure using a distributed unit and a central unit.

FIG. 15 shows an example diagram for addressing a connection failure using a base station DU and a base station CU. After a connection failure occurs, a wireless device 1501 may establish and/or reestablish an RRC connection at one or more cells of the base station DU 1502, and/or the wireless device 1501 may send (e.g., transmit) a report (e.g., that may comprise the indication of the connection failure) to a base station CU 1503 via the base station DU 1502. The report may comprise an RRC report (e.g., an RLF report and/or an HOF report). The wireless device may send connection failure information (e.g., SCGFailureInformation), for example, for a secondary cell group failure, that may not be included in a report.

At step 1510, the wireless device 1501 may determine a connection failure, such as a radio link failure, a handover failure, and/or a secondary cell group failure, between the wireless device 1501 and a base station (e.g., which may comprise the base station DU 1502 and the base station CU 1503). The wireless device may determine a connection failure at a serving cell, for example, based on a received signal being lower than a signal threshold level, a block error rate above an error threshold (e.g., for a particular time duration), and/or other measurements (e.g., measResultServingCell, measResultSCG-Failure, etc.). The wireless device 1501 may enter an idle state (e.g., RRC idle state), for example, after determining a connection failure at the serving cell. The wireless device 1501 may search for and/or determine (e.g., during an idle state) a proper cell, for example, by measuring neighboring cell quality and/or the previous serving cell quality. The proper cell may have a measured cell quality (e.g., RSRP and/or RSRQ) above a threshold. The wireless device 1501 may select a proper cell and initiate a random access procedure. At step 1511, the wireless device 1501 may send, to the base station CU 1503 via the base station DU 1502, one or more uplink RRC messages. The wireless device 1501 may send the one or more uplink RRC messages, for example, after the random access procedure, The one or more uplink RRC messages may comprise an indication of the connection failure, such as an indication of a radio link failure, an indication of a handover failure, and/or an indication of a secondary cell group failure. The indication of the connection failure may comprise, for example, an RLF report and/or an HOF report. The RLF report and/or the HOF report may comprise one or more report information elements (IEs) for the connection failure. At step 1511-A, the base station DU 1502 (e.g., a gNB-DU) may receive, from the wireless device 1501, one or more RRC messages comprising an indication of a connection failure, such as an indication of a radio link failure (e.g., an RLF report), an indication of a handover failure (e.g., an HOF report), and/or an indication of a secondary cell group failure. A destination of the one or more RRC messages may be a base station CU 1503. The base station DU 1502 and the base station CU 1503 may both be part of a first base station. At step 1511-B, the base station DU 1502 may forward (e.g., send, transmit, etc.) the one or more RRC messages to the base station CU 1503. The base station DU 1502 may forward (e.g., send, transmit, etc.) the one or more RRC messages to the base station CU 1503 via a first F1 message. The first F1 message may comprise, for example, one or more of: an uplink RRC message transfer message, a wireless device context modification required message, a wireless device context modification response message, a wireless device context setup response message, and/or the like. The base station DU 1502 may not decode and/or may not interpret the one or more RRC messages, and/or the base station DU 1502 may not decode and/or may not interpret contents of the one or more RRC messages. The first F1 message may comprise one or more of an RLF report and/or an HOF report.

The base station CU 1503 may determine that connection failure information (e.g., that may be included in the RLF report and/or the HOF report) may be associated with the base station DU 1502 (e.g., based on cell identifier of a cell that the wireless device used at a time that the connection failure occurred). At step 1512, the base station CU 1503 may send, to the base station DU 1502, one or more second messages. The one or more second messages may comprise an indication of the connection failure. The one or more second messages may comprise a context modification request (e.g., a user equipment (UE) context modification request). The base station CU 1503 may send the one or more second messages, after or in response to determining that the connection failure may be associated with the base station DU 1502. The one or more second messages may comprise one or more report IEs of an RLF report and/or one or more report IEs of an HOF report. The RLF report and/or the HOF report may comprise one or more of: an identifier of a cell (e.g., cell ID, physCellId, etc.) in which the connection failure occurred, measurement information (e.g., RSRP, RSRQ, etc.) of the serving cell, measurement information of one or more neighboring cells, and/or information associated with a time of the connection failure. The base station CU 1503 may decode and/or interpret the contents of the one or more RRC messages (e.g., the first F1 message) received from the base station DU 1502, which may be performed by the base station CU 1503 prior to sending the one or more second messages.

At step 1513, the base station DU 1502 may receive, from the base station CU 1503, the one or more second messages. The base station DU 1502 may determine, based on the one or more second messages (e.g., based on the one or more report IEs of an RLF report and/or one or more report IEs of an HOF report), at least one cell configuration parameter of one or more cells. The base station DU may determine the at least one cell configuration parameter of one or more cells of the base station DU for one or more wireless devices. The at least one cell configuration parameter may be for uplink, sidelink, and/or downlink. The one or more cells may comprise a failed cell (e.g., of a connection establishment failure report) of the wireless device. The at least one cell configuration parameter may comprise one or more of: a beam configuration parameter, a bandwidth part (BWP) configuration parameter, a transmission power configuration parameter; a frequency configuration parameter, a beamforming configuration parameter, a physical control channel scheduling parameter, an antenna configuration parameter, a selection or reselection configuration parameter for one or more wireless devices, system information, an interference control parameter, and/or the like. At step 1514, the base station DU 1502 may send, to the base station CU 1503, the at least one cell configuration parameter (e.g., after or in response to determining the at least one cell configuration parameter of one or more cells). The base station DU 1502 may send, to the base station CU 1503, a context modification response (e.g., a user equipment (UE) context modification response). At step 1515, the base station DU 1502 may broadcast at least one system information block. The at least one system information block may comprise the at least one cell configuration parameter. The wireless device 1501 may receive the at least one system information block. The wireless device 1501 may establish and/or reestablish a connection with the base station (e.g., comprising the base station DU 1502 and the base station CU 1503) or a neighboring base station (not shown).

Figure 16:
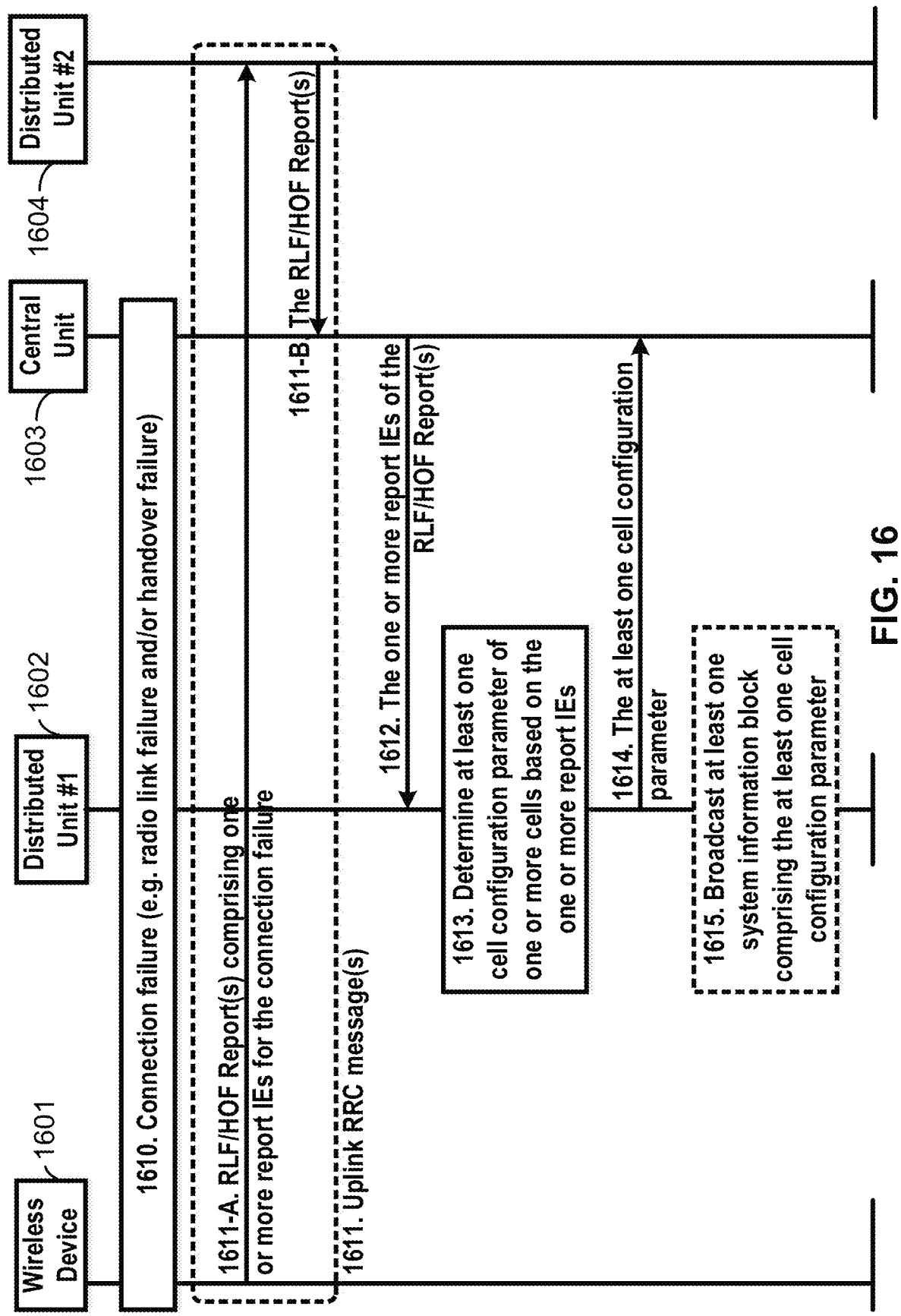
FIG. 16 shows an example diagram for addressing a connection failure using two distributed units and a central unit.

FIG. 16 shows an example diagram for addressing a connection failure using two distributed units and a central unit. After a connection failure occurs, a wireless device 1601 may establish and/or reestablish an RRC connection at one or more cells of a second base station DU 1604, and/or the wireless device 1601 may transmit an RRC report (e.g., that may comprise the indication of the connection failure) to a base station CU 1603 (e.g., of a first base station comprising a first base station CU 1603 and a first base station DU 1602) via the second base station DU 1604. The wireless device 1601, the base station distributed unit 1602, and the base station central unit 1603 may perform some or all of the procedures described above regarding the wireless device 1501, the base station distributed unit 1502, and the base station central unit 1503, respectively.

At step 1610, the wireless device 1601 may determine a connection failure, such as a radio link failure, a handover failure, and/or a secondary cell group failure, between the wireless device 1601 and a first base station (e.g., which may comprise the first base station DU 1602 and the first base station CU 1603). At step 1611 (e.g., after selecting a cell of the second base station DU and performing a random access procedure via the cell), the wireless device 1601 may send, to the first base station CU 1603, via the second base station DU 1604, one or more uplink RRC messages. The one or more uplink RRC messages may comprise an indication of the connection failure, such as an indication of a radio link failure, an indication of a handover failure, and/or an indication of a secondary cell group failure. The indication of the connection failure may comprise, for example, an RLF report and/or an HOF report. The RLF report and/or the HOF report may comprise one or more report information elements (IEs) for the connection failure. At step 1611-A, the second base station DU 1604 (e.g., a gNB-DU) may receive, from the wireless device 1601, one or more RRC messages comprising an indication of a connection failure, such as an indication of a radio link failure (e.g., an RLF report), an indication of a handover failure (e.g., an HOF report), and/or an indication of a secondary cell group failure. The second base station DU 1604 may be one of one or more base station DUs of the same base station. For example, a base station (e.g., a gNB) may comprise the first base station DU 1602, the second base station DU 1604, and the base station CU 1603. A destination of the one or more RRC messages may be the base station CU 1603. The base station CU 1603 and the first base station DU 1602 may both be part of a first base station. At step 1611-B, the second base station DU 1604 may forward (e.g., send, transmit, etc.) the one or more RRC messages to the base station CU 1603, for example, via a first F1 message. Additionally or alternatively, the second base station DU 1604 may send the one or more RRC messages directly to the first base station DU 1602. The first F1 message may comprise, for example, one or more of: an uplink RRC message transfer message, a wireless device context modification required message, a wireless device context modification response message, a wireless device context setup response message, and/or the like. The second base station DU 1604 may not decode and/or may not interpret the one or more RRC message, and/or the second base station DU 1604 may not decode and/or may not interpret contents of the one or more RRC messages. The first F1 message may comprise one or more of an RLF report and/or an HOF report.

At step 1612, the base station CU 1603 may send, to the first base station DU 1602, one or more second messages. The one or more second messages may comprise an indication of the connection failure. The one or more second messages may comprise one or more report IEs of an RLF report and/or one or more report IEs of an HOF report. The base station CU 1603 may decode and/or interpret the contents of the one or more RRC messages (e.g., the first F1 message) received from the second base station DU 1642, which may be performed by the base station CU 1603 prior to sending the one or more second messages.

At step 1613, the first base station DU 1602 may receive, from the base station CU 1503, the one or more second messages. The first base station DU 1602 may determine, based on the one or more second messages (e.g., based on the one or more report IEs of an RLF report and/or one or more report IEs of an HOF report), at least one cell configuration parameter of one or more cells. At step 1614, the first base station DU 1602 may send, to the base station CU 1603, the at least one cell configuration parameter (e.g., after or in response to determining the at least one cell configuration parameter of one or more cells). At step 1615, the first base station DU 1602 may broadcast at least one system information block. The at least one system information block may comprise the at least one cell configuration parameter. The wireless device 1601 may receive the at least one system information block. The wireless device 1601 may establish and/or reestablish a connection with a base station (e.g., comprising the first base station DU 1602 and the base station CU 1603) or a neighboring base station (not shown).

Figure 17:
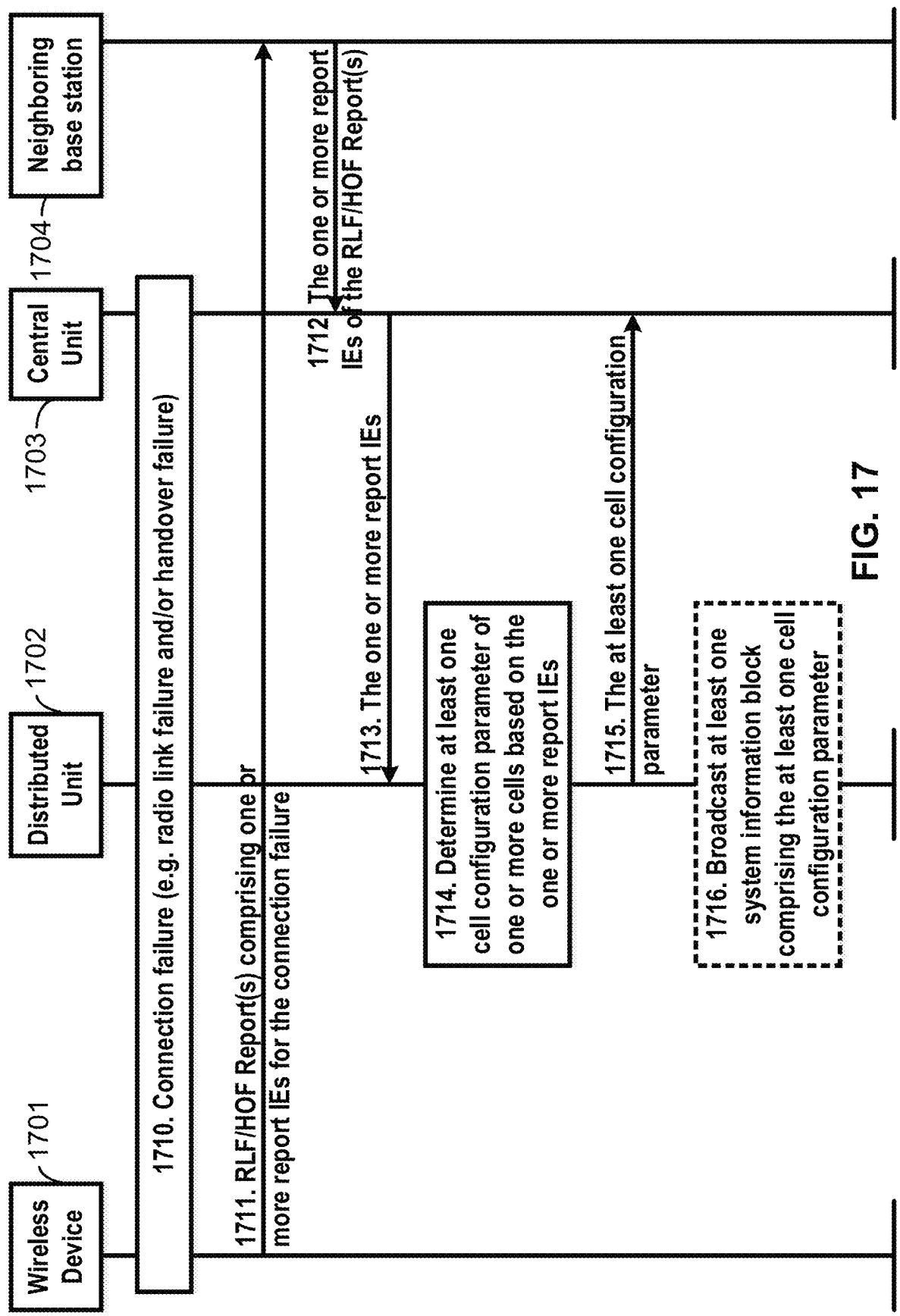
FIG. 17 shows an example diagram for addressing a connection failure using a distributed unit, a central unit, and a neighboring base station.

FIG. 17 shows an example diagram for addressing a connection failure using a distributed unit, a central unit, and a neighboring base station. After a connection failure occurs, a wireless device 1701 may establish and/or reestablish an RRC connection at one or more cells of a neighboring base station 1704 (e.g., a neighboring base station CU), and/or the wireless device 1701 may transmit a report (e.g., that may comprise the indication of the connection failure) to the neighboring base station 1704 (e.g., a neighboring base station CU). The neighboring base station 1704 (e.g., a neighboring base station CU) may forward (e.g., send, transmit, etc.) the report and/or one or more elements of the report, received from the wireless device 1701, to the base station CU 1703. The wireless device 1701, the base station distributed unit 1702, and the base station central unit 1703 may perform some or all of the procedures described above regarding the wireless devices 1501 and 1602; the base station distributed units 1502 and 1602; and the base station central units 1503 and 1603, respectively.

At step 1710, the wireless device 1701 may determine a connection failure, such as a radio link failure, a handover failure, and/or a secondary cell group failure, between the wireless device 1701 and a base station (e.g., which may comprise the base station DU 1702 and the base station CU 1703). At steps 1711-1712 (e.g., after selecting a cell of the neighboring base station and performing a random access procedure via the cell), the wireless device 1701 may send, to the neighboring base station 1704 (e.g., for forwarding and/or sending to the base station CU 1703), one or more uplink RRC messages. The one or more uplink RRC messages may comprise an indication of the connection failure, such as an indication of a radio link failure, an indication of a handover failure, and/or an indication of a secondary cell group failure. The indication of the connection failure may comprise, for example, an RLF report and/or an HOF report. The RLF report and/or the HOF report may comprise one or more report information elements (IEs) for the connection failure. At step 1711, the neighboring base station 1704 (e.g., a gNB) may receive, from the wireless device 1701, one or more RRC messages comprising an indication of a connection failure, such as an indication of a radio link failure (e.g., an RLF report), an indication of a handover failure (e.g., an HOF report), and indication of a secondary cell group failure, and/or one or more elements of a report (e.g., an RLF report and/or an HOF report). A destination of the one or more RRC messages may be the neighboring base station 1704. The base station DU 1702 and the base station CU 1703 may both be part of a first base station. The neighboring base station 1704 may comprise, for example, a gNB, a eNB, a UTRAN, and/or the like. The neighboring base station 1704 may comprise a neighboring base station CU. The wireless device 1701 may send the one or more RRC messages to the neighboring base station 1704 (e.g., a neighboring gNB-CU) via Uu interface. At step 1712, the neighboring base station 1704 may send (e.g., forward, transmit, etc.) one or more information elements of the one or more RRC messages (e.g., such as an indication of the connection failure) to the base station CU 1703. The neighboring base station 1704 may send (e.g., forward, transmit, etc.) the one or more information elements of the one or more RRC messages to the base station CU 1703 via an Xn interface, via an X2 interface, via an Xx interface, and/or the like (e.g., a direct interface between the base station CU 1703 and the neighboring base station 1704 such as a neighboring base station CU). The neighboring base station 1704 may decode and/or may interpret contents of the one or more RRC messages. The neighboring base station 1704 may forward and/or send (e.g., via an Xn interface) one or more information elements (e.g., an indication of the connection failure) of the one or more RRC messages to the base station CU 1703 (e.g., a base station comprising the base station CU 1703 and the base station DU 1702). The neighboring base station 1704 may comprise a base station CU (such as the base station CU 1503 described above regarding FIG. 15) that may send one or more report IEs of one or more of: an RLF report and/or an HOF report. The neighboring base station 1704 may comprise a base station DU (such as the base station DU 1604 described above regarding FIG. 16) that may send one or more of: an RLF report and/or an HOF report.

At step 1713, the base station CU 1703 may send, to the base station DU 1702, one or more second messages. The one or more second messages may comprise an indication of the connection failure. The one or more second messages may comprise one or more report IEs of an RLF report and/or one or more report IEs of an HOF report. The base station CU 1703 may decode and/or interpret the contents of the one or more RRC messages (e.g., the first F1 message) received from the neighboring base station 1704, which may be performed by the base station CU 1703 prior to sending the one or more second messages.

At step 1714, the base station DU 1702 may receive, from the base station CU 1703, the one or more second messages. The base station DU 1702 may determine, based on the one or more second messages (e.g., based on the one or more report IEs of an RLF report and/or one or more report IEs of an HOF report), at least one cell configuration parameter of one or more cells. At step 1715, the base station DU 1702 may send, to the base station CU 1703, the at least one cell configuration parameter (e.g., after or in response to determining the at least one cell configuration parameter of one or more cells). At step 1716, the base station DU 1702 may broadcast at least one system information block. The at least one system information block may comprise the at least one cell configuration parameter. The wireless device 1701 may receive the at least one system information block. The wireless device 1701 may establish and/or reestablish a connection with the base station (e.g., comprising the base station DU 1702 and the base station CU 1703), the neighboring base station 1704, or another neighboring base station (not shown).

Figure 18:
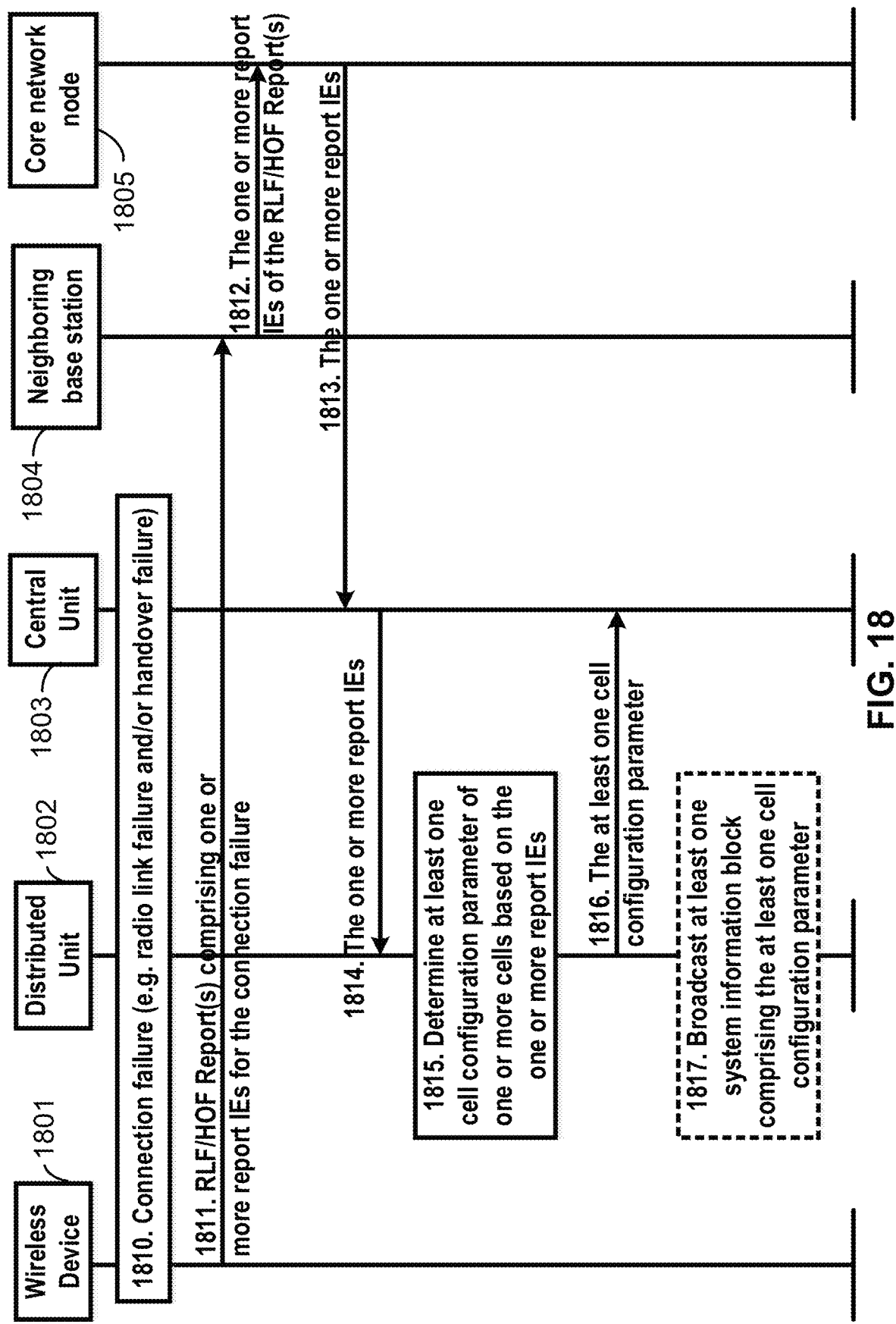
FIG. 18 shows an example diagram for addressing a connection failure using a distributed unit, a central unit, a neighboring base station, and a core network node.

FIG. 18 shows an example diagram for addressing a connection failure using a distributed unit, a central unit, a neighboring base station, and a core network node. One or messages may be sent to and/or from a core network node 1805, for example, if there is no interface between two base stations, such as the neighboring base station 1804 and a base station comprising: the base station DU 1802 and the base station CU 1803. After a connection failure occurs, a wireless device 1801 may establish and/or reestablish an RRC connection at one or more cells of a neighboring base station 1804 (e.g., a neighboring base station CU), and/or the wireless device 1801 may transmit a report (e.g., that may comprise the indication of the connection failure) to the neighboring base station 1804 (e.g., a neighboring base station CU). The neighboring base station 1804 (e.g., a neighboring base station CU) may forward (e.g., send, transmit, etc.) the report and/or one or more elements of the report, received from the wireless device 1701, to a core network node 1805. The core network node 1805 may report the one or more elements of the report to the base station CU 1803. The wireless device 1801, the base station distributed unit 1802, and the base station central unit 1803 may perform some or all of the procedures described above regarding the wireless devices 1501, 1602, and 1702; the base station distributed units 1502, 1602, and 1702; and the base station central units 1503, 1603, and 1703, respectively.

At step 1810, the wireless device 1801 may determine a connection failure, such as a radio link failure, a handover failure, and/or a secondary cell group failure, between the wireless device 1801 and a base station (e.g., which may comprise the base station DU 1802 and the base station CU 1803). At steps 1811-1813, the wireless device 1801 may send, to the neighboring base station 1804 (e.g., for forwarding and/or sending to the base station CU 1803 via the core network node 1805), one or more information elements (e.g., in one or more of an RLF report and/or an HOF report).

The one or more information elements may comprise an indication of the connection failure, such as an indication of a radio link failure, an indication of a handover failure, and/or an indication of a secondary cell group failure. The indication of the connection failure may comprise, for example, an RLF report and/or an HOF report. The RLF report and/or the HOF report may comprise one or more report information elements (IEs) for the connection failure. At step 1811, the neighboring base station 1804 (e.g., a gNB) may receive, from the wireless device 1801, one or more RRC messages comprising an indication of a connection failure, such as an indication of a radio link failure (e.g., an RLF report), an indication of a handover failure (e.g., an HOF report), an indication of a secondary cell group failure, and/or one or more elements of a report (e.g., an RLF report and/or an HOF report). A destination of IEs of the indication of the connection failure may be the base station CU 1803. The base station DU 1802 and the base station CU 1803 may both be part of a first base station. The neighboring base station 1804 may comprise, for example, a gNB, a eNB, a UTRAN, and/or the like. The neighboring base station 1804 may comprise a neighboring base station CU. The wireless device 1801 may send the one or more RRC messages to the neighboring base station 1804 (e.g., a neighboring gNB-CU) via a Uu interface. At step 1812, the neighboring base station 1804 may forward (e.g., send, transmit, etc.) one or more information elements of the one or more RRC messages (e.g., such as an indication of the connection failure) to the core network node 1805. The neighboring base station 1804 may forward (e.g., send, transmit, etc.) the one or more information elements of the one or more RRC messages to the core network node 1805 for forwarding and/or sending to the base station CU 1803. The neighboring base station 1804 may decode and/or may interpret contents of the one or more RRC messages. The neighboring base station 1804 may forward and/or send (e.g., via an Xn interface) one or more information elements (e.g., an indication of the connection failure) of the one or more RRC messages to the core network node 1805 for forwarding and/or sending to the base station CU 1803 (e.g., a base station comprising the base station CU 1803 and the base station DU 1802).

At step 1813, the core network node 1805 may forward (e.g., send, transmit, etc.) the one or more information elements (e.g., comprising an indication of the connection failure) to the base station CU 1803. The one or more information elements may comprise one or more of an RLF report and/or an HOF report. At step 1813, the base station CU 1803 may receive, from the wireless device 1801 via the neighboring base station 1804 (e.g., a neighboring base station CU) and via the core network node 1805 (e.g., one or more core network entities), one or more reports (e.g., an RLF report and/or an HOF report) and/or one or more elements of one or more reports (e.g., one or more report IEs). The core network node 1805 may comprise one or more: AMFs, MMEs, SGSNs, GGSNs, and/or the like. The core network node 1805 may use logical direct interfaces between the base station CU 1803 and the core network node 1805. The core network node 1805 may use logical direct interfaces between the core network node 1805 and the neighboring base station 1805 (e.g., a neighboring base station CU).s The logical direct interfaces may comprise, for example, an NG interface, an N2 interface, an S1 interface, and/or the like.

At step 1814, the base station CU 1803 may send, to the base station DU 1802, one or more second messages. The one or more second messages may comprise an indication of the connection failure. The one or more second messages may comprise one or more report IEs of an RLF report and/or one or more report IEs of an HOF report. The base station CU 1803 may decode and/or interpret the contents of the one or more RRC messages (e.g., the first F1 message) received from the core network node 1805, which may be performed by the base station CU 1803 prior to sending the one or more second messages.

At step 1815, the base station DU 1802 may receive, from the base station CU 1803, the one or more second messages. The base station DU 1802 may determine, based on the one or more second messages (e.g., based on the one or more report IEs of an RLF report and/or one or more report IEs of an HOF report), at least one cell configuration parameter of one or more cells. At step 1816, the base station DU 1802 may send, to the base station CU 1803, the at least one cell configuration parameter (e.g., after or in response to determining the at least one cell configuration parameter of one or more cells). At step 1817, the base station DU 1802 may broadcast at least one system information block. The at least one system information block may comprise the at least one cell configuration parameter. The wireless device 1801 may receive the at least one system information block. The wireless device 1801 may establish and/or reestablish a connection with the base station (e.g., comprising the base station DU 1802 and the base station CU 1803), the neighboring base station 1804, the core network node 1805, or another neighboring base station (not shown).

The RLF report and/or the HOF report (e.g., as referenced above regarding FIGS. 15-18) may comprise one or more report information elements (IEs) indicating information associated with a connection failure of a wireless device. The one or more report IEs may indicate at least one of: a failed cell identifier; a cause of the connection failure; an identifier of the wireless device (e.g., UE ID) at the failed cell; a carrier frequency value of the failed cell; a first time value (e.g., timeConnFailure) indicating time that elapsed between a last handover initialization for the wireless device and the connection failure; a second time value (e.g., timeSinceFailure) indicating time that elapsed since the connection failure (or an establishment failure); a connection failure type (e.g., failureType) indicating whether the connection failure is due to an RLF or a handover failure; a measurement result; a quality classification indication indicating the connection failure occurred; and/or the like. A failed cell identifier may comprise, for example, a cell ID of a failed cell. The failed cell may comprise a cell in which the wireless device may have experienced the connection failure. The cause of a connection failure may comprise, for example, an RLF cause and/or an HOF cause. An RLF cause may indicate at least one of a t310 expiry, a random access problem (e.g., failureType may be set as randomAccessProblem), a radio link control maximum number of retransmissions (e.g., failureType may be set as rlc-MaxNumRetx), or t312 expiry (e.g., failureType may be set as t310-Expiry). The measurement result may comprise at least one of a reference signal received power result and/or a reference signal received quality. The quality classification indication may comprise a quality classification indication 1 bearer indicating that the connection failure occurred, for example, while a bearer with QCI value equal to 1 was configured.

The failed cell identifier of the failed cell may comprise a global cell identifier (e.g., NCGI, ECGI, CGI, and/or the like), a physical cell identifier (e.g., PCI), and/or the like. The failed cell may be a primary cell of the wireless device, for example, at a time that the connection failure occurred.

The RLF cause of the connection failure may indicate that a cause of determining the connection failure of the wireless device comprises at least one of: a t310 expiry, a random access problem (e.g., failure), a radio link control (RLC) maximum number of retransmissions, t312 expiry, and/or the like.

The t310 expiry may indicate that a timer t310 of the wireless device expired at the failed cell, for example, at a time that the connection failure occurred. The timer t310 may start, for example, at a time that the wireless device detects physical layer related problems (e.g., for a primary cell). For example, the timer t310 may start at a time that the wireless device receives a certain number (e.g., N310) of consecutive out-of-sync indications from lower layers. The timer t310 may stop: at a time that the wireless device receives a certain number (e.g., N311) consecutive in-sync indications from lower layers (e.g., for a primary cell); after or based on triggering a handover procedure; after or based on initiating an RRC connection reestablishment procedure; and/or the like. At an expiry of the timer t310, the wireless device may go to an RRC idle state (e.g., if security is not activated). At an expiry of the timer t310, the wireless device may initiate an RRC connection reestablishment procedure (e.g., if security is activated).

The t312 expiry may indicate that a timer t312 of the wireless device expired at the failed cell, for example, at a time that the connection failure occurred. The timer t312 may start, for example, after or in response to triggering a measurement report for a measurement identity for which the timer t312 has been configured. The timer t312 may start, for example, at a time that the timer t310 is running. The timer t312 may stop, for example, based on one or more of: receiving a certain number (e.g., N311) of consecutive in-sync indications from lower layers; triggering a handover procedure; initiating a connection re-establishment procedure; an expiry of the timer t310; and/or the like. At an expiry of the timer t312, the wireless device may go to an idle state (e.g., if security is not activated). At an expiry of the timer t312, the wireless device may initiate an RRC connection reestablishment procedure (e.g., if security is activated).

The random access problem (e.g., failure) may indicate that the wireless device experienced one or more random access problems (e.g., random access failures) at the failed cell, for example, at a time that the connection failure occurred. The RLC maximum number of retransmissions may indicate that an RLC layer of the wireless device attempted a maximum number of packet retransmissions at or by a time that connection failure occurred.

The identifier of the wireless device may comprise one or more of: a C-RNTI at the failed cell, a temporary mobile subscriber identity (TMSI), an International Mobile Subscriber Identity (IMSI), a Globally Unique Temporary Identifier (GUTI), and/or the like. The carrier frequency value may indicate a carrier frequency value of the failed cell. The carrier frequency value may comprise one or more of: an EARFCN, an ARFCN, and/or the like. The carrier frequency value may comprise a maximum value of a maxEARFCN. The carrier frequency value may be determined according to a band that may be used at a time during which measurement results may be obtained.

A measurement result may comprise one or more of: a reference signal received power result (RSRP) and/or a reference signal received quality (RSRQ) of at least one of the failed cell, a last serving cell, one or more serving cells, one or more neighboring cells of the failed cell, one or more secondary cells of the wireless device at a time the failed cell was a primary cell, and/or the like. The wireless device may determine one or more elements of the measurement result, for example by measuring at a time that (or before or after) the wireless device experiences the connection failure. The quality classification indication (e.g., quality classification indication 1 bearer, drb-EstablishedWithQCI-1, etc.) may indicate that the connection failure occurred, for example, at a time that a bearer with QCI value 1 was configured.

A base station DU may receive, from a base station CU, a first message comprising one or more report IEs. The first message may comprise an F1 message transmitted via the F1 interface between the base station DU and the base station CU. The first message may comprise one or more of: an F1 setup response message, a base station (e.g., gNB-CU) configuration updated message, a base station (e.g., gNB-DU) configuration update acknowledge message, a wireless device context setup request message, a wireless device context modification request message, a wireless device context release command message, a wireless device context modification confirm message, a downlink RRC message transfer message, an RRC information (e.g., RRC measurement, RRC report, etc.) transfer message, and/or a like message (e.g., an F1 message) from the base station CU to the base station DU.

The base station DU may determine at least one cell configuration parameter of one or more cells of the base station DU, for example, based on the one or more report IEs. The one or more cells may comprise the failed cell of the wireless device. The at least one cell configuration parameter may comprise one or more of: a transmission power configuration parameter; a frequency configuration parameter; a beamforming configuration parameter; a physical control channel scheduling parameter; an antenna configuration parameter; a cell selection and/or reselection configuration parameter for one or more wireless devices; system information; interference control parameter; and/or the like.

A transmission power configuration parameter may comprise one or more of: a maximum downlink/uplink cell transmission power, a physical downlink control channel (PDCCH) transmission power, a power control parameter for uplink and/or downlink, a TPC configuration parameter, an SRS configuration parameter, and/or the like for one or more wireless device and/or for the base station DU. If the base station DU determines that the connection failure occurred because of a low transmission power of a channel (e.g., aPDCCH) (e.g., based on the measurement result of the one or more report IEs), the base station DU may increase a transmission power of the channel (e.g., PDCCH). If the connection failure occurred because of large interferences on a channel (e.g., PDCCH), the base station DU may reschedule the PDCCH to be located at other subframes.

A frequency configuration parameter may comprise one or more of: a carrier frequency, a bandwidth, a bandwidth part configuration parameter, and/or the like. If a cell of the base station DU experiences large interferences from neighboring cells (e.g., more than −50 dbm, or any other value), the base station DU may change an operation frequency to other frequency. If a certain bandwidth part of a served cell of the base station DU experiences large interferences (e.g., more than −60 dbm, or any other value) from neighboring cells and/or other technologies, the base station DU may change a default bandwidth part and/or an active bandwidth part of one or more wireless devices to another bandwidth part.

A beamforming configuration parameter may comprise one or more of: a beamforming direction configuration parameter, a beam sweeping configuration parameter, a synchronization signal (SS) and/or reference signal (e.g., CSI-RS) configuration parameter, beam recovery related parameter, a BRACH parameter, a preamble configuration parameter for beam recovery, a random access configuration parameter of one or more beams, and/or the like. If the connection failure occurred because of a random access failure and/or a failure of beam recovery procedure (e.g., out-of-sync), the base station DU may reschedule random access resources and/or BRACH resources, and/or the base station DU may reconfigure preambles (e.g., to reduce random access contentions).

A physical control channel scheduling parameter may comprise one or more of: a subframe pattern configuration parameter, a measurement subframe pattern configuration parameter, a transmission type parameter (e.g., indicating a localized transmission and/or distributed transmission), a resource block assignment configuration parameter, a CSI-RS configuration parameter, and/or the like. An antenna configuration parameter may comprise one or more of: a default antenna configuration parameters, an antenna port configuration parameter, a number of CRS antenna port parameter, and/or the like. A cell selection or reselection configuration parameter for one or more wireless devices may comprise one or more of: a power and/or time threshold parameter for cell selection and/or reselection (e.g., cell selection and/or reselection of at least one wireless device of the base station DU), a cell priority configuration parameter for cell selection and/or reselection, and/or the like. The base station DU may increase one or more values of one or more power and/or time threshold parameters to make wireless devices avoid a failed cell, for example, if the connection failure occurred based on or because of a random access failure of the wireless device and/or if one or more wireless devices do not satisfy increased thresholds.

A base station may reconfigure one or more IEs of system information (e.g., comprising at least one of system information type block type 1 to 21) based on the one or more report IEs. An interference control parameter may comprise one or more of: almost blank subframe configuration parameters, CoMP interference management related parameters, and/or the like. If the connection failure occurred based on or because of interferences from a neighboring cell of the failed cell, the base station DU may schedule resource blocks for the neighboring cell and the failed cell such that the neighboring cell and the failed cell do not use the resource blocks simultaneously.

A base station DU may send, to the base station CU, a second message comprising one or more cell configuration parameters that may be determined based on the one or more report IEs. The second message may comprise an F1 message that may be transmitted via the F1 interface between the base station DU and the base station CU. The second message may comprise one or more of: an F1 setup request message, a base station (e.g., gNB-DU) configuration updated message, a base station (e.g., gNB-CU) configuration update acknowledge message, a wireless device context setup response message, a wireless device context modification response message, a wireless device context release request message, a wireless device context release complete message, a wireless device context modification required message, an uplink RRC message transfer message, a RRC information (e.g., RRC measurement, RRC report, etc.) transfer message, a physical layer information (e.g., radio link status information, lower layer configuration updated information, and/or the like) transfer message, and/or the like message (e.g., an F1 message) from the base station DU to the base station CU.

A base station DU may transmit one or more system information blocks comprising one or more cell configuration parameters. The one or more system information blocks may comprise one or more of the system information block type 1 to 21.

The base station DU may receive, from the base station CU, one or more downlink RRC messages comprising one or more cell configuration parameters of the second message, and/or the base station DU may transmit the one or more downlink RRC messages to one or more wireless devices. The one or more wireless device may comprise any of the wireless devices referenced herein. The base station DU may transmit the one or more downlink RRC messages to the one or more wireless device without interpretation (e.g., the base station DU may not decode and/or may not interpret the one or more downlink RRC messages and/or one or more elements of the one or more downlink RRC messages).

A base station distributed unit (DU) may receive, from a wireless device, a radio resource control (RRC) message comprising a radio link failure (RLF) report for a connection failure of a wireless device. The RLF report may comprise one or more report information elements (IEs) indicating: a failed cell identifier of a failed cell (e.g., the wireless device may experience the connection failure at the failed cell); an RLF cause of the connection failure (e.g., the RLF cause may indicate at least one of a t310 expiry, a random access problem, a radio link control maximum number of retransmissions, or t312 expiry); and/or an identifier of the wireless device at the failed cell. The base station DU may send, to a base station central unit (CU), the RRC message comprising the RLF report. The base station DU may receive, from the base station CU, a first message comprising the one or more report IEs. The base station DU may determine at least one cell configuration parameter of one or more cells based on the one or more report IEs. The base station DU may send, to the base station CU, a second message comprising the at least one cell configuration parameter.

The one or more report IEs may indicate at least one of: a carrier frequency value of the failed cell; a first time value indicating a first time that elapsed from the time a prior (e.g., last) handover initialization for the wireless device occurred to a time of the connection failure; a second time value indicating a second time that elapsed from a time of the connection failure; a connection failure type indicating whether the connection failure is an RLF, an HOF, and/or a SCG failure; a measurement result of the failed cell; a quality classification indication (e.g., QCI) indicating that the connection failure occurred; and/or the like. The measurement result may comprise a reference signal received power result and/or a reference signal received quality. The quality classification indication may comprise a quality classification indication 1 bearer indicating that the connection failure occurred, for example, at a time that a bearer having a QCI value equal to 1 was configured.

A cell configuration parameter may comprise one or more of: a transmission power configuration parameter; a frequency configuration parameter; a beamforming configuration parameter; a physical control channel scheduling parameter; an antenna configuration parameter; a cell selection and/or cell reselection configuration parameter for one or more wireless devices; system information; an interference control parameter; and/or the like. The base station DU may transmit one or more system information blocks comprising one or more cell configuration parameters. The base station DU may send, to the base station CU via an F1 interface, the RRC message without interpretation.

A wireless device may determine a connection failure associated with a base station distributed unit. The wireless device may send (e.g., transmit), to a base station central unit (e.g., via a first base station distributed unit, via a second base station distributed unit, and/or via a computing device) which may receive, one or more radio resource control (RRC) messages comprising failure information (e.g., radio link failure information, SCGFailureInformation) indicating a connection failure associated with the wireless device. The computing device may comprise, for example, one or more of a second distributed unit, a neighboring base station to a serving base station (e.g., wherein the serving base station may comprise the first base station distributed unit), and/or a core network node. A first base station distributed unit and a second base station distributed unit (e.g., a computing device) may be distributed units of a same base station. The base station distributed unit may receive the one or more RRC messages. The base station distributed unit may forward and/or send (e.g., transmit) the one or more RRC messages to the base station central unit via an F1 interface (e.g., without decoding and/or interpreting the one or more RRC messages). The one or more RRC messages may comprise a failure report (e.g., an RLF report and/or an HOF report). The failure report may comprise one or more report information elements (IEs) indicating one or more of: a carrier frequency value of the failed cell, a first time value indicating a first time that elapsed since a last handover initialization for the wireless device until the connection failure, a second time value indicating a second time that elapsed since the connection failure, a connection failure type indicating whether the connection failure is a radio link failure or a handover failure, a measurement result of the failed cell (e.g., wherein the measurement result may comprise a reference signal received power result and/or a reference signal received quality), and/or a quality classification indication. The connection failure may comprise a secondary cell group (SCG) failure. The failure information may comprise, for example, one or more of: an identifier (e.g., a physical cell identifier, a cell global identifier, a cell index, and/or a carrier index) of a wireless device of the cell (e.g., a cell identifier of a failed cell in which the wireless device experienced the connection failure), a carrier frequency value of the cell, a time value indicating a time duration that may have elapsed since the connection failure, a measurement result associated with the cell, a measurement associated with a neighboring cell of the cell, and/or a quality classification indication. The measurement result associated with the cell and/or the measurement result associated with a neighboring cell of the cell may comprise one or more of: a reference signal received power and/or a reference signal received quality. The quality classification indication may comprise a quality classification indication bearer 1 parameter, for example, indicating that the connection failure occurred at a time that a bearer with quality classification being equal to 1 was configured. The base station distributed unit may receive the one or more RRC messages from the wireless device. A failure cause parameter may indicate one or more of: an indication of a cause associated with the connection failure, an expiry of a timer, a random access problem, and/or a radio link control maximum number of retransmissions. The timer may comprise, for example, a t310 timer and/or a t312 timer. The base station distributed unit may forward and/or send (e.g., transmit) the one or more RRC messages from the wireless device to the base station central unit, which may receive the one or more RRC messages. The link failure information may comprise one or more of: a cell identifier of a cell (e.g., physCellID), wherein a link quality of the cell may have caused the connection failure of the wireless device; and/or a failure cause parameter (e.g., failureType) indicating a cause of the connection failure.

The base station central unit may receive, from the base station distributed unit and/or from a computing device, one or more messages comprising failure information indicating a connection failure associated with a first base station distributed unit. The base station central unit may send, to the base station distributed unit, which may receive, a first message comprising the failure information (e.g., a user equipment (UE) context modification request and/or a UE context setup request message). The base station central unit may send (e.g., transmit) the first message to the base station distributed unit via a second base station distributed unit. The base station distributed unit may send (e.g., transmit), to the base station central unit which may receive, a second message (e.g., UE context modification response) comprising at least one cell configuration parameter of one or more cells based on the failure information. The base station central unit may send (e.g., transmit), to at least one wireless device which may receive, the at least one cell configuration parameter of the one or more cells (e.g., RRCReconfiguration). The at least one cell configuration parameter of the one or more cells may comprise one or more of: a transmission power configuration parameter, a frequency configuration parameter, a beamforming configuration parameter, a physical control channel scheduling parameter, an antenna configuration parameter, a cell selections and/or reselection configuration parameter (e.g., for the at least one wireless device), system information, and/or an interference control parameter.

The base station distributed unit may determine, based on the failure information, the at least one cell configuration parameter of the one or more cells. The base station distributed unit may send (e.g., transmit) (e.g., to one or more wireless devices and/or to the base station central unit) at least one system information block comprising the at least one cell configuration parameter of the one or more cells. A base station may comprise the base station central unit and one or more base station distributed units (including, e.g., the base station distributed unit referenced above). The base station central unit may comprise one or more of: a radio resource control layer function, a packet data convergence protocol layer function, and/or a service data adaptation protocol layer function. The base station distributed unit and a second base station distributed unit may comprise one or more of a physical layer function, a medium access control layer function, and/or a radio link control layer function.

Figure 19:
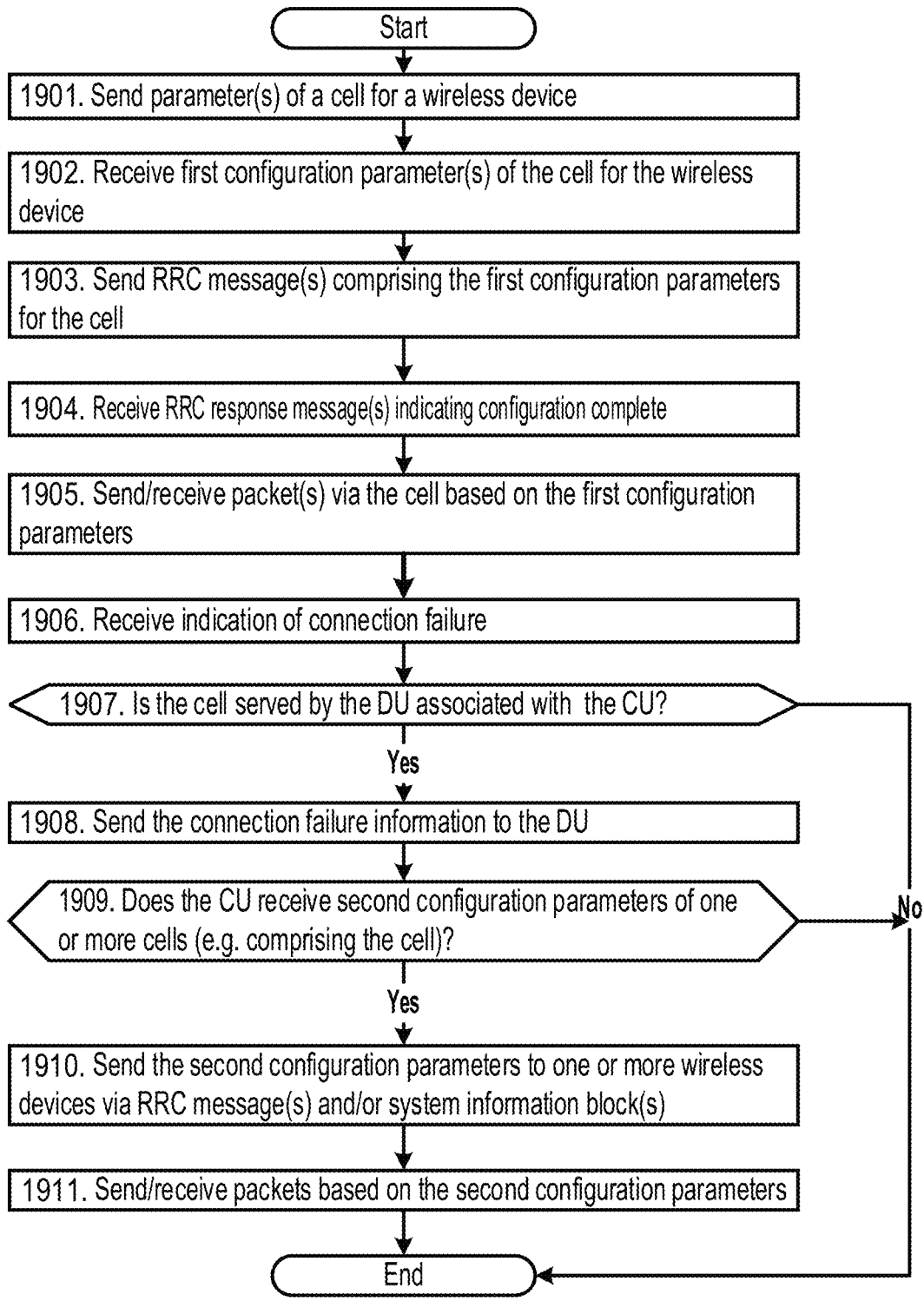
FIG. 19 shows an example diagram for connection failure procedures that may be performed by a base station central unit.

FIG. 19 shows an example diagram for connection failure procedures that may be performed by a base station central unit. A base station may comprise, for example, a base station central unit (CU) and a base station distributed unit (DU). At step 1901, the base station CU may send (e.g., to the base station DU) one or more parameters of a cell for a wireless device. The one or more parameters of the cell may comprise, for example, cell configuration parameters such as resource configuration parameters (e.g., frequency, bandwidth, subframe, slot, etc.), power control parameter (e.g., p-max), reference signal configuration parameter, measurement configuration parameters, PUCCH/PDCCH/PDSCH/PUSCH configurations, etc. At step 1902, the base station CU may receive (e.g., from the base station DU) one or more first configuration parameters of the cell for the wireless device. The one or more first configuration parameters may comprise, for example, updated parameter values of the parameters sent from the base station CU to the base station DU. At step 1903, the base station CU may send (e.g., to the wireless device) one or more RRC messages comprising the one or more first configuration parameters for the cell. At step 1904, the base station CU may receive (e.g., from the wireless device) one or more response messages (e.g., RRC response messages). The one or more response messages may indicate that a configuration is complete (e.g., configuration complete of the first configuration parameters for the cell). At step 1905, the base station CU may send (e.g., to the wireless device) and/or receive (e.g., from the wireless device) one or more packets. The base station CU may send and/or receive the one or more packets via the cell based on the first configuration parameters.

At step 1906, the base station CU may receive (e.g., from the wireless device) an indication of a connection failure. The base station CU may receive the indication of the connection failure from the wireless device, for example, via one or more base station DUs (which may comprise the base station DU referenced above) and/or via one or more base stations (e.g., gNB, eNB, etc.). The connection failure may comprise an RLF, an HOF, and/or a secondary cell group failure. The connection failure information may comprise, for example, one or more of: a cell identifier of the cell from which the wireless device experienced the connection failure, cell identifier(s) of serving cell(s) and/or neighboring cells at a time of the connection failure, measurement results (e.g., RSRP, RSRQ, etc.), a time period at which the connection failure occurred, a duration of time from the connection failure occurrence, a carrier frequency that the wireless device used at a time of the connection failure, an identifier (e.g., C-RNTI) of the wireless device at the cell, an indication of a cause of the connection failure, and/or a tracking are code (e.g., registration area ode) of the cell. The measurement results may comprise measurement results of the cell, of the serving cell(s), and/or of the neighboring cells.

At step 1907, the base station CU may determine whether the cell is served by the base station DU associated with the base station CU (e.g., the base station DU of the base station comprising the base station CU). If the cell is not served by the base station DU associated with the base station CU, the process may end. If the cell is served by the base station DU associated with the base station CU, the process may continue to step 1908. At step 1908, the base station CU may send the connection failure information to the base station DU. At step 1909, the base station CU may determine whether the base station CU receives second configuration parameters of one or more cells (e.g., which may comprise the cell for the wireless device). The second configuration parameters may comprise, for example, cell configuration parameters such as resource configuration parameters (e.g., frequency, bandwidth, subframe, slot, etc.), power control parameter (e.g., p-max), reference signal configuration parameter, measurement configuration parameters, PUCCH/PDCCH/PDSCH/PUSCH configurations, etc. If the base station CU determines that it has not received second configuration parameters of one or more cells (e.g., which may comprise the cell for the wireless device), the process may end. If the base station CU determines that it has received second configuration parameters of one or more cells (e.g., which may comprise the cell for the wireless device), the process may continue to step 1910. At step 1910, the base station CU may send (e.g., to one or more wireless devices which may comprise the wireless device) the second configuration parameters. The base station CU may send the second configuration parameters via one or more: RRC messages, and/or system information blocks. At step 1911, the base station CU may send (e.g., to the one or more wireless devices) and/or receive (e.g., from the one or more wireless devices), one or more packets, for example, based on the second configuration parameters. The process may end, for example, after step 1911.

Figure 20:
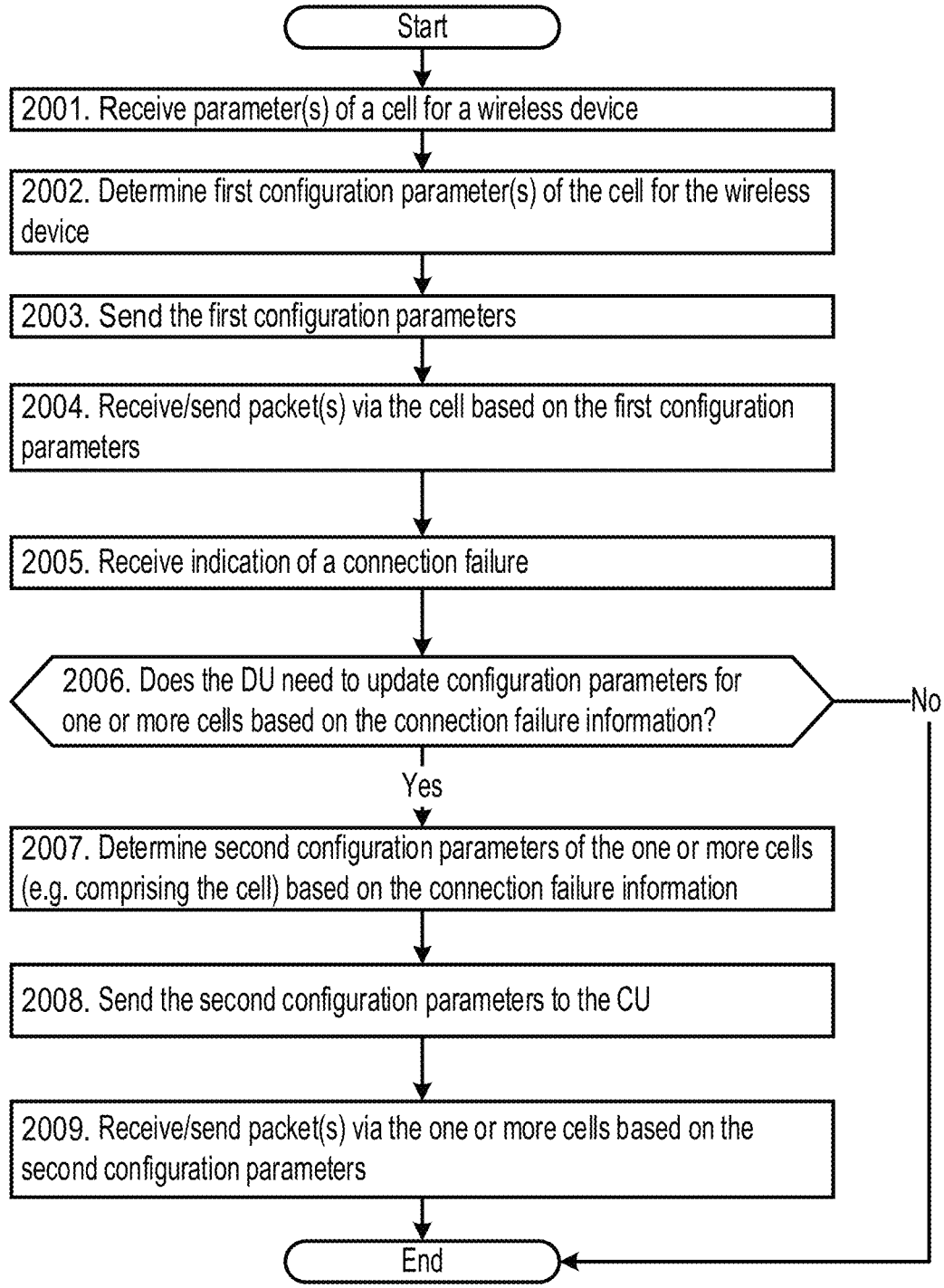
FIG. 20 shows an example diagram for connection failure procedures that may be performed by a base station distributed unit.

FIG. 20 shows an example diagram for connection failure procedures that may be performed by a base station distributed unit. A base station may comprise, for example, a base station central unit (CU) and a base station distributed unit (DU). At step 2001, the base station DU may receive (e.g., from the base station DU) one or more parameters of a cell for a wireless device. The one or more parameters of the cell may comprise, for example, cell configuration parameters such as resource configuration parameters (e.g., frequency, bandwidth, subframe, slot, etc.), power control parameter (e.g., p-max), reference signal configuration parameter, measurement configuration parameters, PUCCH/PDCCH/PDSCH/PUSCH configurations, etc. At step 2002, the base station DU may determine one or more first configuration parameters for the wireless device. The base station DU may determine the one or more first configuration parameters, for example, based on the one or more parameters received at step 2001. The one or more first configuration parameters may comprise, for example, updated parameter values of the parameters sent from the base station CU to the base station DU. At step 2003, the base station DU may send (e.g., to the base station CU) the one or more first configuration parameters of the cell for the wireless device. At step 2004, the base station DU may receive (e.g., from the base station CU and/or from the wireless device) and/or send and/or forward (e.g., to the wireless device and/or to the base station CU) one or more packets. The base station DU may receive and/or send and/or forward the one or more packets via the cell based on the one or more first configuration parameters. The base station DU may receive downlink packets from the base station CU and send and/or forward the downlink packets to the wireless device (e.g., via the cell based on the one or more first configuration parameters). The base station DU may receive uplink packets from the wireless device (e.g., via the cell based on the one or more first configuration parameters) and send and/or forward the uplink packets to the base station CU.

At step 2005, the base station DU may receive (e.g., from the base station DU) an indication of a connection failure. The base station DU may receive the indication of the connection failure from the wireless device, for example, via one or more base station DUs (which may comprise the base station DU referenced above) and/or via one or more base stations (e.g., gNB, eNB, etc.). The connection failure may comprise an RLF, an HOF, and/or a secondary cell group failure. The connection failure information may comprise, for example, one or more of: a cell identifier of the cell from which the wireless device experienced the connection failure, cell identifier(s) of serving cell(s) and/or neighboring cells at a time of the connection failure, measurement results (e.g., RSRP, RSRQ, etc.), a time period at which the connection failure occurred, a duration of time from the connection failure occurrence, a carrier frequency that the wireless device used at a time of the connection failure, an identifier (e.g., C-RNTI) of the wireless device at the cell, an indication of a cause of the connection failure, and/or a tracking are code (e.g., registration area ode) of the cell. The measurement results may comprise measurement results of the cell, of the serving cell(s), and/or of the neighboring cells.

At step 2006, the base station DU may determine whether the base station DU should and/or needs to update confirmation parameters for one or more cells (e.g., based on the connection failure information). If the base station DU determines that it should not and/or does not need to update confirmation parameters for one or more cells (e.g., based on the connection failure information), the process may end. If the base station DU determines that it should and/or needs to update confirmation parameters for one or more cells (e.g., based on the connection failure information), the process may continue to step 2007. At step 2007, the base station DU may determine second confirmation parameters of the one or more cells (e.g., which may comprise the cell of the wireless device). The base station DU may determine the second configuration parameters based on the connection failure information. The second configuration parameters may comprise, for example, cell configuration parameters such as resource configuration parameters (e.g., frequency, bandwidth, subframe, slot, etc.), power control parameter (e.g., p-max), reference signal configuration parameter, measurement configuration parameters, PUCCH/PDCCH/PDSCH/PUSCH configurations, etc. At step 2008, the base station DU may send (e.g., to the base station CU) the second configuration parameters of one or more cells (e.g., which may comprise the cell for the wireless device). The base station DU may send the second configuration parameters via one or more: RRC messages, and/or system information blocks. At step 2009, the base station DU may receive (e.g., from the base station CU and/or from the one or more wireless devices which may comprise the wireless device) one or more packets, for example, based on the second configuration parameters. The base station DU may receive downlink packets from the base station CU. The base station DU may send and/or forward the downlink packets to one or more wireless devices (e.g., which may comprise the wireless device). The base station DU may send and/or forward the downlink packets via the one or more cells based on the second configuration parameters. The base station DU may receive uplink packets from one or more wireless devices (e.g., which may comprise the wireless device). The base station DU may receive the uplink packets via the one or more cells based on the second configuration parameters. The base station DU may send and/or forward the uplink packets to the base station CU. The process may end, for example, after step 2009.

Figure 21:
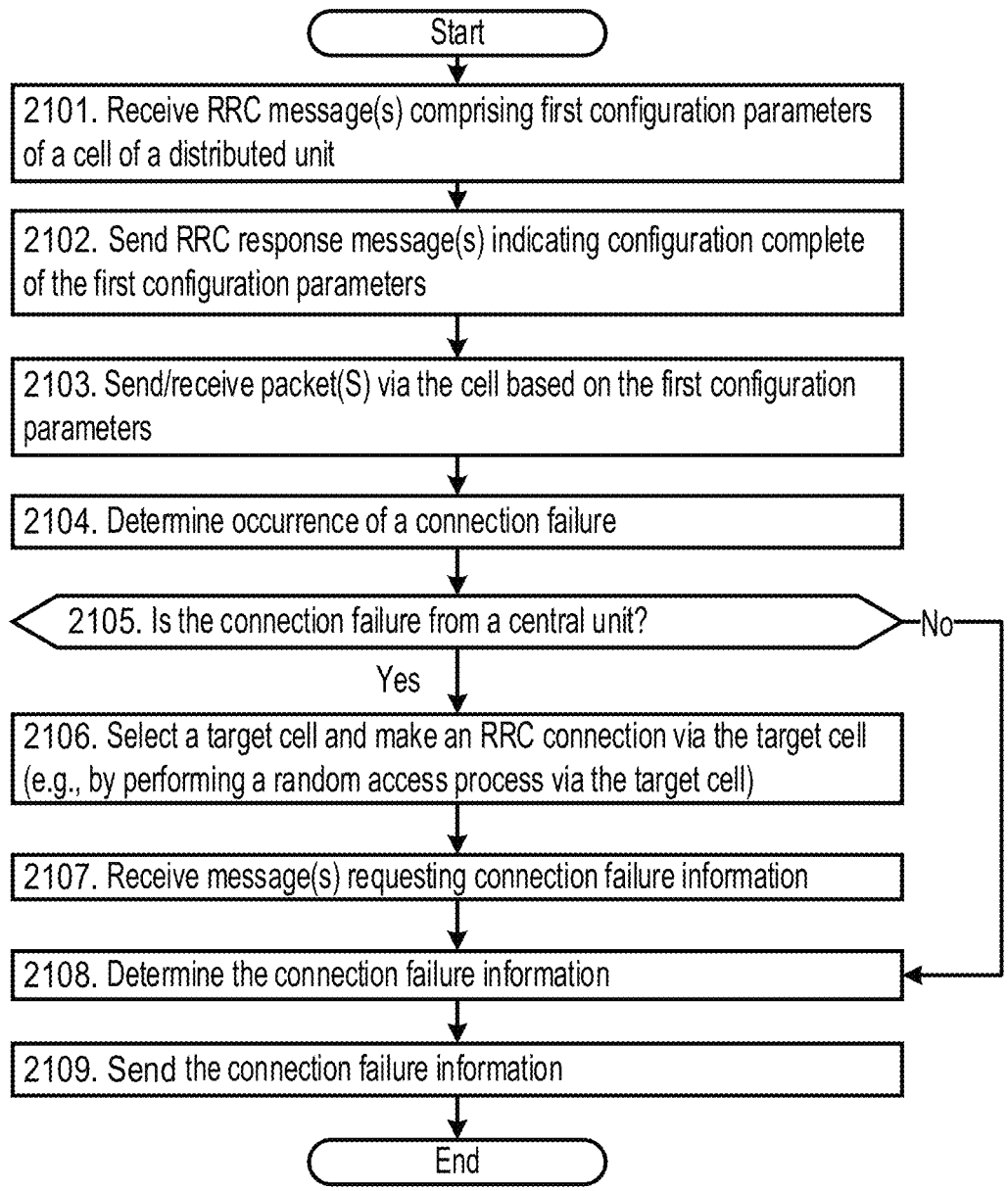
FIG. 21 shows an example diagram for connection failure procedures that may be performed by a wireless device.

FIG. 21 shows an example diagram for connection failure procedures that may be performed by a wireless device. A base station may comprise, for example, a base station central unit (CU) and a base station distributed unit (DU). At step 2101, a wireless device may receive (e.g., from a base station CU) one or more RRC messages. The one or more RRC messages may comprise first configuration parameters of a cell of a base station DU. The first configuration parameters of the cell of the base station DU may comprise, for example, cell configuration parameters such as resource configuration parameters (e.g., frequency, bandwidth, subframe, slot, etc.), power control parameter (e.g., p-max), reference signal configuration parameter, measurement configuration parameters, PUCCH/PDCCH/PDSCH/PUSCH configurations, etc. At step 2102, the wireless device may transmit (e.g., to the base station CU) one or more response messages (e.g., RRC response messages). The one or more response messages may indicate that a configuration is complete (e.g., configuration complete of the first configuration parameters). At step 2103, the wireless device may send (e.g., to the base station CU) and/or receive (e.g., from the base station CU) one or more packets. The wireless device may send and/or receive the one or more packets via the cell based on the first configuration parameters.

At step 2104, the wireless device may determine an occurrence of a connection failure from the base station DU and/or from the base station CU (e.g., at a time that the wireless device is using the cell). The connection failure may comprise an RLF, an HOF, and/or a secondary cell group failure. The wireless device may determine the occurrence of a connection failure based on one or more of: a received signal power, a block error rate, a timer (e.g., t310, t312, etc.) expiration, a number of packet retransmissions, an indication of being out-of-sync, a random access failure, or any other failure condition. At step 2105, the wireless device may determine whether the connection failure is from a base station CU. If the wireless device determines that the connection failure is not from a base station CU, the process may continue to step 2108. If the wireless device determines that the connection failure is from a base station CU, the process may continue to step 2106.

At step 2106, the wireless device may select a target cell and/or make an RRC connection via a target cell (e.g., by performing a random access process via the target cell). At step 2107, the wireless device may receive one or more messages requesting connection failure information. At step 2108, the wireless device may determine the connection failure information. The connection failure information may comprise, for example, one or more of: a cell identifier of the cell from which the wireless device experienced the connection failure, cell identifier(s) of serving cell(s) and/or neighboring cells at a time of the connection failure, measurement results (e.g., RSRP, RSRQ, etc.), a time period at which the connection failure occurred, a duration of time from the connection failure occurrence, a carrier frequency that the wireless device used at a time of the connection failure, an identifier (e.g., C-RNTI) of the wireless device at the cell, an indication of a cause of the connection failure, and/or a tracking are code (e.g., registration area ode) of the cell. The measurement results may comprise measurement results of the cell, of the serving cell(s), and/or of the neighboring cells. At step 2109, the wireless device may send (e.g., to the base station CU) the connection failure information. The wireless device may sent the connection failure information to the base station CU via one or more base station DUs (e.g., which may comprise the base station DU associated with the base station CU) and/or to one or more base stations (e.g., gNB, eNB, etc.). The process may end, for example, after step 2109.

Figure 22:
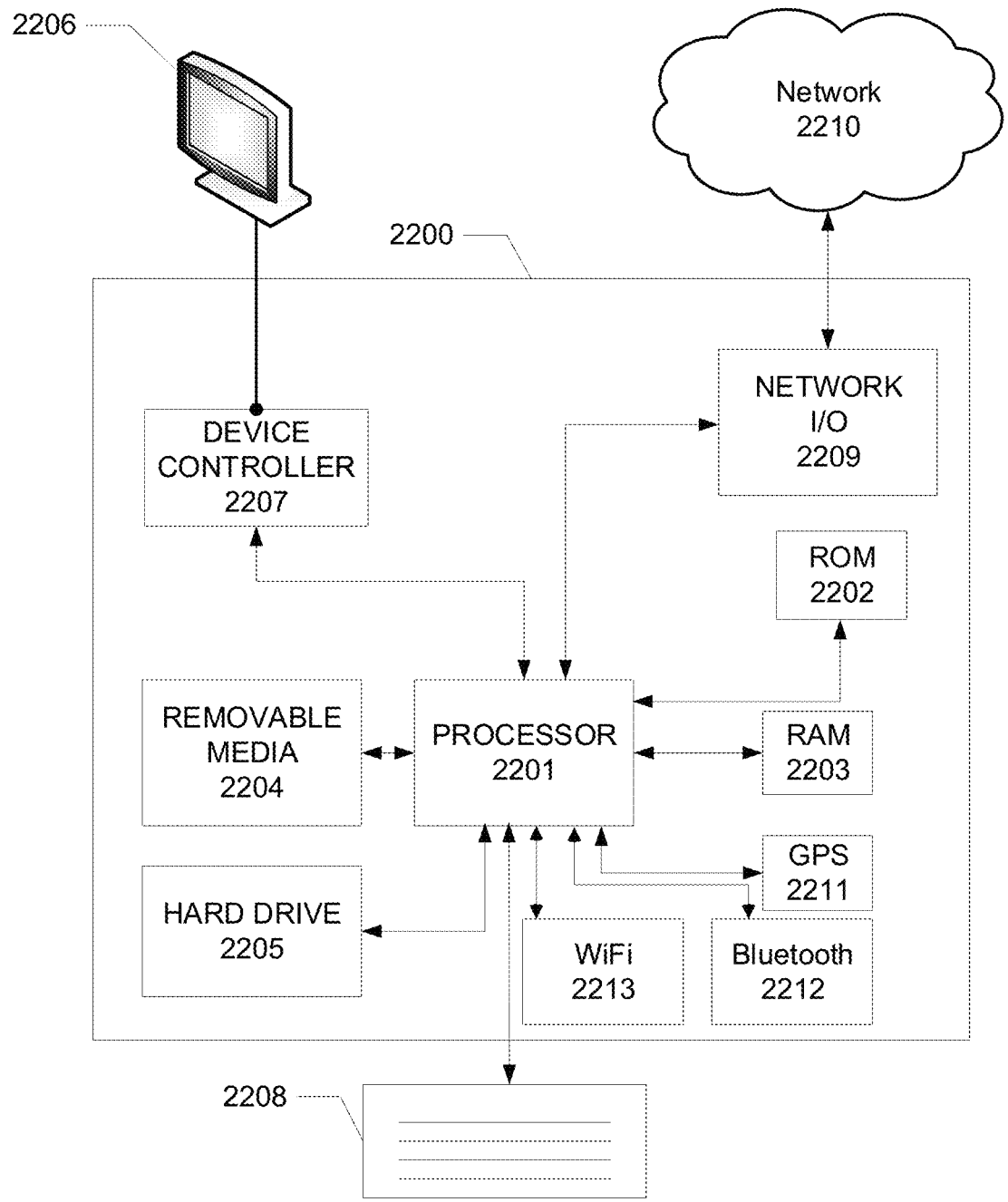
FIG. 22 shows example elements of a computing device that may be used to implement any of the various devices described herein.

FIG. 22 shows general hardware elements that may be used to implement any of the various computing devices discussed herein, including, e.g., the base station 401, the wireless device 406, or any other base station, wireless device, or computing device described herein. The computing device 2200 may include one or more processors 2201, which may execute instructions stored in the random access memory (RAM) 2203, the removable media 2204 (such as a Universal Serial Bus (USB) drive, compact disk (CD) or digital versatile disk (DVD), or floppy disk drive), or any other desired storage medium. Instructions may also be stored in an attached (or internal) hard drive 2205. The computing device 2200 may also include a security processor (not shown), which may execute instructions of one or more computer programs to monitor the processes executing on the processor 2201 and any process that requests access to any hardware and/or software components of the computing device 2200 (e.g., ROM 2202, RAM 2203, the removable media 2204, the hard drive 2205, the device controller 2207, a network interface 2209, a GPS 2211, a Bluetooth interface 2212, a WiFi interface 2213, etc.). The computing device 2200 may include one or more output devices, such as the display 2206 (e.g., a screen, a display device, a monitor, a television, etc.), and may include one or more output device controllers 2207, such as a video processor. There may also be one or more user input devices 2208, such as a remote control, keyboard, mouse, touch screen, microphone, etc. The computing device 2200 may also include one or more network interfaces, such as a network interface 2209, which may be a wired interface, a wireless interface, or a combination of the two. The network interface 2209 may provide an interface for the computing device 2200 to communicate with a network 2210 (e.g., a RAN, or any other network). The network interface 2209 may include a modem (e.g., a cable modem), and the external network 2210 may include communication links, an external network, an in-home network, a provider's wireless, coaxial, fiber, or hybrid fiber/coaxial distribution system (e.g., a DOCSIS network), or any other desired network. Additionally, the computing device 2200 may include a location-detecting device, such as a global positioning system (GPS) microprocessor 2211, which may be configured to receive and process global positioning signals and determine, with possible assistance from an external server and antenna, a geographic position of the computing device 2200.

The example in FIG. 22 may be a hardware configuration, although the components shown may be implemented as software as well. Modifications may be made to add, remove, combine, divide, etc. components of the computing device 2200 as desired. Additionally, the components may be implemented using basic computing devices and components, and the same components (e.g., processor 2201, ROM storage 2202, display 2206, etc.) may be used to implement any of the other computing devices and components described herein. For example, the various components described herein may be implemented using computing devices having components such as a processor executing computer-executable instructions stored on a computer-readable medium, as shown in FIG. 22. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
   receiving, by a base station central unit from a wireless device, one or more radio resource control (RRC) messages comprising failure information indicating a connection failure associated with the wireless device, wherein the failure information comprises:
   a cell identifier of a first cell for which a link quality caused the connection failure; and
   a failure cause parameter indicating a cause of the connection failure;
   sending, by the base station central unit to a base station distributed unit, a first message comprising the failure information;
   receiving, by the base station central unit from the base station distributed unit, a second message that is based on the failure information and that comprises at least one cell configuration parameter of one or more cells; and
   sending, by the base station central unit to at least one wireless device, the at least one cell configuration parameter of the one or more cells.

2. The method of claim 1, wherein the connection failure comprises a secondary cell group failure.

3. The method of claim 1, wherein the failure information further comprises at least one of:
   a measurement result associated with the first cell; or
   a measurement result associated with a neighboring cell of the first cell.

4. The method of claim 1, wherein the failure cause parameter indicates at least one of:
   an expiry of a timer;
   a random access problem; or
   a radio link control maximum number of retransmissions.

5. The method of claim 1, wherein the first message comprises a user equipment context modification request.

6. The method of claim 1, wherein the receiving the one or more RRC messages comprises receiving the one or more RRC messages from the wireless device via a second base station distributed unit.

7. The method of claim 1, wherein the receiving the one or more RRC messages comprises receiving the one or more RRC messages from the wireless device via the base station distributed unit.

8. The method of claim 1, wherein the at least one cell configuration parameter of the one or more cells comprises at least one of:
   a transmission power configuration parameter; or
   a frequency configuration parameter.

9. The method of claim 1, further comprising:
   determining, by the base station distributed unit and based on the failure information, the at least one cell configuration parameter of the one or more cells; and
   sending, by the base station distributed unit, at least one system information block comprising the at least one cell configuration parameter of the one or more cells.

10. The method of claim 1, wherein the one or more cells comprises the first cell.

11. A method comprising:
    receiving, by a base station distributed unit from a wireless device, one or more radio resource control (RRC) messages comprising failure information indicating a connection failure associated with the wireless device, wherein the failure information comprises:
    a cell identifier of a first cell for which a link quality caused the connection failure; and a failure cause parameter indicating a cause of the connection failure;

sending, by the base station distributed unit to a base station central unit, the one or more RRC messages comprising the failure information;

receiving, by the base station distributed unit from the base station central unit, a first message comprising the failure information;

determining, by the base station distributed unit and based on the failure information, at least one cell configuration parameter of one or more cells; and sending, by the base station distributed unit to the base station central unit, a second message comprising the at least one cell configuration parameter of the one or more cells.

12. The method of claim 11, wherein the connection failure comprises a secondary cell group failure.

13. The method of claim 11, wherein the failure information further comprises at least one of:
a reference signal received power; or
a reference signal received quality.

14. The method of claim 11, wherein the first message comprises a user equipment context modification request.

15. The method of claim 11, wherein the second message comprises a user equipment context modification response.

16. The method of claim 11, wherein the at least one cell configuration parameter of the one or more cells comprises at least one of:
a beamforming configuration parameter; or
a physical control channel scheduling parameter.

17. The method of claim 11, further comprising sending at least one system information block comprising the at least one cell configuration parameter of the one or more cells.

18. A method comprising:
receiving, by a base station central unit from a computing device, one or more messages comprising failure information indicating a connection failure associated with a first base station distributed unit, wherein the failure information comprises:
a cell identifier of a first cell for which a link quality caused the connection failure; and
a failure cause parameter indicating a cause of the connection failure;

sending, by the base station central unit to the first base station distributed unit, a first message comprising the failure information;

receiving, by the base station central unit from the first base station distributed unit, a second message that is based on the failure information and that comprises at least one cell configuration parameter of one or more cells; and sending, by the base station central unit to at least one wireless device, the at least one cell configuration parameter of the one or more cells.

19. The method of claim 18, wherein the computing device comprises at least one of:
a second base station distributed unit;
a neighboring base station to a serving base station, wherein the serving base station comprises the first base station distributed unit; or
a core network node.

20. The method of claim 18, wherein the computing device comprises a second base station distributed unit, and wherein the first base station distributed unit and the second base station distributed unit are distributed units of a same base station.

* * * * *